US012785479B2

(12) United States Patent
Yamamoto et al.

(10) Patent No.: US 12,785,479 B2
(45) Date of Patent: Nov. 3, 2026

(54) COIL ASSEMBLY, ARMATURE, AND ROTATING ELECTRICAL MACHINE

(71) Applicant: DENSO CORPORATION, Kariya-city (JP)

(72) Inventors: Toshio Yamamoto, Kariya-city (JP); Yuji Hayashi, Kariya-city (JP); Yusuke Tateishi, Kariya-city (JP); Shinji Makita, Kariya-city (JP); Keisuke Koide, Kariya-city (JP)

(73) Assignee: DENSO CORPORATION, Kariya (JP)

( * ) Notice: Subject to any disclaimer, the term of this patent is extended or adjusted under 35 U.S.C. 154(b) by 237 days.

(21) Appl. No.: 18/811,988

(22) Filed: Aug. 22, 2024

(65) Prior Publication Data

US 2024/0413689 A1 Dec. 12, 2024

Related U.S. Application Data

(63) Continuation of application No. PCT/JP2023/006886, filed on Feb. 24, 2023.

(30) Foreign Application Priority Data

Feb. 24, 2022 (JP) ................................ 2022-027163
Jan. 10, 2023 (JP) ................................ 2023-001826

(51) Int. Cl.
*H02K 3/04* (2006.01)
*H02K 3/32* (2006.01)

(52) U.S. Cl.
CPC ................ *H02K 3/04* (2013.01); *H02K 3/32* (2013.01)

(58) Field of Classification Search
CPC .................................. H02K 3/04; H02K 3/32
USPC .......................................................... 310/208
See application file for complete search history.

(56) References Cited

U.S. PATENT DOCUMENTS 3,944,857 A 3/1976 Faulhaber
4,645,961 A * 2/1987 Malsky ................. H02K 37/14 310/216.115
2009/0315427 A1 12/2009 Seo et al.

FOREIGN PATENT DOCUMENTS

DE 3890589 C2 * 12/1997 ............... H02K 3/26
GB 2164500 A * 3/1986 ............. H02K 29/06
JP S49-037105 A 4/1974
JP S50-158804 A 12/1975
JP S54-061609 A 5/1979
JP 2003-070197 A 3/2003
JP 2005143202 A * 6/2005
JP 2017-070140 A 4/2017

(Continued)

*Primary Examiner* — Jose A Gonzalez Quinones
(74) *Attorney, Agent, or Firm* — Oliff PLC

(57) ABSTRACT

A coil assembly includes a strip member having a width in an axial direction, a length in a circumferential direction, and a thickness in a radial direction of a coil assembly. The strip is rolled in the circumferential direction into a plurality of turns stacked on one another. The coil group includes a plurality of coils made from an electrically conductive material. The coils are arranged in a length direction of the strip. Each of the coils is shaped, to have an open end facing in a first width direction and a closed end facing in a second width direction opposite the first width direction. Two of the coils arranged adjacent each other in the length direction of the strip are connected in a preselected way on a first width end facing away from a second width end portion of the strip in the first width direction.

18 Claims, 60 Drawing Sheets

(56) References Cited

FOREIGN PATENT DOCUMENTS

| | | | |
|---|---|---|---|
| JP | 2019-221009 | A | 12/2019 |
| JP | 2020-114062 | A | 7/2020 |

* cited by examiner

COIL ASSEMBLY, ARMATURE, AND ROTATING ELECTRICAL MACHINE

CROSS REFERENCE TO RELATED DOCUMENT

The present application claims the benefits of priority of Japanese Patent Application No. 2022-027163 filed on Feb. 24, 2022 and Japanese Patent Application No. 2023-001826 filed on Jan. 10, 2023, the entire disclosures of which are incorporated in their entirety herein by reference.

TECHNICAL FIELD

This disclosure relates generally to a coil assembly, an armature, and a rotating electrical machine.

BACKGROUND ART

A first patent literature listed below teaches a coil assembly playing a role as a portion of an armature of a rotating electrical machine. The coil assembly includes a first conductive cylinder, a second conductive cylinder, and an electrical insulator disposed between the first and second conductive cylinders. The first conductive cylinder includes a plurality of first conductive strips which have length in an axial direction thereof and are arranged at an interval away from each other in a circumferential direction thereof. The second conductive cylinder includes a plurality of second conductive strips which have length extending in an axial direction thereof and are arranged at an interval away from each other in a circumferential direction thereof. The electrical insulator works to electrically isolate between the first and second conductive strips. This structure ensures stability in electrical performance required for the coil assembly and also enables the coil assembly to be simplified in structure or produced at decreased cost.

PRIOR ART DOCUMENT

Patent Literature

FIRST PATENT LITERATURE: Japanese Patent First Publication No. 2017-070140

SUMMARY OF THE INVENTION

The above-described coil assembly has conductive ends connected together using a wiring substrate. This results in a difficulty in reducing the size of a rotating electrical machine equipped with the coil assembly. The use of the wiring substrate to connect the conductive ends of the coil assembly may lead to an increase in length of a power supply line leading to the coil assembly, thereby resulting in a difficulty in reducing an electrical resistance in the rotating electrical machine. This leads to a difficulty in enhancing the degree of torque outputted by the rotating electrical machine.

It is an object of this disclosure to provide a coil assembly, an armature, and a rotating electrical machine which are capable of minimizing the size thereof and enhancing the degree of output torque.

According to one aspect of this disclosure, there is provided a coil assembly which comprises: (a) a strip member which is made from electrical insulating material and has a width in an axial direction of the coil assembly, a length in a circumferential direction of the coil assembly, and a thickness in a radial direction of the coil assembly, the strip member being rolled in the circumferential direction into a plurality of turns stacked on one another in the radial direction; and (b) a coil group which includes a plurality of coils which are made from an electrically conductive material and formed on the strip member. The coils are arranged in a length direction of the strip member. Each of the coils being shaped, as viewed in a thickness direction of the strip member, to have an open end facing in a first width direction of the strip member and a closed end facing in a second width direction opposite the first width direction. A respective two of the coils which are arranged adjacent each other in the length direction of the strip member are connected together in a preselected way on a first width end portion of the strip member which faces away from a second width end portion of the strip member in the first width direction.

According to another aspect of this disclosure, there is provided a coil assembly which comprises a strip member and a coil group. The strip member is made from electrical insulating material and has a width in an axial direction of the coil assembly, a length in a circumferential direction of the coil assembly, and a thickness in a radial direction of the coil assembly. The strip member is rolled in the circumferential direction into a plurality of turns stacked on one another in the radial direction. The coil group includes a plurality of first coil sections and a plurality of second coil sections which are made from electrically conductive material and formed on the strip member. The first and second coil sections are arranged alternately in a length direction of the strip member. Each of the first coil sections is shaped, as viewed in a thickness direction of the strip member, to extend from a first width end portion of the strip member toward a second width end portion of the strip member which is opposite the first width end portion in a width direction of the strip member. Each of the second coil sections is shaped, as viewed in a thickness direction of the strip member, to extend from the second width end portion of the strip member toward the first width end portion of the strip member in the width direction of the strip member. The first coil sections and the second coil sections are connected together in a preselected way in which a first end that is an end of one of the first coil sections and a second end that is an end of one of the second coil sections and arranged adjacent to the first end on the first width end portion of the strip member are connected together on the first width end portion of the strip member, and a third end that is an end of one of the first coil sections and a fourth end that is an end of one of the second coil sections and arranged adjacent to the third end on the second width end portion of the strip member are connected together on the second width end portion of the stirp.

According to the third aspect of this disclosure, there is provided an armature which comprises a coil assembly set forth in any one of the first to sixteenth structures.

According to the fourth aspect of this disclosure, there is provided a rotating electrical machine which comprises a first one of a stator and a rotor which includes an armature set forth in the seventeenth structure, and a second one of the stator and the rotor which includes a magnet arranged to face the above-described coil assembly.

Each of the above structures serves to enhance the degree of output torque without need for increasing the size thereof.

BRIEF DESCRIPTION OF THE DRAWINGS

The above-described object, other objects, features, or beneficial advantages in this disclosure will be apparent from the following detailed discussion with reference to the drawings.

In the drawings.

MODE FOR CARRYING OUT THE INVENTION

First Embodiment

Figure 1:
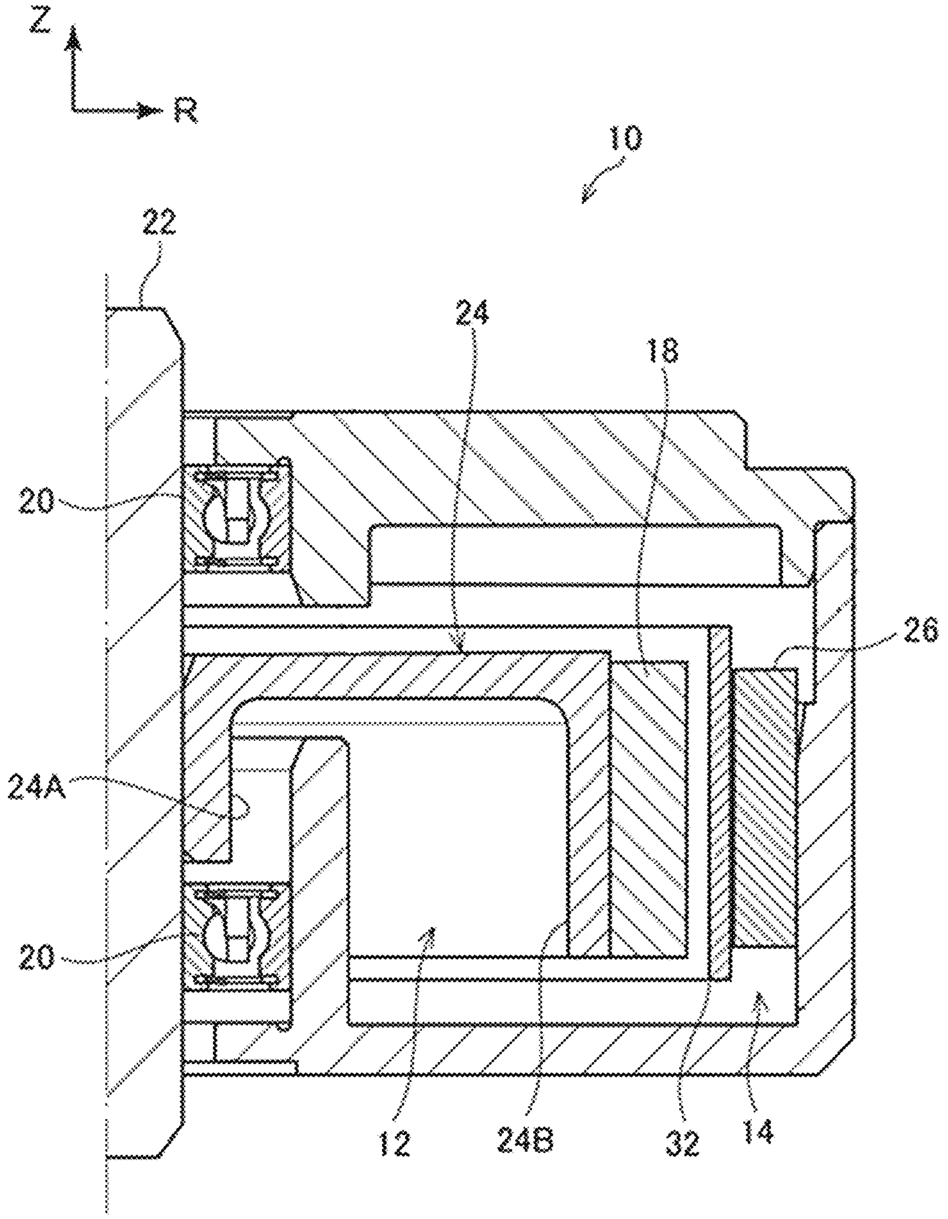
FIG. 1 is a sectional view of a motor, as taken in an axial direction of the motor, according to the first embodiment.

The electrical motor 10 in this disclosure will be described below with reference to FIGS. 1 to 13. In the drawings, directions expressed by arrows Z, R, and C correspond to a first direction that is a direction of rotation of an axis of the rotor 12, an outward radial direction of the rotor 12, and a first circumferential direction oriented along a circumference of the rotor 12, respectively. An axial direction, a radial direction, and a circumferential direction which are simply referred to in the following discussion correspond to an axial direction, a radial direction, and a circumferential direction of the rotor 12 (i.e., the coil assembly 32 which will be described later) unless otherwise specified. The motor 10, as referred to in this disclosure, is an example of a rotating electrical machine.

Figure 2:
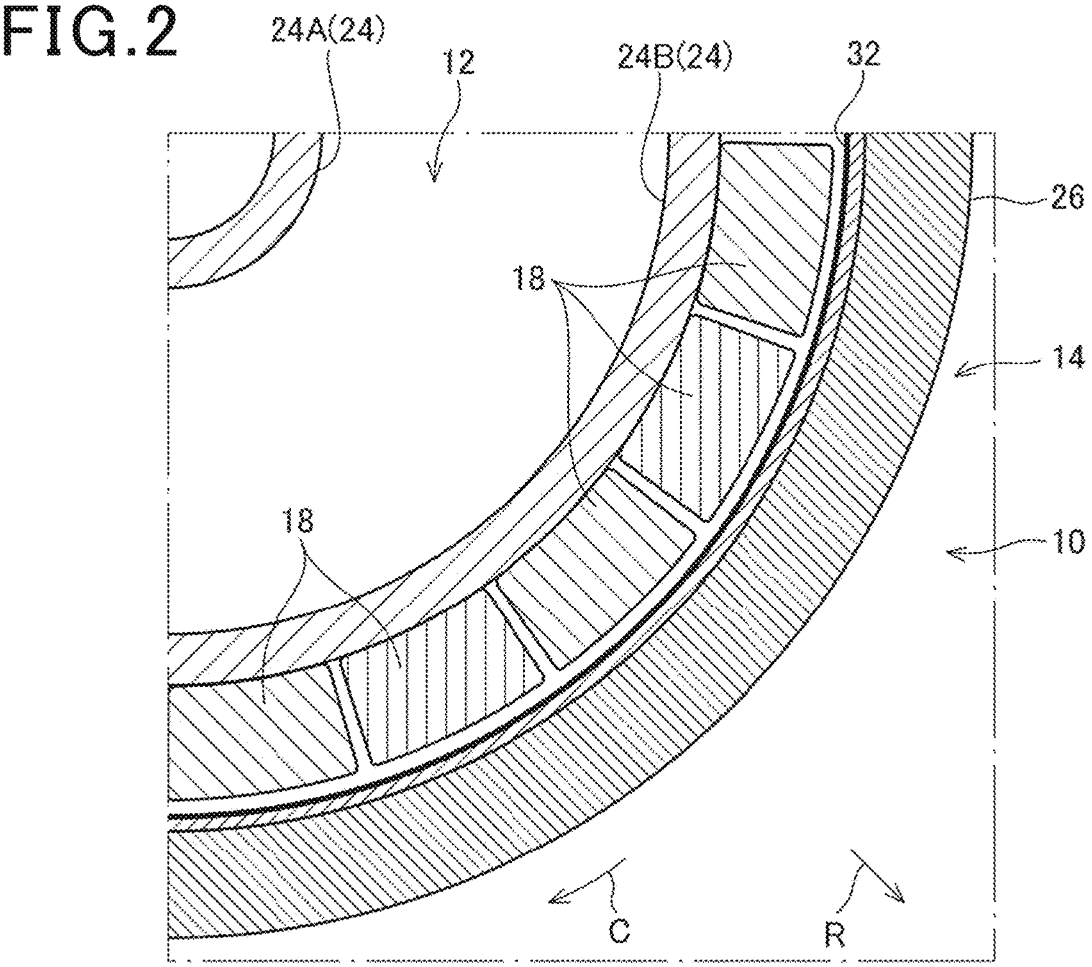
FIG. 2 is a sectional view of a motor, as taken in a radial direction of the motor, according to the first embodiment.

The motor 10 is, as illustrated in FIGS. 1 and 2, designed as an inner-rotor brushless motor which has the rotor 12 arranged radially inside the stator 14 serving as an armature. FIGS. 1 and 2 schematically show the motor 10 for the sake of simplicity of illustration, therefore, the number of the coils 16 or magnets 18 or a detailed configuration of the motor 10 may be different from those discussed later.

The rotor 12 includes the rotating shaft 22, the rotor core 24, and the magnets 28. The rotating shaft 22 is retained by a pair of bearings 20 to be rotatable. The rotor core 24 is of a hollow cylindrical shape with a bottom and secured to the rotating shaft 22. The magnets 28 are fixed on a radial outer periphery of the rotor core 24.

The rotor core 24 includes the first cylinder 24A and the second cylinder 24B. The first cylinder 24A is of a hollow cylindrical shape and has the rotating shaft 22 press-fit therein. The second cylinder 24B is of a hollow cylindrical shape and arranged radially outside the first cylinder 24A. The second cylinder 24B has a radial outer periphery which is of a cylindrical shape and extends in the circumferential direction. The magnets 18 are secured to the outer periphery of the second cylinder 24B.

The magnets 18 are made from a magnetic compound which has an intrinsic coercive force Hc of 400 kA/m or more and a remanent flux density Br of 1.0 T or more. For instance, each of the magnets 18 is made from a magnetic compound of $NdFe_{11}TiN$, $Nd_2Fe_{14}B$, $Sm_2Fe_{17}N_3$, or FeNi. The magnets 18 are firmly mounted on the outer periphery of the second cylinder 24B of the rotor core 24. The magnets 18 are broken down into first magnets 18 and second magnets 18. Each of the first magnets 18 has an N-pole on a radial outer surface thereof. Each of the second magnets 18 has an S-pole on a radial outer surface thereof. The first and second magnets 18 are arranged alternately adjacent to each other in the circumferential direction. The number of the magnets 18 depends upon the degree of output power required for the motor 10.

The stator 14 includes the hollow cylindrical stator core 26 serving as an armature core and the coil assembly 32 secured to the stator core 26. The stator 14 is, as can be seen in FIGS. 1 to 3, of a tooth-less structure in which a portion of the stator core 26 is not arranged radially inside the coils 16 of the coil assembly 32.

The stator core 26 is, as illustrated in FIGS. 1 and 2, of an annular or hollow cylindrical shape and made from a soft magnetic material, such as steel. The stator core 26 is arranged coaxially with the rotor 12. In other words, the stator core 26 is located to have a center axis aligned with that of an assembly of the magnets 18 fixed to the rotor core 24 in the axial direction of the rotor 12.

Figure 3:
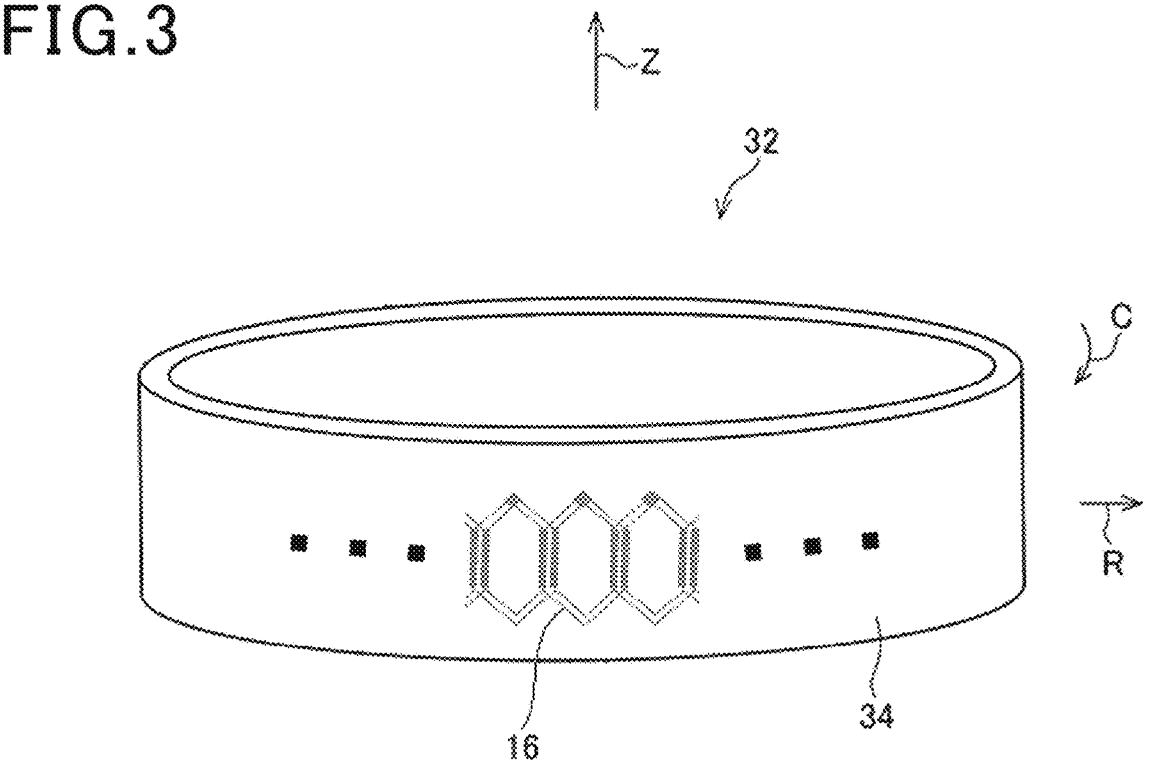
FIG. 3 is a perspective view which schematically illustrates a coil assembly.
Figure 4:
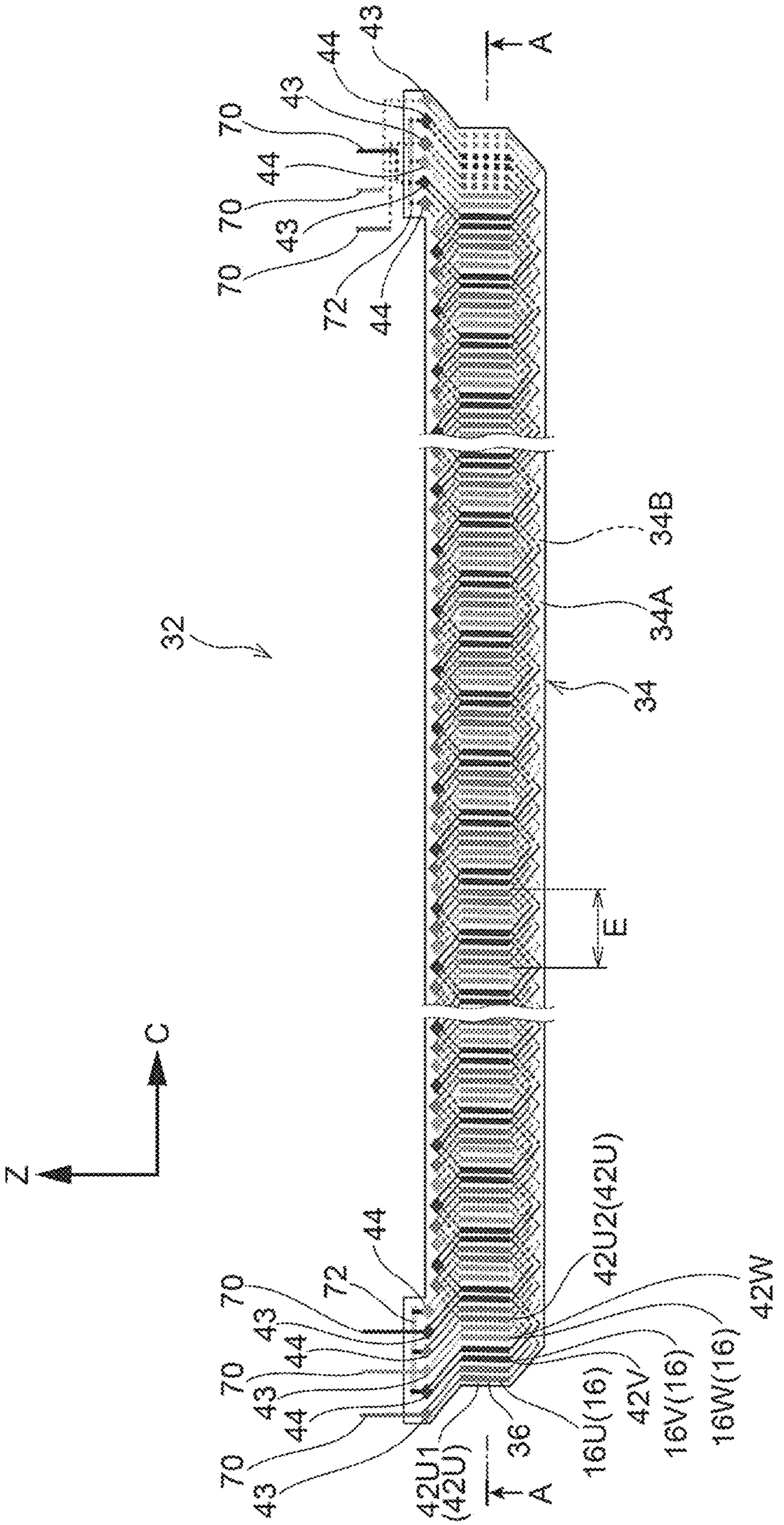
FIG. 4 is a view which illustrates a coil assembly in the first embodiment.

The coil assembly 32, as illustrated in FIGS. 3 and 4, includes the strip member 34 and the coils 16. The strip member 34 is of a belt-shape and made from an electrically insulating material. The coils 16 are made from an electrically conductive material and formed on the strip member 34.

The strip member 34 has a width in the axial direction of the rotor 12 and a length in a direction perpendicular to the axial direction (i.e., a circumferential direction of the rotor 12). The strip members 34 has a thickness small enough to be bent or curled in the circumferential direction of the rotor 12. The strip member 34 is curved or rolled in the circumferential direction of the coil assembly 32 into a cylindrical shape to create a plurality of turns. Most of the strip member 34 is of a four-layer structure, which will be later in detail.

The coils 16 are, as clearly illustrated in FIG. 3, formed on the strip member 34. The strip member 34 is, as can be seen in FIGS. 3 and 4, rolled several times in the circumferential direction, so that the coils 16 are located at preselected positions both in the circumferential direction and in the radial direction.

Figure 5:
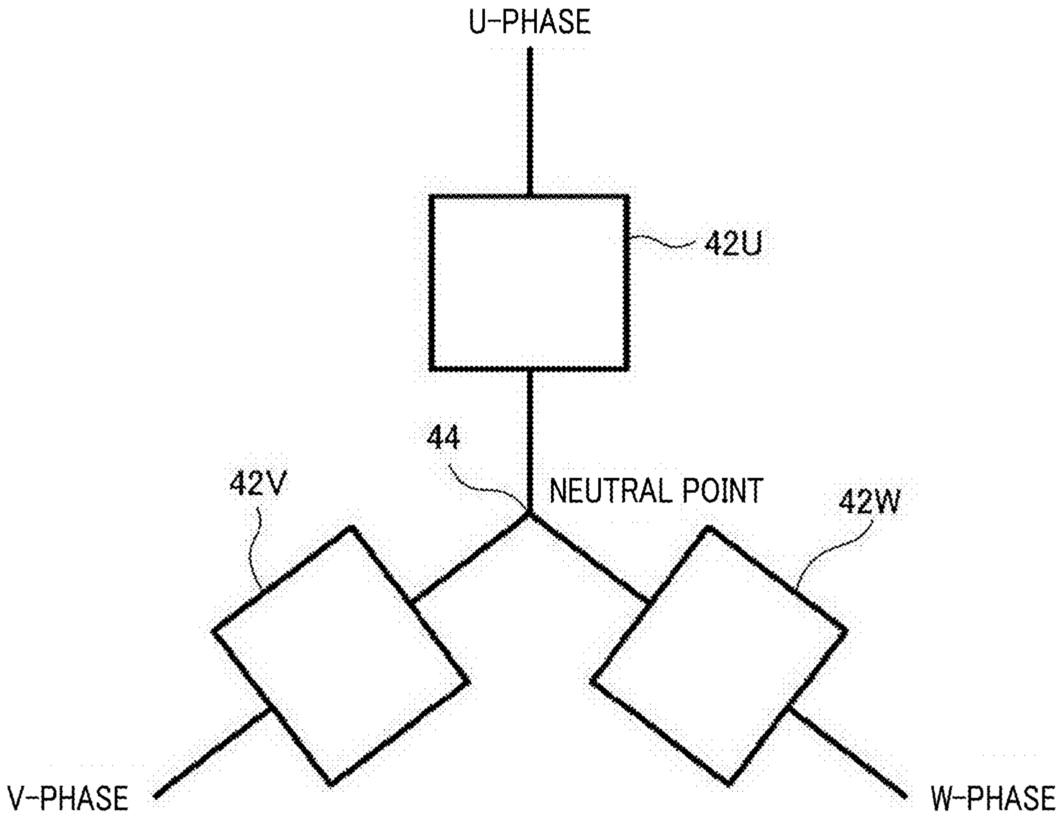
FIG. 5 is a view which illustrates a star-connection of a coil assembly.

The coils 16 is, as illustrated in FIG. 5, broken down into three groups: the U-phase coil group 42U creating a U-phase, the V-phase coil group 42V creating a V-phase, and the W-phase coil group 42W creating a W-phase. The U-phase coil group 42U, the V-phase coil group 42V, and the W-phase coil group 42W are star-connected together.

Figure 6:
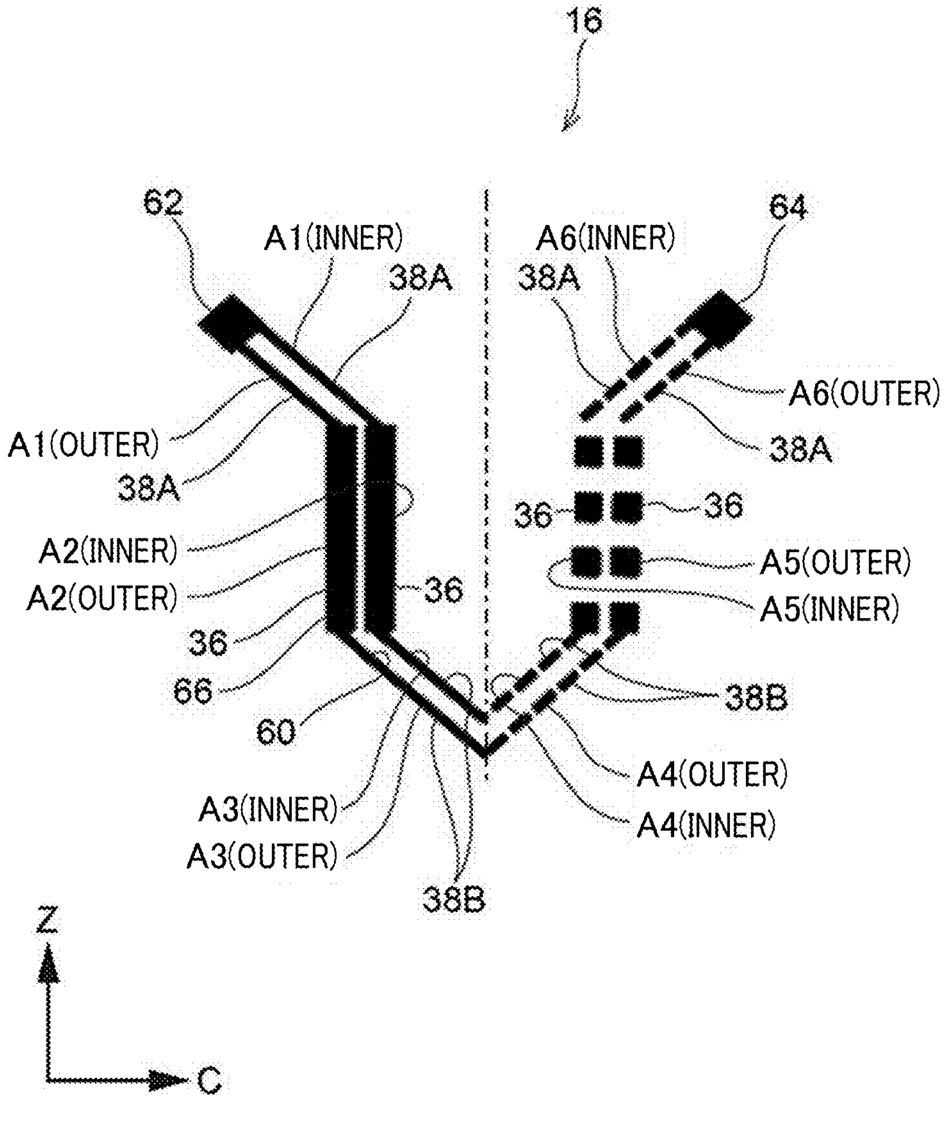
FIG. 6 is a view which illustrates a coil of a coil assembly in the first embodiment.

FIG. 6 illustrates one of the coils 16 of the U-phase coil group 42U. When viewed in the thickness direction of the strip member 34, each of the coils 16 is shaped to have an open end which is disposed on a first width end portion of the strip member 34, in other words, faces in a first width direction (which will also be referred to below as a first axial direction) of the strip member 34 and a closed U-shaped or V-shaped end which is disposed on a second width end portion of the strip member 34 opposite the first width end portion, in other words, faces in a second width direction (which will also be referred to below as a second axial direction) of the strip member 34 which is opposite the first width direction.

Each of the coils 16 includes the first straight sections A1 and the second straight sections A2. The first straight sections A1 extend obliquely in the first circumferential direction (i.e., rightward direction in FIG. 6) and downward in the second axial direction (i.e., downward direction in FIG. 6). The second straight sections A2 extend in the second axial direction from second ends of the first straight sections A1 which face both in the first circumferential direction and in the second axial direction. Each of the coils 16 also includes the third straight sections A3 and the fourth straight sections A4. The third straight sections A3 extend obliquely in the first circumferential direction and downward in the second axial direction from second ends of the second straight sections A2 which are opposite first ends thereof leading to the first straight sections A1. The fourth straight sections A4 extend obliquely in the first circumferential direction and upward in the first axial direction (i.e., upward direction in FIG. 6) from second ends of the third straight sections A3 which are opposite first ends thereof leading to the second straight sections A2. Each of the coils 16 also includes the fifth straight sections A5 and the sixth straight sections A6. The fifth straight sections A5 extend in the first axial direction (i.e., upward direction in FIG. 6) from second ends of the fourth straight sections A4 which are opposite first ends thereof leading to the third straight sections A3. The sixth straight sections A6 extend obliquely in the first circumferential direction and upward in the first axial direction from first ends of the fifth straight sections A5 which are opposite second ends thereof leading to the fourth straight sections A4.

The strip member 34, as illustrated in FIG. 4, has the first surface 34A (i.e., an inner peripheral surface of the coil assembly 32) and the second surface 34B (i.e., an outer peripheral surface of the coil assembly 32). The first straight sections A1, the second straight sections A2, and the third straight sections A3 are, as can be seen in FIGS. 4 and 6, formed on the first surface 34A of the strip member 34. The fourth straight sections A4, the fifth straight sections A5, and the sixth straight sections A6 are formed on the second surface 34B of the strip member 34. The third straight sections A3 and the fourth straight sections A4 are electrically connected together using via holes or through-holes (not shown) formed in the strip member 34. Portions of the coils 16 disposed on the first surface 34A of the strip member 34 are denoted by solid lines, while portions of the coils 16 disposed on the second surface 34B of the strip member 34 are denoted by broken lines.

In the following discussion, each of the second straight sections A2 and the fifth straight sections A5 will also be referred to as the vertical section 36. Each of the first straight sections A1 and the sixth straight sections A6 will also be referred to as the coil end 38A which constitutes a first one of coil ends of the coil assembly 32. Each of the third straight sections A3 and the fourth straight sections A4 will also be referred to as the joint 38B that is a second one of the coil ends of the coil assembly 32. In this embodiment, a circumferential interval between the first straight sections A1 and the sixth straight sections A6 increases gradually in the first axial direction.

The first straight sections A1 of each of the coils 16 includes two separate sections arranged away from each other in the circumferential direction of the coil assembly 32. The same is true for the second straight sections A2, the third straight sections A3, the fourth straight sections A4, the fifth straight sections A5, and the sixth straight sections A6. In other words, the first straight sections A1 includes an outer section and an inner section which is separate from the outer section in a direction perpendicular to the length direction of the first straight sections A1. The same applies to the second straight sections A2, the third straight sections A3, the fourth straight sections A4, the fifth straight sections A5, and the sixth straight sections A6. In the following discussion, one of the first straight sections A1 which is located on the inner side of the coil 16, as viewed in the circumferential direction of the coil assembly 32, will also be referred to as the first inner straight section A1, while one of the first straight sections A1 which is located on the outer side of the coil 16, as viewed in the circumferential direction of the coil assembly 32, will also be referred to as the first outer straight section A1. Similarly, one of the second straight sections A2 which is located on the inner side of the coil 16 will also be referred to as the second inner straight section A2, while one of the second straight sections A2 which is located on the outer side of the coil 16 will also be referred to as the second outer straight section A2. Similarly, one of the third straight sections A3 which is located on the inner side of the coil 16 will also be referred to as the third inner straight section A3, while one of the third straight sections A3 which is located on the outer side of the coil 16 will also be referred to as the third outer straight section A3. Similarly, one of the fourth straight sections A4 which is located on the inner side of the coil 16 will also be referred to as the fourth inner straight section A4, while one of the fourth straight sections A4 which is located on the outer side of the coil 16 will also be referred to as the fourth outer straight section A4. Similarly, one of the fifth straight sections A5 which is located on the inner side of the coil 16 will also be referred to as the fifth inner straight section A5, while one of the fifth straight sections A5 which is located on the outer side of the coil 16 will also be referred to as the fifth outer straight section A5. Similarly, one of the sixth straight sections A6 which is located on the inner side of the coil 16 will also be referred to as the sixth inner straight section A6, while one of the sixth straight sections A6 which is located on the outer side of the coil 16 will also be referred to as the sixth outer straight section A6.

The first inner straight section A1 and the first outer straight section A1 are, as clearly illustrated in FIG. 6, disposed away from each other through the slit 60 and extend parallel to each other.

Similarly, the second inner straight section A2 and the second outer straight section A2 are disposed away from each other through the slit 60 and extend parallel to each other. The second inner straight section A2 and the second outer straight section A2 lead directly to the first inner straight section A1 and the first outer straight section A1, respectively.

The third inner straight section A3 and the third outer straight section A3 are disposed away from each other through the slit 60 and extend parallel to each other. The third inner straight section A3 and the third outer straight section A3 lead directly to the second inner straight section A2 and the second outer straight section A2, respectively.

The fourth inner straight section A4 and the fourth outer straight section A4 are disposed away from each other through the slit 60 and extend parallel to each other. The fourth inner straight section A4 and the fourth outer straight section A4 lead directly to the third inner straight section A3 and the third outer straight section A3.

The fifth inner straight section A5 and the fifth outer straight section A5 are disposed away from each other through the slit 60 and extend parallel to each other. The fifth inner straight section A5 and the fifth outer straight section A5 lead directly to the fourth inner straight section A4 and the fourth outer straight section A4, respectively.

The sixth inner straight section A6 and the sixth outer straight section A6 are disposed away from each other through the slit 60 and extend parallel to each other. The sixth inner straight section A6 and the sixth outer straight section A6 lead directly to the fifth inner straight section A5 and the fifth outer straight section A5, respectively.

The second end of the first inner straight section A1 which is opposite the first end thereof leading to the second inner straight section A2 and the second end of the first outer straight section A1 which is opposite the first end thereof leading to the second outer straight section A2 are connected together using the first connecting section 62. The first connecting section 62 is formed by a portion of the first straight sections A1. The second end of the sixth inner straight section A6 which is opposite the first end thereof leading to the fifth inner straight section A5 and the second end of the sixth outer straight section A6 which is opposite the first end thereof leading to the fifth outer straight section A5 are connected together through the second connecting section 64. The second connecting section 64 is formed by a portion of the sixth straight sections A6. This creates the closed circuit 66 made up of a first line and a second line which are electrically connected together using the first connecting section 62 and the second connecting section 64. The first line includes the first outer straight section A1, the second outer straight section A2, the third outer straight section A3, the fourth outer straight section A4, the fifth outer straight section A5, and the sixth outer straight section A6. The second line includes the first inner straight section A1, the second inner straight section A2, the third inner straight section A3, the fourth inner straight section A4, the fifth inner straight section A5, and the sixth inner straight section A6.

Figure 7:
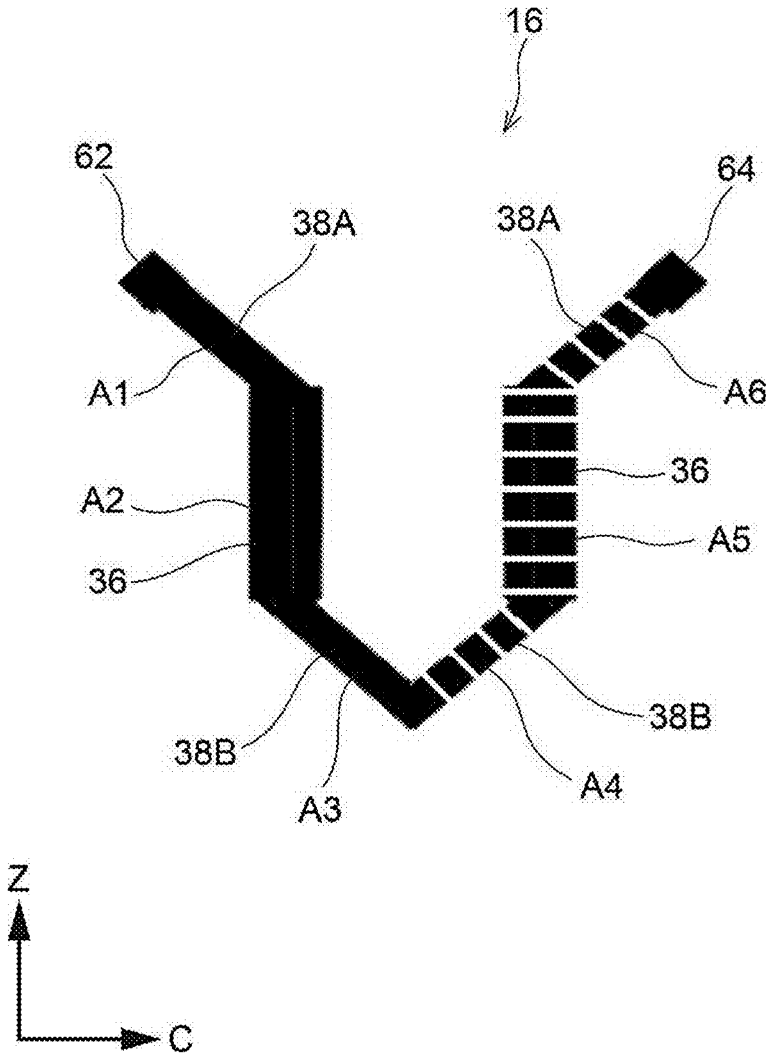
FIG. 7 is a view which illustrates a coil of a coil assembly which is different in structure from that in FIG. 6.

The above discussion exemplifies each of the coils 16 which is made up of pairs of conductive sections where the conductive sections of each pair are separate from each through the slit 60 in the circumferential direction, but however, the coils 16 may alternatively be designed to have another structure. For instance, the conductive sections of each of the coils 16 may be, as illustrated in FIG. 7, made of a single conductor. Alternatively, each of the coils 16 may be made of a plurality of sets of conductive sections where each set includes three or more conductive sections which are separate from each other through the slits 60 in the circumferential direction. Alternatively, each of the coils 16 may be designed to have at least a portion made of two or more conductive sections separate from each other through the slit(s) 60 in the circumferential direction.

Figure 8:
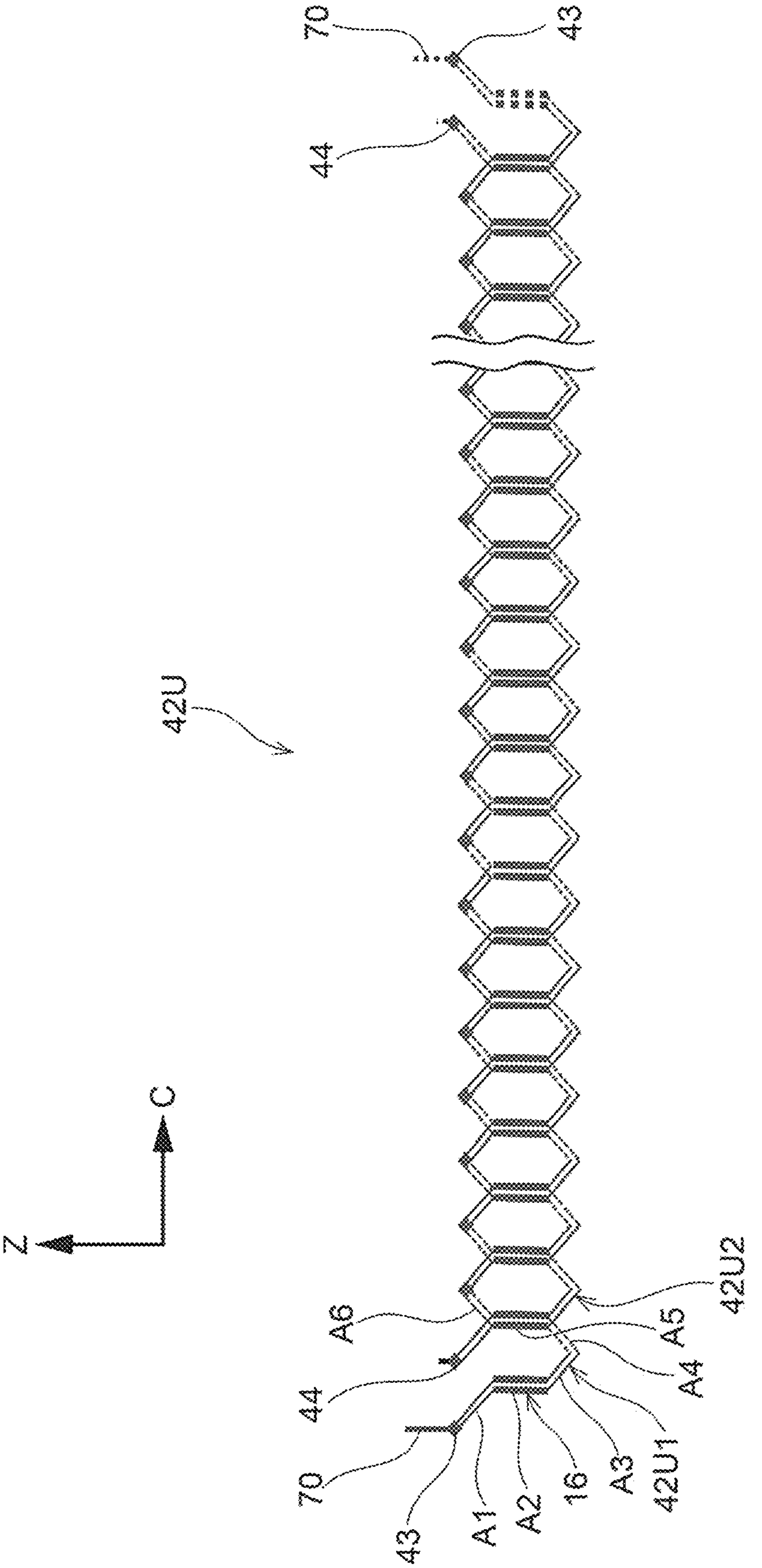
FIG. 8 is a development view which illustrates U-phase coils.
Figure 9:
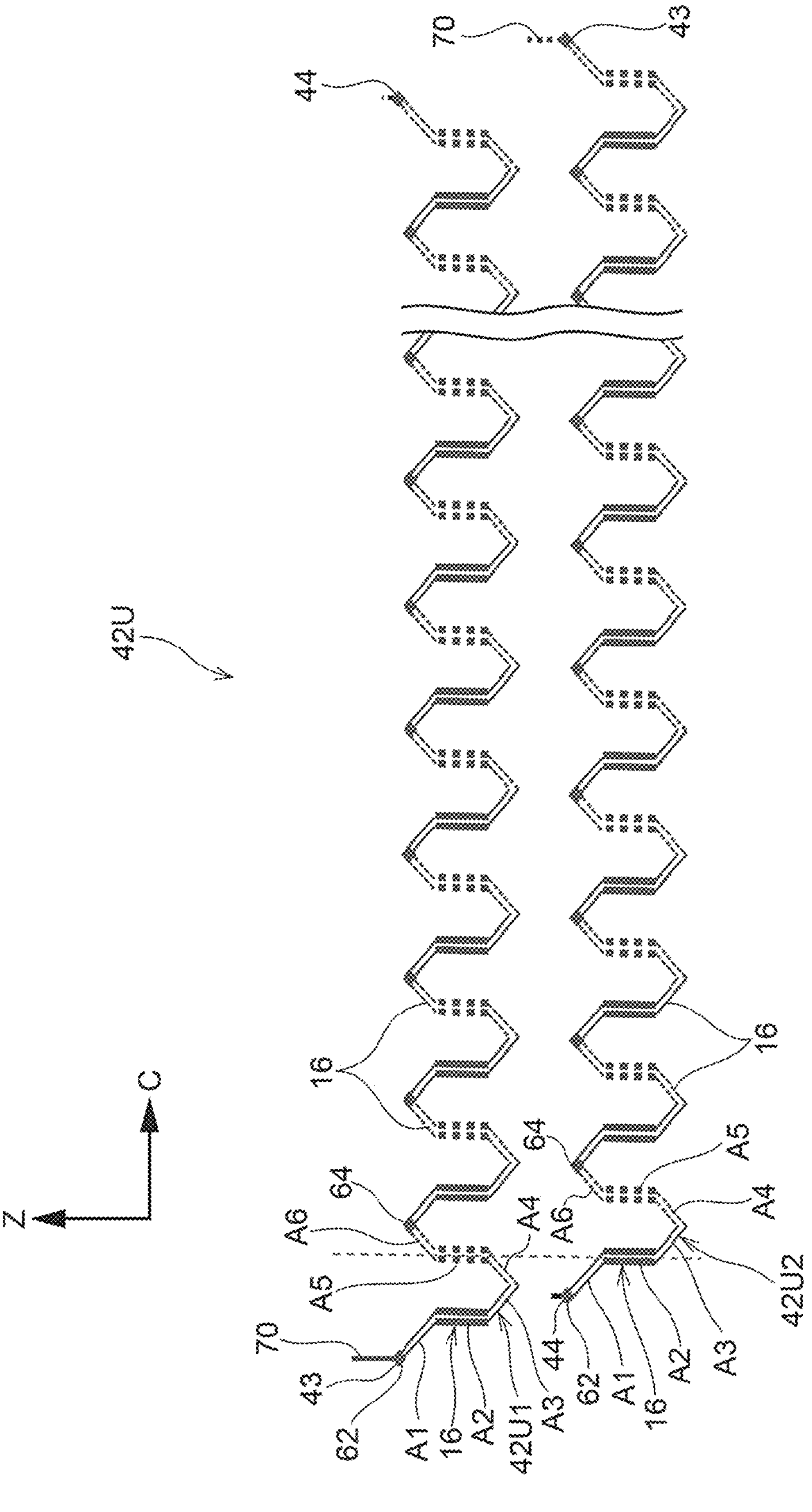
FIG. 9 is a development view which illustrates a first U-phase coil group and a second U-phase coil group as being offset from each other in an axial direction of a coil assembly.

Each of the U-phase coils 16 is, as can be seen in FIGS. 8 and 9, configured to have the same structure as illustrated in FIG. 6. In other words, most of the U-phase coils 16 have substantially the same structure.

FIG. 8 illustrates the U-phase coils 16 disposed on the strip member 34. A first half of the U-phase coils 16 are, as can be seen in FIG. 8, connected in series with each other, which will also be referred to below as the first U-phase coil group 42U1. A second half of the U-phase coils 16 are also connected in series with each other, which will also be referred to below as the second U-phase coil group 42U2. The U-phase coil group 42U is, therefore, made up of the first U-phase coil group 42U1 and the second U-phase coil group 42U2. The first U-phase coil group 42U1 and the second U-phase coil group 42U2 are connected in parallel to each other.

FIG. 9 illustrates the first U-phase coil group 42U1 and the second U-phase coil group 42U2 as being offset from each other in the axial direction for the ease of visibility. The coils 16 belonging to the first U-phase coil group 42U1 are, as can be seen in the drawing, arranged at predetermined intervals away from each other in the circumferential direction of the coil assembly 32. The first connecting section 62 of a first one of a respective circumferentially adjacent two of the coils 16 and the second connecting section 64 of a second one of the adjacent coils 16 are connected together through a via hole or a through-hole.

Similarly, the coils 16 of the second U-phase coil group 42U2 are arranged at predetermined intervals away from each other in the circumferential direction of the coil assembly 32. The first connecting section 62 of a first one of a respective circumferentially adjacent two of the coils 16 and the second connecting section 64 of a second one of the adjacent coils 16 are connected together through a via hole or a through-hole.

The coils 16 of the second U-phase coil group 42U2 are offset from those of the first U-phase coil group 42U1 in the first circumferential direction of the coil assembly 32. The offset interval between each of the coils 16 of second U-phase coil group 42U2 and an adjacent one of the coils 16 of the first U-phase coil group 42U1 is identical with an interval between the second straight sections A2 and the fifth straight sections A5 of each of the coils 16 in the circumferential direction. This causes the fifth straight sections A5 of the coils 16 of the first U-phase coil group 42U1 and the second straight sections A2 of the coils 16 of the second U-phase coil group 42U2 to overlap each other through the strip member 34 in the radial direction of the coil assembly 32. Similarly, the second straight sections A2 of the coils 16 of the first U-phase coil group 42U1 and the fifth straight sections A5 of the coils 16 of the second U-phase coil group 42U2 overlap each other through the strip member 34 in the radial direction of the coil assembly 32.

When the coil assembly 32 (i.e., the first U-phase coil group 42U1) is, as illustrated in FIG. 9, developed in the circumferential direction thereof, the first connecting section 62 of an outermost one of the coils 16 of the first U-phase coil group 42U1 in the second circumferential direction is used as the input terminal 43 connecting with a power supply. The second connecting section 64 of an outermost one of the coils 16 of the first U-phase coil group 42U1 which faces in the first circumferential direction is used as the neutral point 44.

The first connecting section 62 of an outermost one of the coils 16 of the second U-phase coil group 42U2 which faces in the second circumferential direction is used as the neutral point 44. The second connecting section 64 of an outermost one of the coils 16 of the second U-phase coil group 42U2 which faces in the first circumferential direction is used as the input terminal 43 connecting with the power supply.

Although not described in detail using reference symbols, the V-phase coil group 42V is, as can be seen in FIG. 4, identical in structure with the U-phase coil group 42U except for those described below. The V-phase coil group 42V includes a first V-phase coil group and a second V-phase coil group. The first V-phase coil group and the second V-phase coil group are connected in parallel to each other.

The first connecting section 62 of an outermost one of the coils 16 of the first V-phase coil group which faces in the second circumferential direction is used as the neutral point 44. The second connecting section 64 of an outermost one of the coils 16 of the first V-phase coil group which faces in the first circumferential direction is used as the input terminal 43 connecting with the power supply. The first connecting section 62 of an outermost one of the coils 16 of the second V-phase coil group which faces in the second circumferential direction is used as the input terminal 43 connecting with the power supply. The second connecting section 64 of an outermost one of the coils 16 of the second V-phase coil group which faces in the first circumferential direction is used as the neutral point 44.

The W-phase coil group 42W is identical in structure with the U-phase coil group 42U. The W-phase coil group 42W includes a first W-phase coil group and a second W-phase coil group. The first W-phase coil group and the second W-phase coil group are connected in parallel to each other. The first connecting section 62 of an outermost one of the coils 16 of the first W-phase coil group which faces in the second circumferential direction is used as the input terminal 43 connecting with the power supply. The second connecting section 64 of an outermost one of the coils 16 of the second W-phase coil group which faces in the first circumferential direction is used as the neutral point 44. The first connecting section 62 of an outermost one of the coils 16 of the second W-phase coil group which faces in the second circumferential direction is used as the neutral point 44. The second connecting section 64 of an outermost one of the coils 16 of the second W-phase coil group which faces in the first circumferential direction is used as the input terminal 43 connecting with the power supply.

The coils 16 of the V-phase coil group 42V are, as can be seen in FIG. 4, offset from those of the U-phase coil group 42U in the first circumferential direction. The coils 16 of the W-phase coil group 42W are offset from those of the V-phase coil group 42V in the first circumferential direction. This causes the U-phase coils 16, the V-phase coils 16, and the W-phase coils 16 to be arranged away from each other in this order in the circumferential direction of the coil assembly 32. In the following discussion, the U-phase coils 16 will also be referred to as the coils 16U. The V-phase coils 16 will also be referred to as the coils 16V. The W-phase coils 16 will also be referred to as the coils 16W.

The input conductors 70 are arranged to extend in the first axial direction from the input terminals 43 of the coils 16U, 16V, and 16W which are disposed on a second end portion of the strip member 34 which faces in the second circumferential direction. Similarly, the input conductors 70 are also arranged to extend in the first axial direction from the input terminals 43 of the coils 16U, 16V, and 16W which are disposed on a first end portion of the strip member 34 which faces in the first circumferential direction.

The neutral points 44 of the coils 16U, 16V, and 16W which are arranged on the second end portion of the strip member 34 are electrically connected together using the neutral point-connecting pattern 72 formed on the strip member 34. Similarly, the neutral points 44 of the coils 16U, 16V, and 16W which are arranged on the first end portion of the strip member 34 are electrically connected together using the neutral point-connecting pattern 72 formed on the strip member 34.

Figure 10:
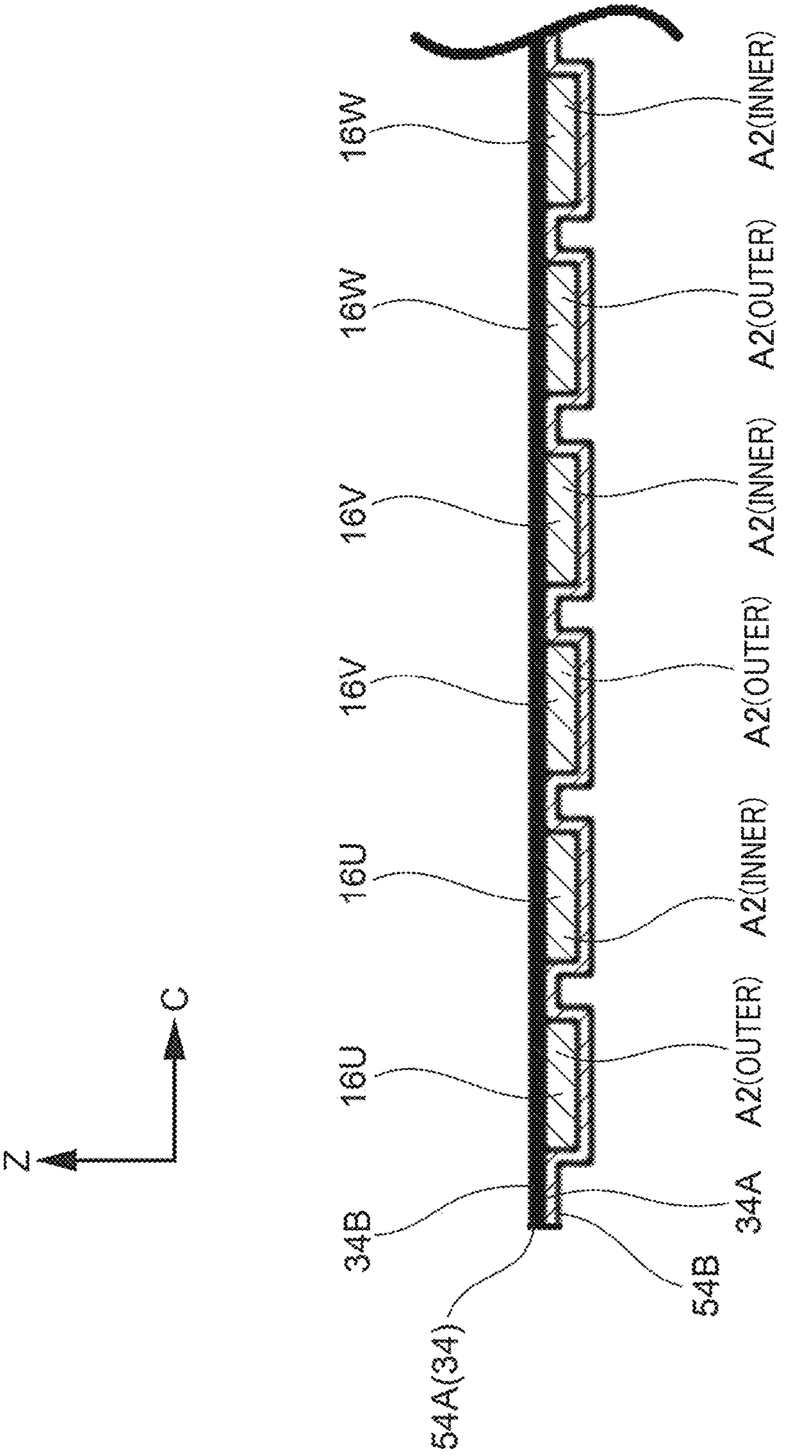
FIG. 10 is a sectional view which illustrates a portion of a coil assembly.

FIG. 10 is a sectional view, as taken along the line A-A in FIG. 4, which partially illustrates the strip member 34 and the second straight sections A2 and the fifth straight sections A5 of the coils 16. FIG. 10 shows a cross section of the second end portion of the strip member 34. The second outer straight section A2 of the coil 16U, the second inner straight section A2 of the coil 16U, the second outer straight section A2 of the coil 16V, the second inner straight section A2 of the coil 16V, the second outer straight section A2 of the coil 16W, and the second inner straight section A2 of the coil 16W are formed in this order on the first surface 34A of the second end portion of the strip member 34.

Figure 11:
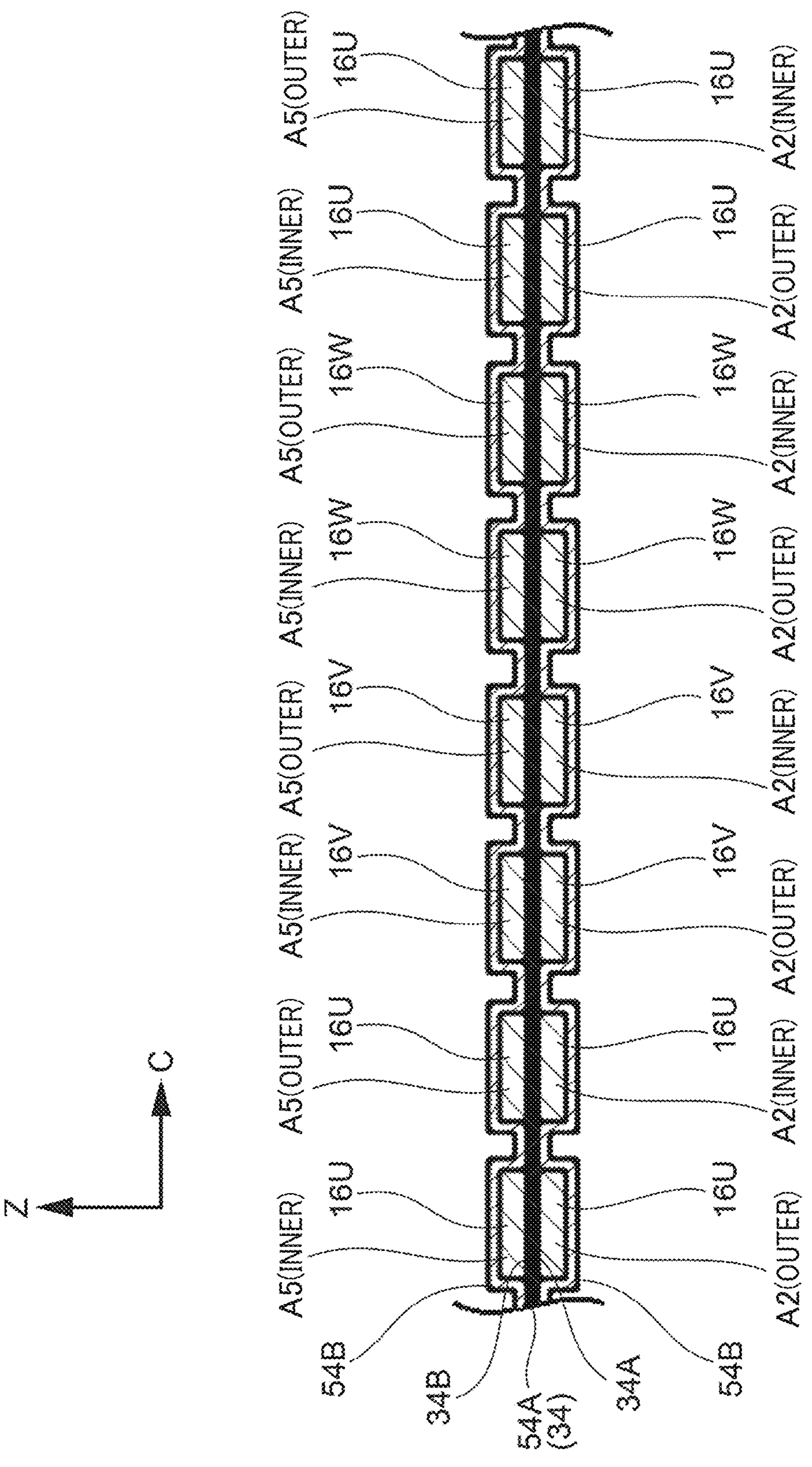
FIG. 11 is a sectional view which illustrates a portion of a coil assembly.

FIG. 11 is a sectional view, as taken along the line A-A in FIG. 4, which partially illustrates the strip member 34 and the second straight sections A2 and the fifth straight sections A5 of the coils 16. The sectional view of FIG. 11 shows a region denoted by an arrow E in FIG. 4. The second outer straight section A2 of the coil 16U, the second inner straight section A2 of the coil 16U, the second outer straight section A2 of the coil 16V, the second inner straight section A2 of the coil 16V, the second outer straight section A2 of the coil 16W, the second inner straight section A2 of the coil 16W, the second outer straight section A2 of the coil 16U, and the second inner straight section A2 of the coil 16U are formed in this order on the first surface 34A of the strip member 34. Further, the fifth inner straight section A5 of the coil 16U, the fifth outer straight section A5 of the coil 16U, the fifth inner straight section A5 of the coil 16V, the fifth outer straight section A5 of the coil 16V, the fifth inner straight section A5 of the coil 16W, the fifth outer straight section A5 of the coil 16W, the fifth inner straight section A5 of the coil 16U, and the fifth outer straight section A5 of the coil 16U are formed in this order on the second surface 34B of the strip member 34.

Figure 12:
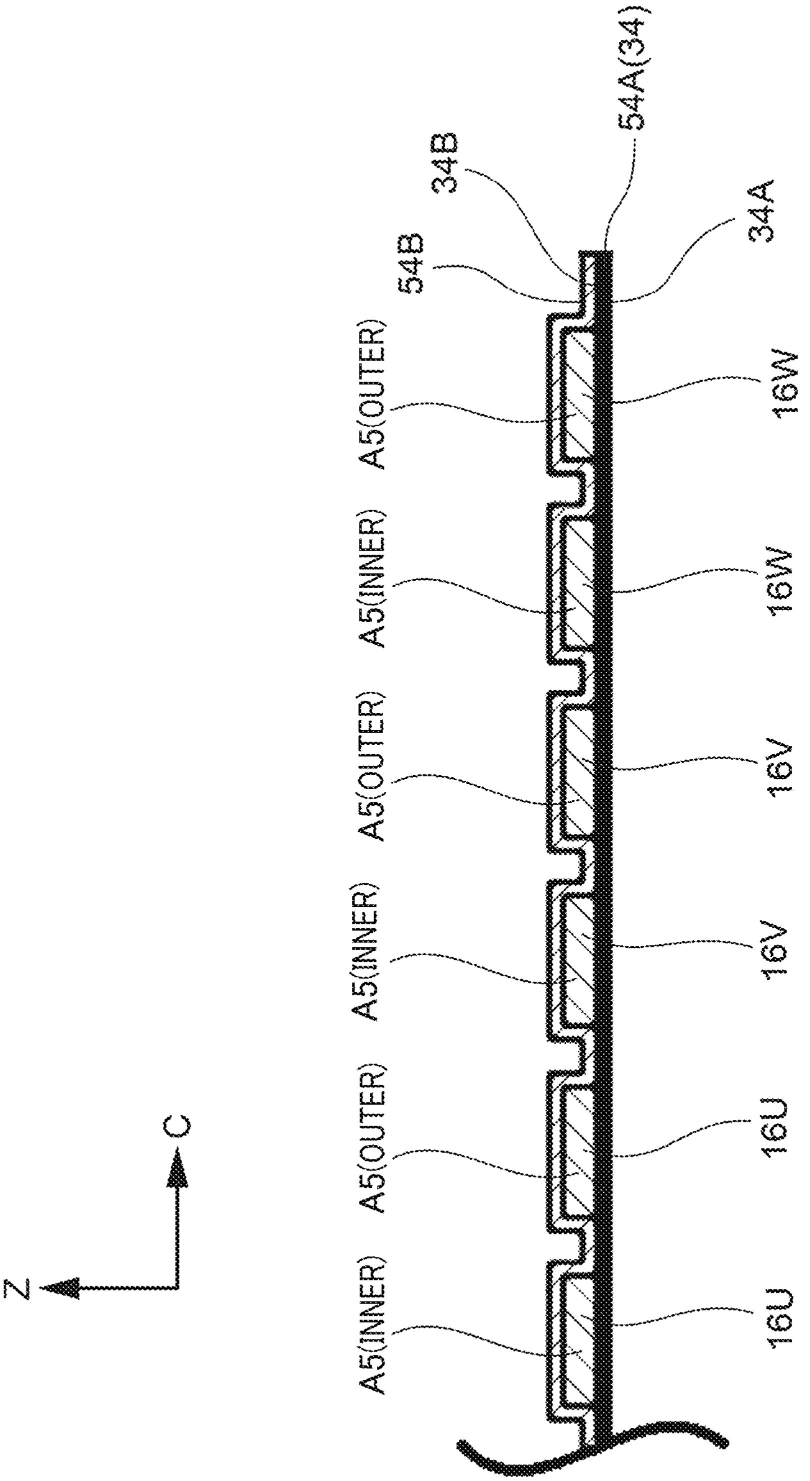
FIG. 12 is a sectional view which illustrates a portion of a coil assembly.

FIG. 12 is a sectional view, as taken along the line A-A in FIG. 4, which illustrates a portion of the strip member 34 and the second straight sections A2 and the fifth straight sections A5 of the coils 16. The sectional view of FIG. 12 shows the first end portion of the strip member 34 in the circumferential direction of the coil assembly 32. Specifically, the fifth inner straight section A5 of the coil 16U, the fifth outer straight section A5 of the coil 16U, the fifth inner straight section A5 of the coil 16V, the fifth outer straight section A5 of the coil 16V, the fifth inner straight section A5 of the coil 16W, and the fifth outer straight section A5 of the coil 16W are formed in this order on the second surface 34B of the second end portion of the strip member 34.

Figure 13:
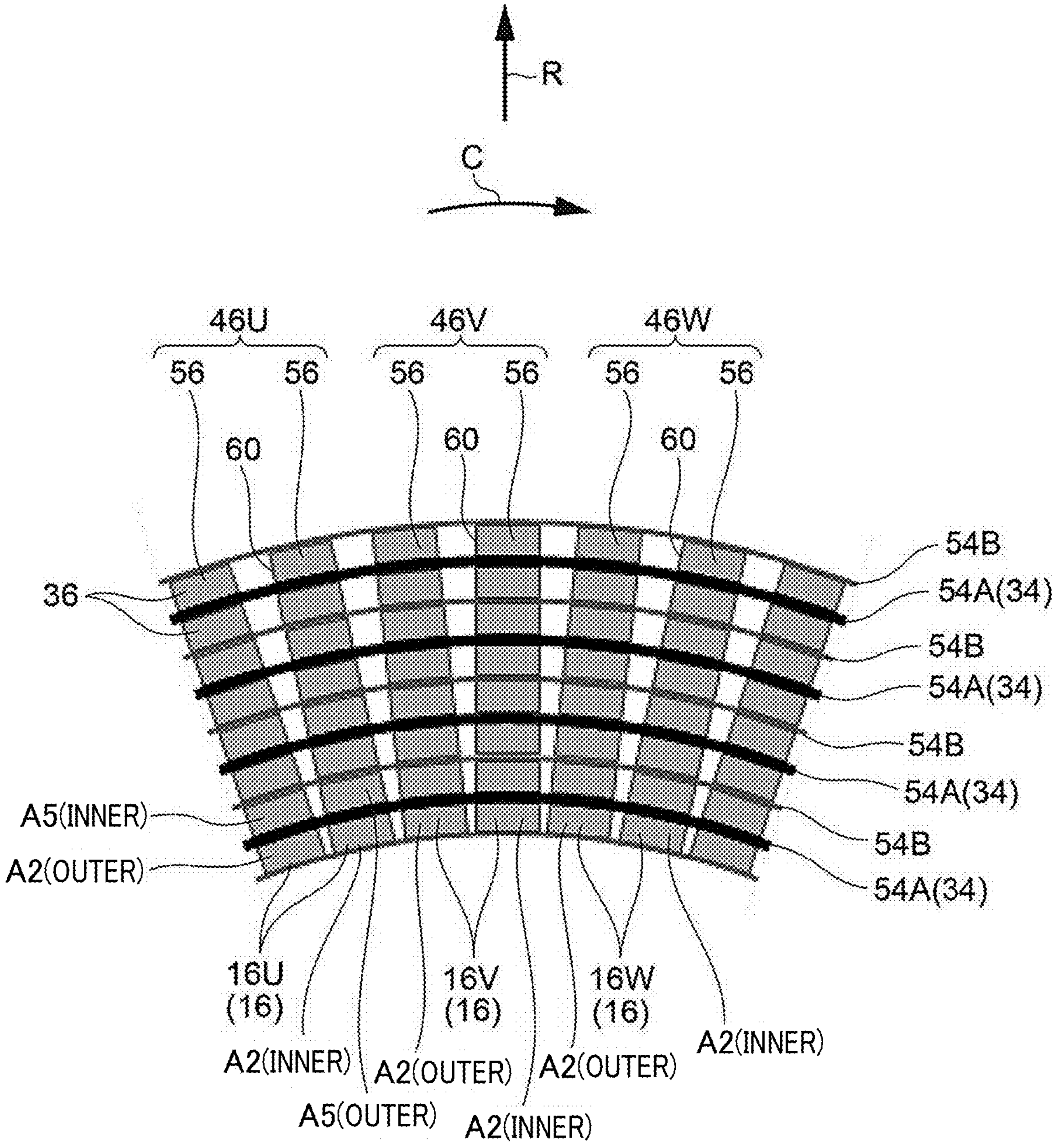
FIG. 13 is a sectional view of a coil assembly, as taken in a radial direction thereof.

The strip member 34 is, as described above, rolled several times in the circumferential direction of the coil assembly 32 to complete the closed circular shape of the strip member 34 on which the coils 16 are arranged at predetermined positions in the circumferential and radial directions of the coil assembly 32. FIG. 13 shows a portion of a cross section of the coil assembly 32, as taken in the radial direction of the coil assembly 23, with the rolled strip member 34. The cross section in FIG. 13 shows the vertical sections 36 of the coils 16 (see FIG. 6).

In the cross section in FIG. 13, the vertical sections 36 of the coils 16 are laid to radially overlap each other in the form of a plurality of stacks which are arranged at equal intervals away from each other in the circumferential direction of the coil assembly 32. The first insulating layer 54A or the second insulating layer 54B is disposed between a radially adjacent two of the vertical sections 36. The first insulating layers 54A is made of the strip member 34 by itself. Each of the first insulating layers 54A is made from, for example, polyimide or insulating paper. The second insulating layers 54B are, as can be seen in FIGS. 10 to 13, disposed on the strip member 34 and cover the coils 16. Each of the second insulating layers 54B is made of an insulating film or coating, such as polyimide coating film or varnish.

The stacks of the vertical sections 36 of the coils 16 which are, as described above in FIG. 13, are laid to overlap each other in the radial direction of the coil assembly 32 will also be referred to below as the vertical stacks 56. Specifically, the vertical stacks 56 in the illustrated portion of the coil assembly 32 includes a first stack of the second outer straight sections A2 of the coils 16U and the fifth inner straight sections A5 of the coils 16U, a second stack of the second inner straight sections A2 of the coils 16U and the fifth outer straight sections A5 of the coils 16U, a third stack of the second outer straight sections A2 of the coils 16V and the fifth inner straight sections A5 of the coils 16V, a fourth stack of the second inner straight sections A2 of the coils 16V and the fifth outer straight sections A5 of the coils 16V, a fifth stack of the second outer straight section A2 of the coils 16W and the fifth inner straight sections A5 of the coils 16W, and a sixth stack of the second inner straight section A2 of the coils 16W and the fifth outer straight sections A5 of the coils 16W.

The first and second stacks of the vertical stacks 56 in which radially inner ends of the coil assembly 32 are defined by the second outer straight section A2 and the second inner straight section A2 of the coils 16U form the U-phase conductor group 46U. Similarly, the third and fourth stacks of the vertical stacks 56 in which radially inner ends of the coil assembly 32 are defined by the second outer straight section A2 and the second inner straight section A2 of the coils 16V form the V-phase conductor group 46V. Similarly, the fifth and sixth stacks of the vertical stacks 56 in which radially inner ends of the coil assembly 32 are defined by the second outer straight section A2 and the second inner straight section A2 of the coils 16W form the W-phase conductor group 46W.

Operation of and Beneficial Advantages Offered by this Embodiment

The operation of and beneficial advantages provided by this embodiment will be described below.

In operation, the U-phase coil group 42U, the V-phase coil group 42V, and the W-phase coil group 42W of the stator 14 of the motor 10, as illustrated in FIGS. 1, 2, 4, and 5, are electrically energized in sequence to produce a rotating magnetic field in the stator 14, so that the rotor 12 rotates.

The coil assembly 32, as described above, includes the strip member 34 made from electrically insulating material and the coils 16 formed on the strip member 34. The strip member 34 is rolled in the circumferential direction of the coil assembly 32 in the form of a plurality of turns to have the coils 16 arranged at predetermined locations in the circumferential and radial directions of the coil assembly 2. This layout enables the size of the coil assembly 32 to be minimized in the radial direction, thereby reducing a total size of the motor 10.

Each of the coils 16 is, as can be seen in FIGS. 4, 8, and 9, of a V-shape, as viewed in the thickness direction of the strip member 34. The first connecting section 62 of a first one of a circumferentially adjacent two of the coils 16 and the second connecting section 64 of a second one of the circumferentially adjacent coils 16 are electrically connected together on one of axially opposed ends of the strip member 34 (i.e., the coil assembly 32). This layout eliminates the need for an additional electrical conductor(s) disposed on the strip member 34 to connect between the coils 16, thereby enabling the size of the coil assembly 32 to be minimized in the axial direction, which reduces a total size of the motor 10. The elimination of the need for the additional electrical conductor(s) minimizes the length of a conductor(s) extending through the coils 16, thereby reducing an overall electrical resistance of the coils 16. This enhances the degree of torque outputted by the motor 10.

Each of the coils 16 is, as clearly illustrated in FIGS. 6 and 13, formed using two elongated conductors which are separate from each other through the slit 60 in the circumferential direction of the coil assembly 32. This structure enables the vertical stacks 56 to have decreased areas facing the magnets 18 of the rotor 12, thereby reducing an eddy current which is produced by radial magnetic flux in the vertical stacks 56, which enhances the degree of torque outputted by the motor 10.

The circumferential interval between the first straight sections A1 and the sixth straight sections A6 of each of the coils 16, as can be seen in FIGS. 6 and 9, gradually increases in the first axial direction of the coil assembly 32 (i.e., upward direction in FIG. 6), thereby facilitating the ease with which the circumferentially adjacent coils 16 are connected together at the ends of the second straight sections A2 and the fifth straight sections A5.

The coils 16 of each of the U-phase coil group 42U, the V-phase coil group 42V, and the W-phase coil group 42W are, as described above, laid to overlap each other in the radial direction in the form of the vertical stacks 56. This structure enables the number of stacked layers of each of the coils 16 to be controlled to produce substantially the same beneficial advantages as those offered by controlling the number of turns of typical coils.

Second Embodiment

The motor 10 according to the second embodiment will be described below. The same reference numbers or symbols as those in the first embodiment will refer to the same parts, and explanation thereof in detail will be omitted here.

Figure 14:
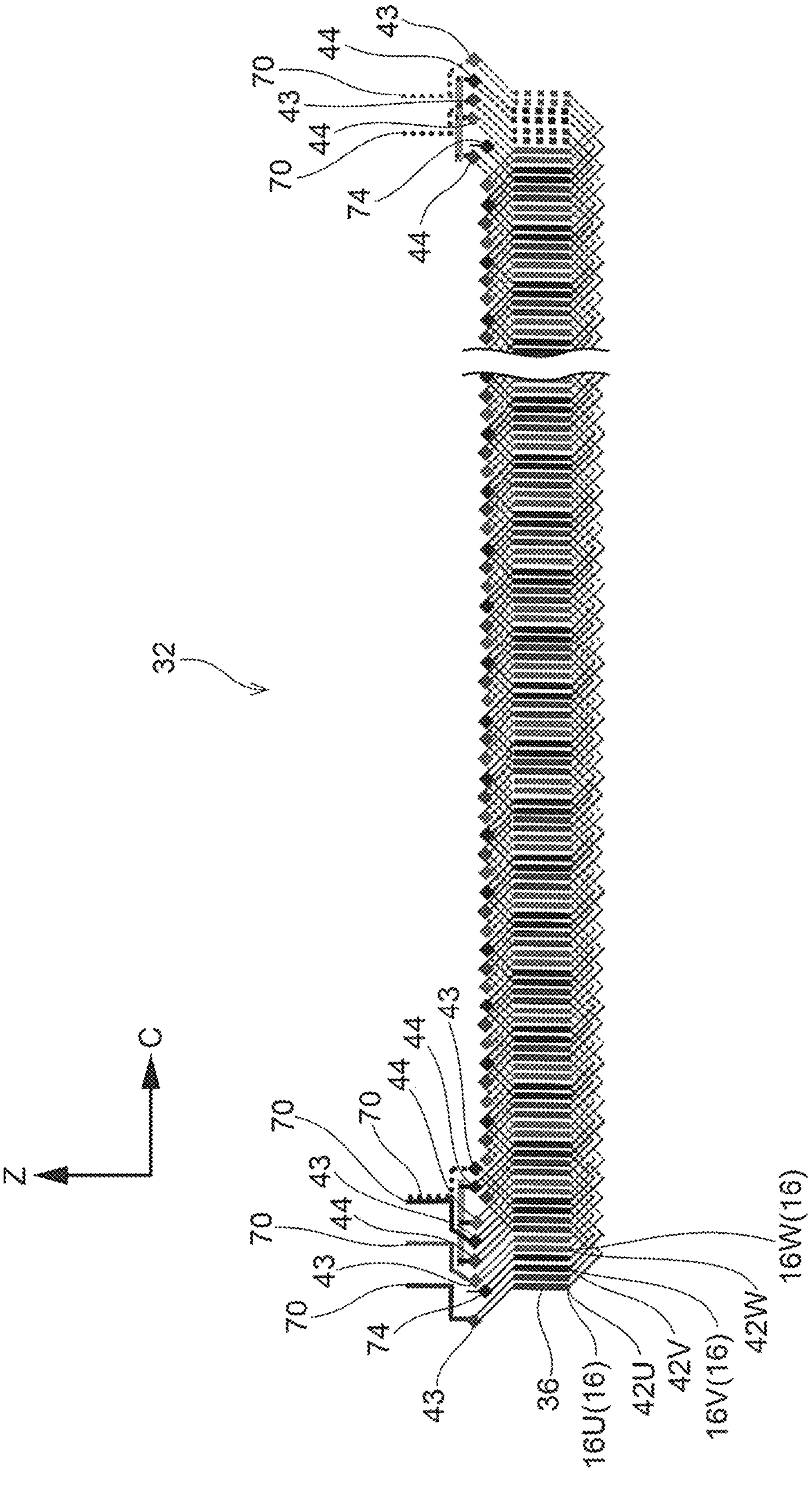
FIG. 14 is a development view which illustrates a coil assembly according to the second embodiment.

FIG. 14 illustrates the coil assembly 32 of the motor 10 in the second embodiment. For the sake of simplicity, FIG. 14 omits the strip member 34. The motor 10 in this embodiment is identical in structure with that in the first embodiment except for the structure of the V-phase coil group 42V.

Figure 15:
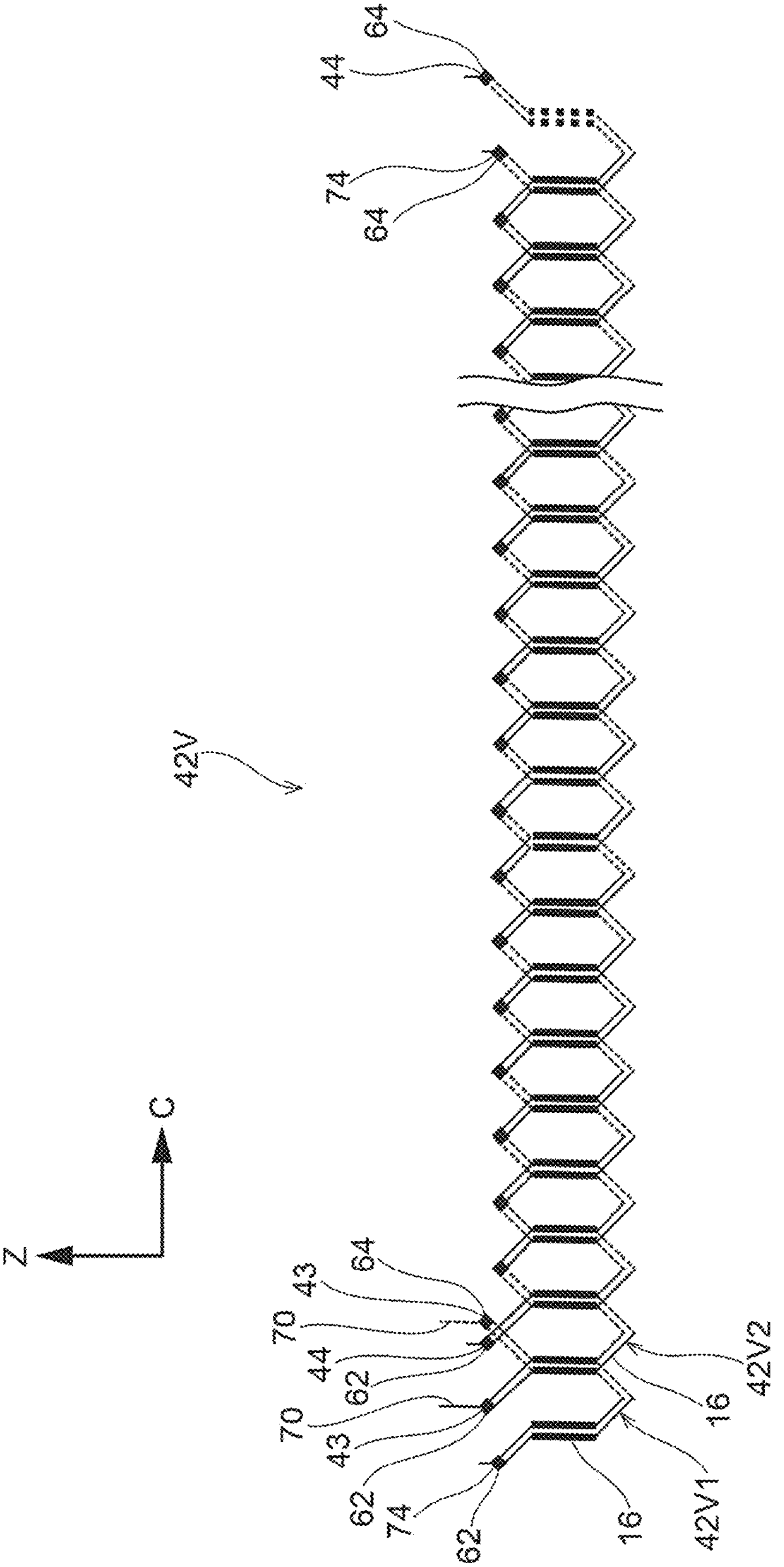
FIG. 15 is a development view which illustrates V-phase coils.

Specifically, the first connecting section 62 of one of the coils 16 of the first V-phase coil group 42V1 which is located on the outermost side of the strip member 34 facing in the second circumferential direction, as shown in FIG. 15, is used as the inter-coil connector 74. The second connecting section 64 of one of the coils 16 of the first V-phase coil group 42V1 which is located on the outermost side of the strip member 34 facing in the second circumferential direction, as viewed in FIG. 15, is used as the input terminal 43 connecting with the power supply. The first connecting section 62 of the second one of the coils 16 of the first V-phase coil group 42V1 from the outermost side of the strip member 34 (i.e., the coil assembly 32), as viewed in FIG. 15, in the second circumferential direction, as viewed in FIG. 15, is used as the neutral point 44. The first connecting section 62 of one of the coils 16 of the second V-phase coil group 42V2 which is located on the outermost side of the strip member 34 facing in the second circumferential direction, as viewed in FIG. 15, is used as the input terminal 43 connecting with the power supply.

The second connecting section 64 of an outermost one of the coils 16 of the first V-phase coil group 42V1 which faces in the first circumferential direction is used as the inter-coil connector 74. The inter-coil connector 74 is connected to the first connecting section 62 (i.e., the inter-coil connector 74) of the outermost one of the coils 16 of the first V-phase coil group 42V1 which faces in the second circumferential direction. The second connecting section 64 of the outermost one of the coils 16 of the second V-phase coil group 42V2 which faces in the first circumferential direction is used as the neutral point 44.

As compared with the coil assembly 32 of the motor 10 in the first embodiment (see FIG. 4), the structure in the second embodiment, as can be seen in FIGS. 14 and 15, enables the input terminals 43 and the input conductors 70 of the V-phase coils 16 to be concentrated on the end portion of the strip member 34 which faces in the second circumferential direction. In other words, the structure in this embodiment, unlike the coil assembly 32 of the motor 10 in the first embodiment (see FIG. 4), prevents the input terminals 43 and the input conductors 70 of the V-phase coils 16 from being arranged on the end portion of the strip member 34 which faces in the first circumferential direction. This avoids intersection of the input conductors 70 extending from the input terminals 43 of the V-phase coils 16 with the input conductors 70 extending from the input terminals 43 of the U-phase coils 16 and the W-phase coils 16.

Third Embodiment

The motor 10 according to the third embodiment will be described below. The same reference numbers or symbols as those in the first embodiment will refer to the same parts, and explanation thereof in detail will be omitted here.

Figure 16:
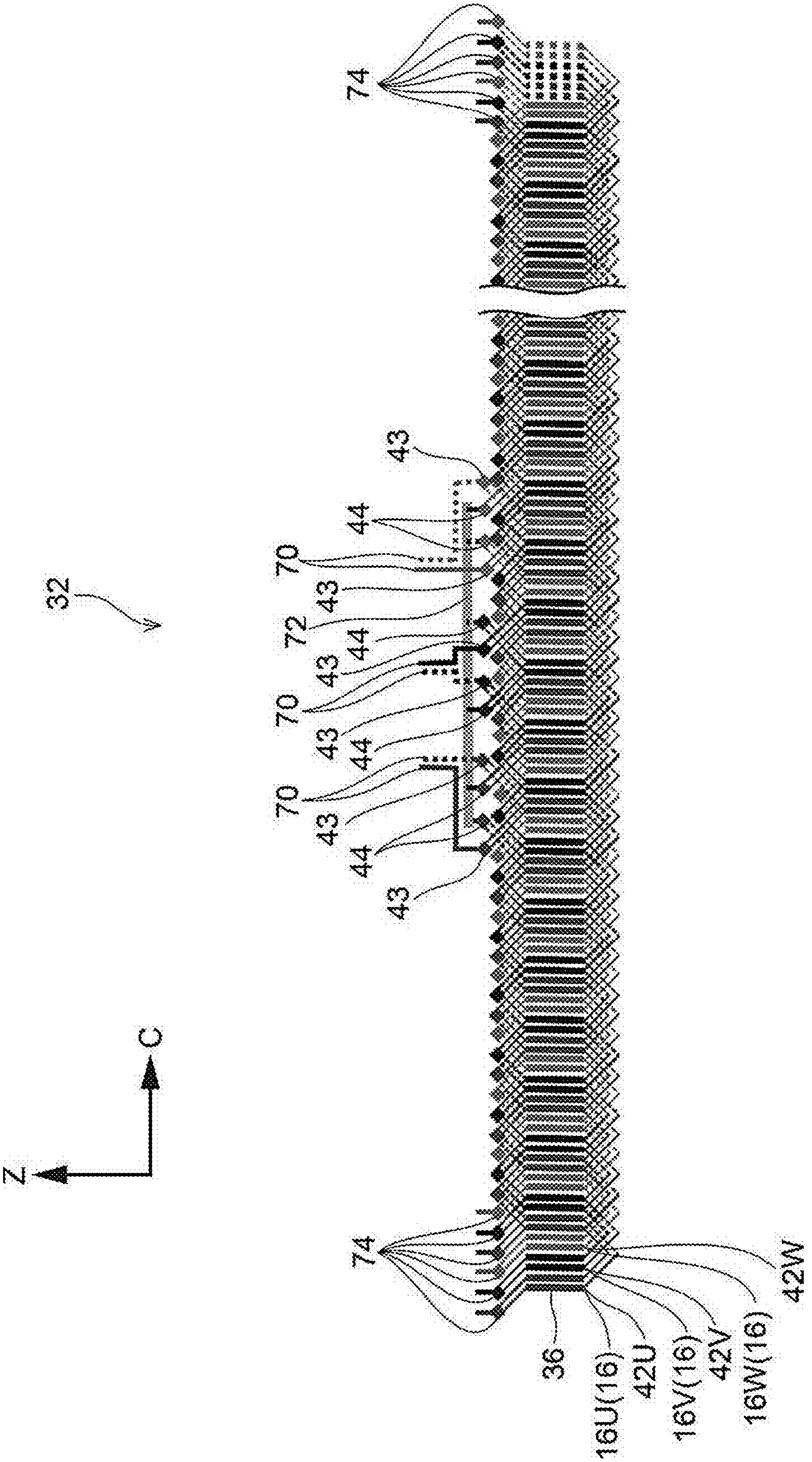
FIG. 16 is a development view which illustrates a coil assembly of a motor according to the third embodiment.

FIG. 16 illustrates the coil assembly 32 of the motor 10 in the third embodiment. For the sake of simplicity, FIG. 16 omits the strip member 34. The motor 10 in this embodiment is different in structure from the first embodiment only in that the input terminals 43 and the neutral points 44 are collected in a circumferentially intermediate portion of the strip member 34 (see FIG. 4).

Figure 17:
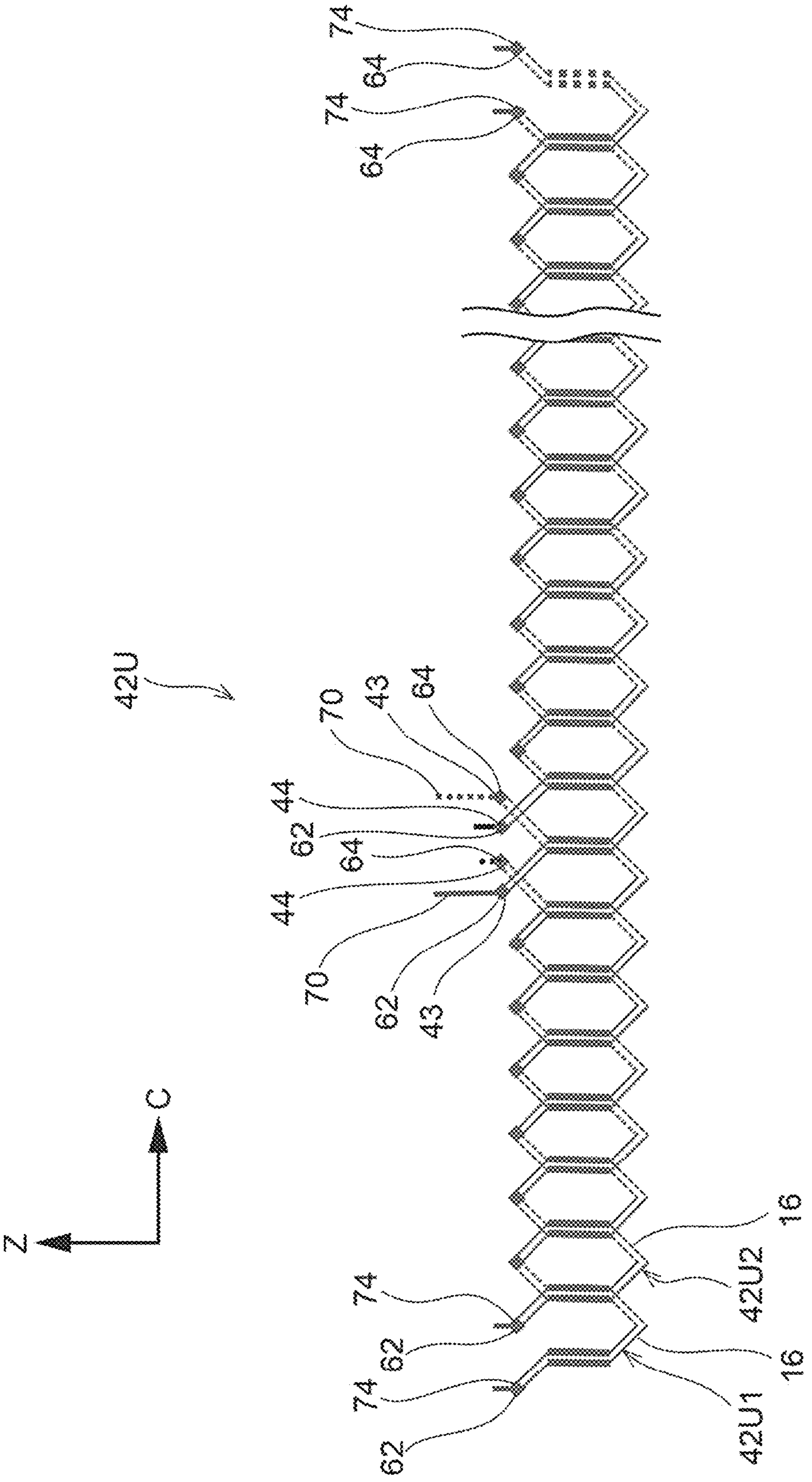
FIG. 17 is a development view which illustrates U-phase coils.

The first connecting section 62 of an outermost one of the coils 16 of the first U-phase coil group 42U1 in the second circumferential direction is, as can be seen in FIG. 17, used as the inter-coil connector 74. The second connecting section 64 of an outermost one of the coils 16 of the first U-phase coil group 42U1 in the first circumferential direction is used as the inter-coil connector 74. The inter-coil connector 74 is connected to the first connecting section 62 (i.e., the inter-coil connector 74) of an outermost one of the coils 16 of the first U-phase coil group 42U1 in the second circumferential direction.

The first connecting section 62 of an outermost one of the coils 16 of the second U-phase coil group 42U2 in the second circumferential direction is used as the inter-coil connector 74. The second connecting section 64 of an outermost one of the coils 16 of the second U-phase coil group 42U2 in the first circumferential direction is used as the inter-coil connector 74. The inter-coil connector 74 is connected to the first connecting section 62 (i.e., the inter-coil connector 74) of an outermost one of the coils 16 of the second U-phase coil group 42U2 in the second circumferential direction.

The second connecting section 64 of the fourth one of the coils 16 of the first U-phase coil group 42U1 from the outermost side of the strip member 34, as viewed in FIG. 17, in the second circumferential direction is used as the neutral point 44.

The first connecting section 62 of the fifth one of the coils 16 of the second U-phase coil group 42U2 from the outermost side of the strip member 34 in the second circumferential direction is used as the neutral point 44.

The first connecting section 62 of the fifth one of the coils 16 of the first U-phase coil group 42U1 from the outermost side of the strip member 34 in the second circumferential direction is used as the input terminal 43.

The second connecting section 64 of the fourth one of the coils 16 of the second U-phase coil group 42U2 from the outermost side of the strip member 34 in the second circumferential direction is used as the input terminal 43.

The V-phase coil group 42V is identical in structure with the U-phase coil group 42U except that the neutral point 44 and the input terminal 43 are, as can be seen in FIG. 16, in inverse relation to those in the U-phase coil group 42U. The W-phase coil group 42W is identical in structure with the U-phase coil group 42U.

In this embodiment, the input terminals 43 and the neutral points 44 of the U-phase, V-phase, and W-phase coils 16 are, as can be seen in FIGS. 16 and 17, collected in the circumferential intermediate portion of the strip member 34. Further, the inter-coil connectors 74 are arranged on the first and second end portions of the strip member 34 which are opposed to each other in the circumferential direction of the coil assembly 32. This facilitates the ease with which the inter-coil connectors 74 arranged on the first end portion of the strip member 34 are electrically connected to those arranged on the second end portion of the strip member 34 with the first end portion laid to overlap with the second end portion in the radial direction of the coil assembly 32.

Fourth Embodiment

The motor 10 according to the fourth embodiment will be described below. The same reference numbers or symbols as those in the first embodiment will refer to the same parts, and explanation thereof in detail will be omitted here.

Figure 18:
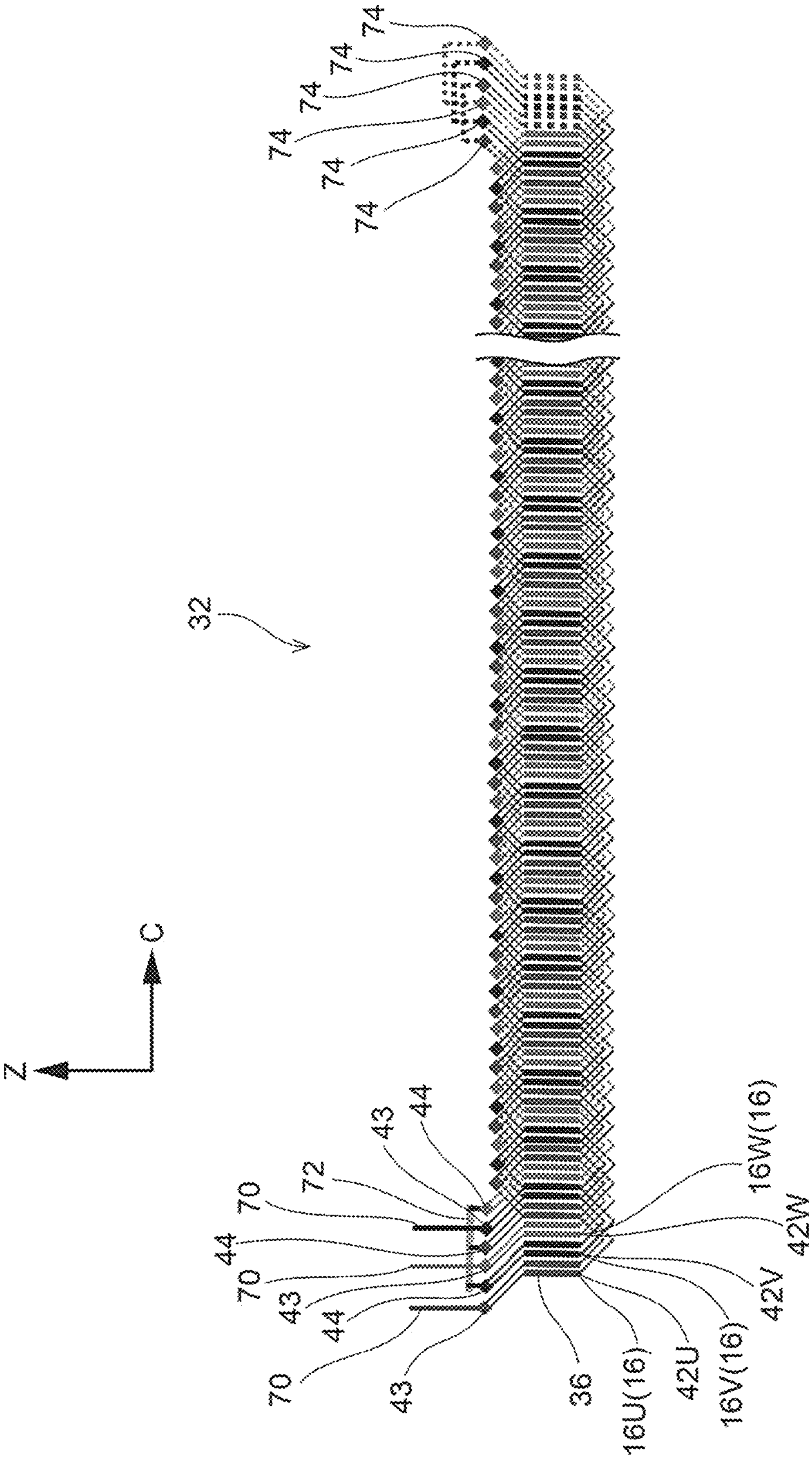
FIG. 18 is a development view which illustrates a coil assembly of a motor according to the fourth embodiment.

FIG. 18 illustrates the coil assembly 32 of the motor 10 in the fourth embodiment. For the sake of simplicity, FIG. 18 omits the strip member 34. The motor 10 in this embodiment is different in structure from the first embodiment only in that the coils 16 of the same phase are connected in series with each other.

Figure 19:
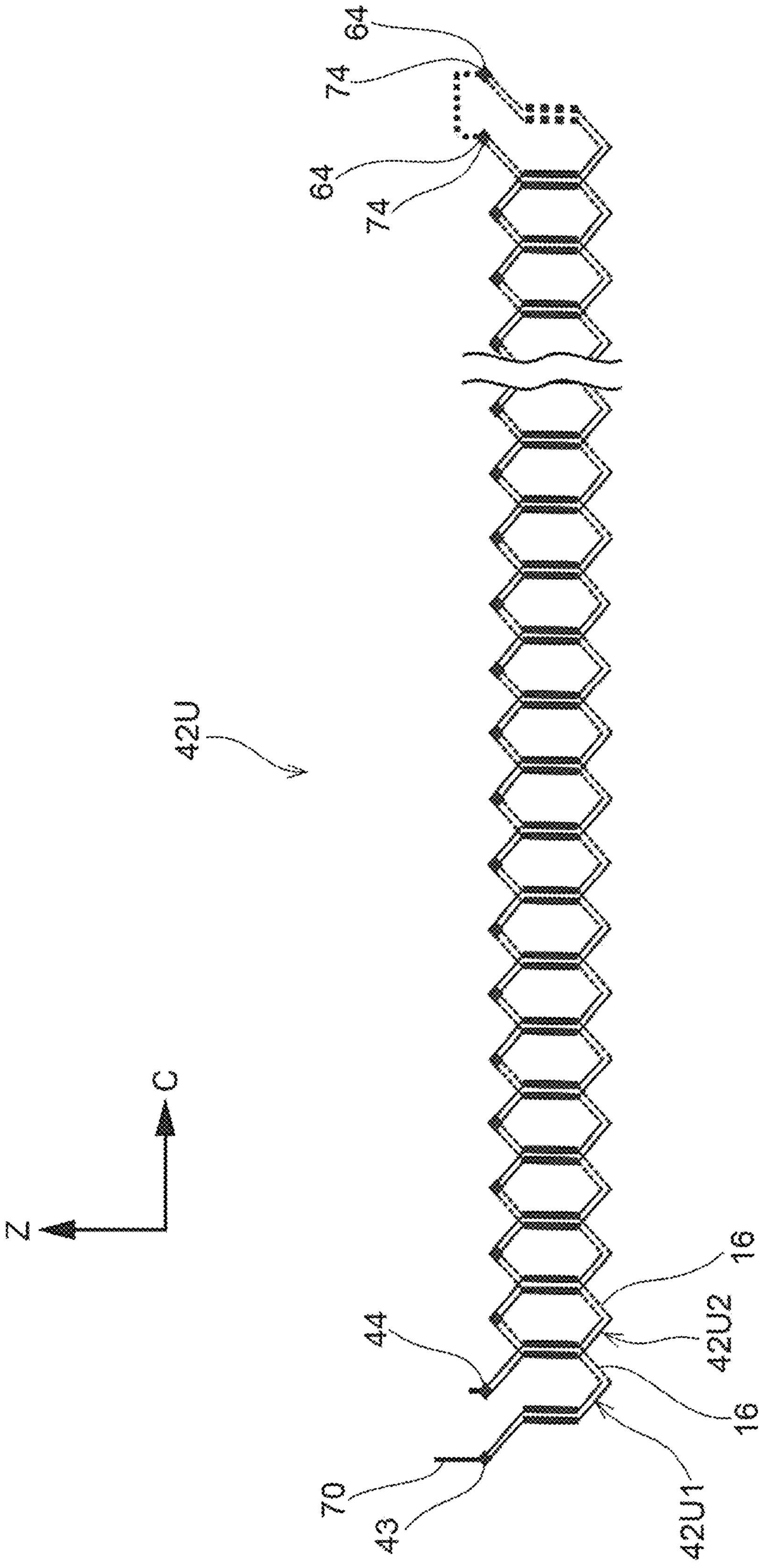
FIG. 19 is a development view which illustrates U-phase coils.
Figure 20:
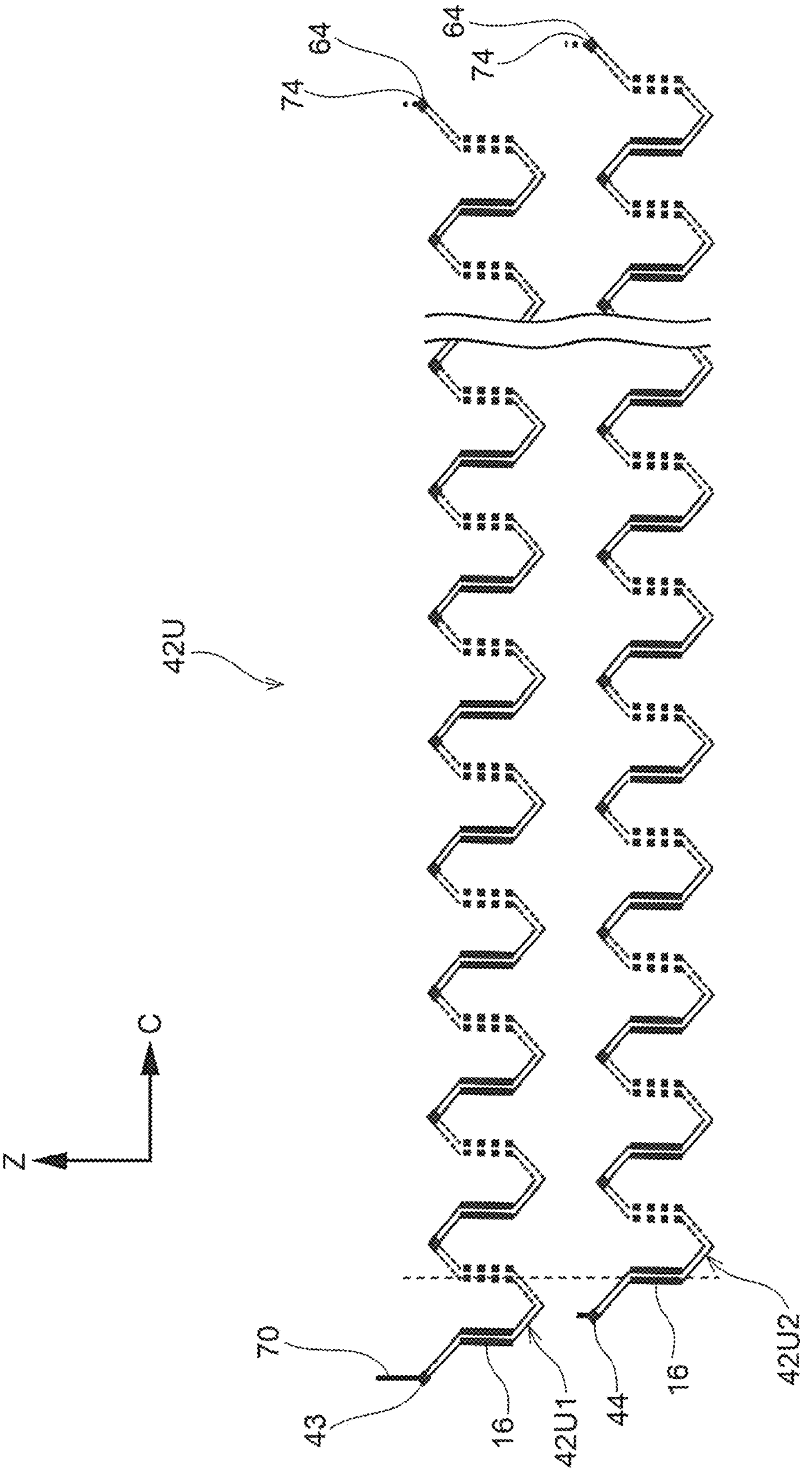
FIG. 20 is a development view which illustrates a first U-phase coil group and a second U-phase coil group as being offset from each other in an axial direction of a coil assembly.

The second connecting section 64 of an outermost one of the coils 16 of the first U-phase coil group 42U1 in the first circumferential direction is, as can be seen in FIGS. 19 and 20, used as the inter-coil connector 74. The second connecting section 64 of an outermost one of the coils 16 of the second U-phase coil group 42U2 in the first circumferential direction is used as the inter-coil connector 74. The inter-coil connector 74 is electrically connected to the second connecting section 64 (i.e., the inter-coil connector 74) of an outermost one of the coils 16 of the first U-phase coil group 42U1 in the first circumferential direction. This achieves a series connection of the coils 16 of the first U-phase coil group 42U1 and the second U-phase coil group 42U2. In other words, all the coils 16 of the U-phase coil group 42U are connected in series with each other.

The V-phase coil group 42V is identical in structure with the U-phase coil group 42U except that the neutral point 44 and the input terminal 43 are, as can be seen in FIG. 18, in inverse relation to those in the U-phase coil group 42U. The W-phase coil group 42W is identical in structure with the U-phase coil group 42U.

As apparent from the above discussion, the coil assembly 32 in the fourth embodiment is designed to have the coils 16 of the same phase which are electrically connected in series with each other.

Fifth Embodiment

The motor 10 according to the fifth embodiment will be described below. The same reference numbers or symbols as those in the first embodiment will refer to the same parts, and explanation thereof in detail will be omitted here.

Figure 21:
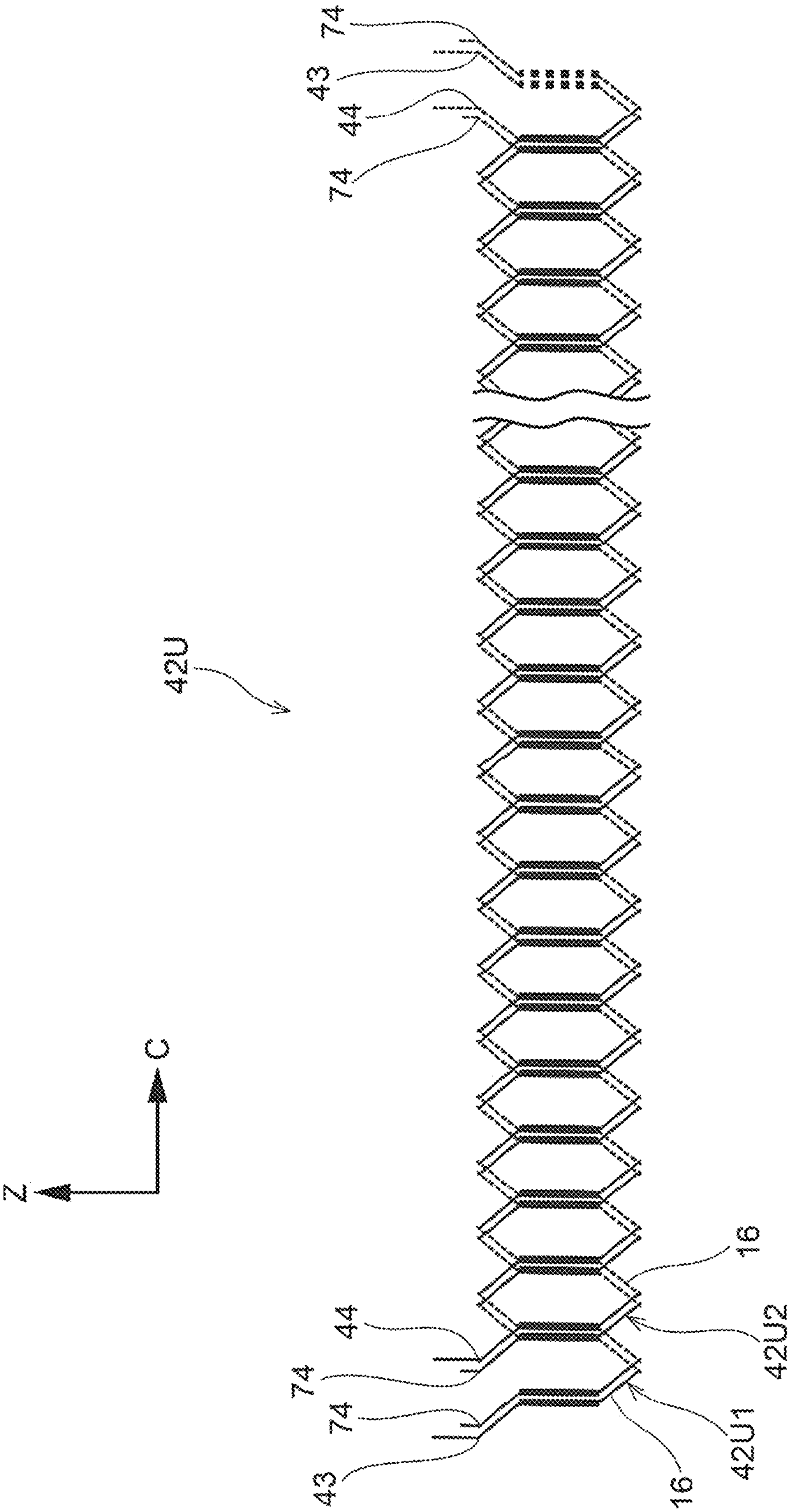
FIG. 21 is a development view which illustrates U-phase coils of a motor according to the fifth embodiment.
Figure 22:
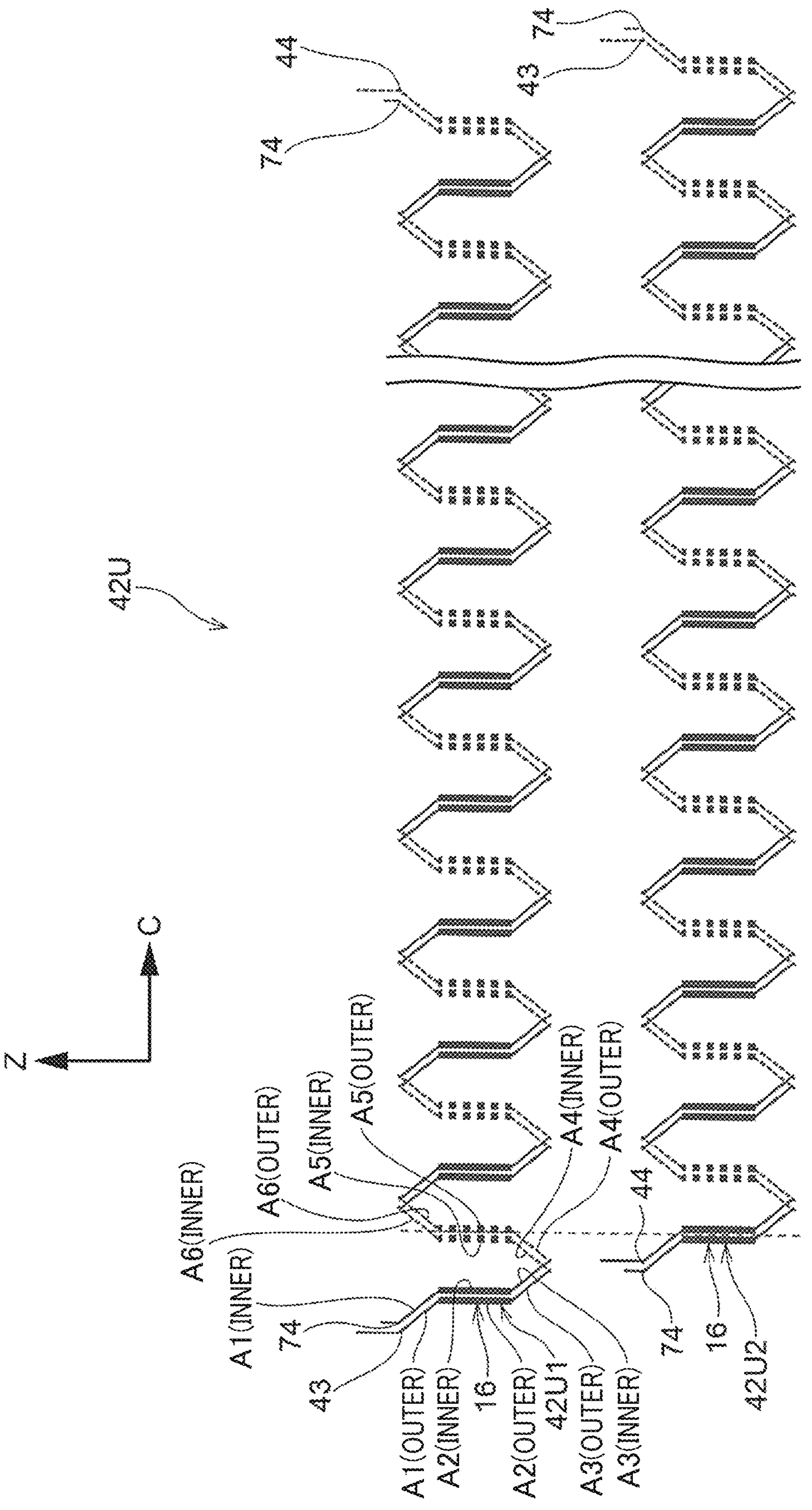
FIG. 22 is a development view which illustrates a first U-phase coil group and a second U-phase coil group as being offset from each other in an axial direction of a coil assembly.

FIG. 21 illustrates the U-phase coils 16 of the motor 10 in the fifth embodiment. FIG. 22 schematically illustrates the coils 16 of the first U-phase coil group 42U1 and the coils 16 of the second U-phase coil group 42U2 as being offset from each other in the axial direction of the coil assembly 32.

Each of the coils 16 in this embodiment are, as clearly illustrated in FIG. 22, arranged to have the third outer straight section A3 and the fourth inner straight section A4 connected together and also have the third inner straight section A3 and the fourth outer straight section A4 connected together.

The sixth inner straight section A6 of a first one of a circumferentially adjacent two of the coils 16 and the first outer straight section A1 of a second one of the circumferentially adjacent coils 16 are electrically connected together. The sixth outer straight section A6 of a first one of a circumferentially adjacent two of the coils 16 and the first inner straight section A1 of a second one of the circumferentially adjacent coils 16 are electrically connected together.

The second end of the first outer straight section A1 of an outermost one of the coils 16 of the first U-phase coil group 42U1 in the second circumferential direction, as viewed in FIG. 22, which is opposed to the first end thereof connecting with the second outer straight section A2 is used as the input terminal 43. The second end of the first inner straight section A1 of an outermost one of the coils 16 of the first U-phase coil group 42U1 in the second circumferential direction which is opposed to the first end thereof connecting with the second inner straight section A2 is used as the inter-coil connector 74.

The second end of the sixth inner straight section A6 of an outermost one of the coils 16 of the first U-phase coil group 42U1 in the first circumferential direction, as viewed in FIG. 22, which is opposed to the first end thereof connecting with the fifth inner straight section A5 is used as the inter-coil connector 74. The inter-coil connector 74 is connected to the second end (i.e., the inter-coil connector 74) of the first inner straight section A1 of an outermost one of the coils 16 of the first U-phase coil group 42U1 in the second circumferential direction which is opposed to the first end thereof connecting with the second inner straight section A2. The second end of the sixth outer straight section A6 of an outermost one of the coils 16 of the first U-phase coil group 42U1 in the first circumferential direction which is opposed to the first end thereof connecting with the fifth outer straight section A5 is used as the neutral point 44.

The second end of the first outer straight section A1 of an outermost one of the coils 16 of the second U-phase coil group 42U2 in the second circumferential direction, as viewed in FIG. 22, which is opposed to the first end thereof connecting with the second outer straight section A2 is used as the inter-coil connector 74. The second end of the first inner straight section A1 of an outermost one of the coils 16 of the second U-phase coil group 42U2 in the second circumferential direction which is opposed to the first end thereof connecting with the second inner straight section A2 is used as the neutral point 44.

The second end of the sixth inner straight section A6 of an outermost one of the coils 16 of the second U-phase coil group 42U2 in the first circumferential direction, as viewed in FIG. 22, which is opposed to the first end thereof connecting with the fifth inner straight section A5 is used as the input terminal 43. The second end of the sixth outer straight section A6 of an outermost one of the coils 16 of the second U-phase coil group 42U2 in the first circumferential direction, as viewed in FIG. 22, which is opposed to the first end thereof connecting with the fifth outer straight section A5 is used as the inter-coil connector 74. The inter-coil connector 74 is connected to the second end (i.e., the inter-coil connector 74) of the first outer straight section A1 of an outermost one of the coils 16 of the second U-phase coil group 42U2 in the second circumferential direction which is opposed to the first end thereof connecting with the second outer straight section A2.

The V-phase coil group 42V and the W-phase coil group 42W are identical in structure with the U-phase coil group 42U.

In operation, electrical current flows from a line extending from the first outer straight section A1 to the second outer straight section A2, to the third outer straight section A3, to the fourth inner straight section A4, to the fifth inner straight section A5, and to the sixth inner straight section A6 of one of the coils 16 to a line extending from the first inner straight section A1 to the second inner straight section A2, to the third inner straight section A3, to the fourth outer straight section A4, to the fifth outer straight section A5, and to the sixth outer straight section A6 of one of the coils 16.

Sixth Embodiment

The motor 10 according to the sixth embodiment will be described below. The same reference numbers or symbols as those in the first embodiment will refer to the same parts, and explanation thereof in detail will be omitted here.

Figure 23:
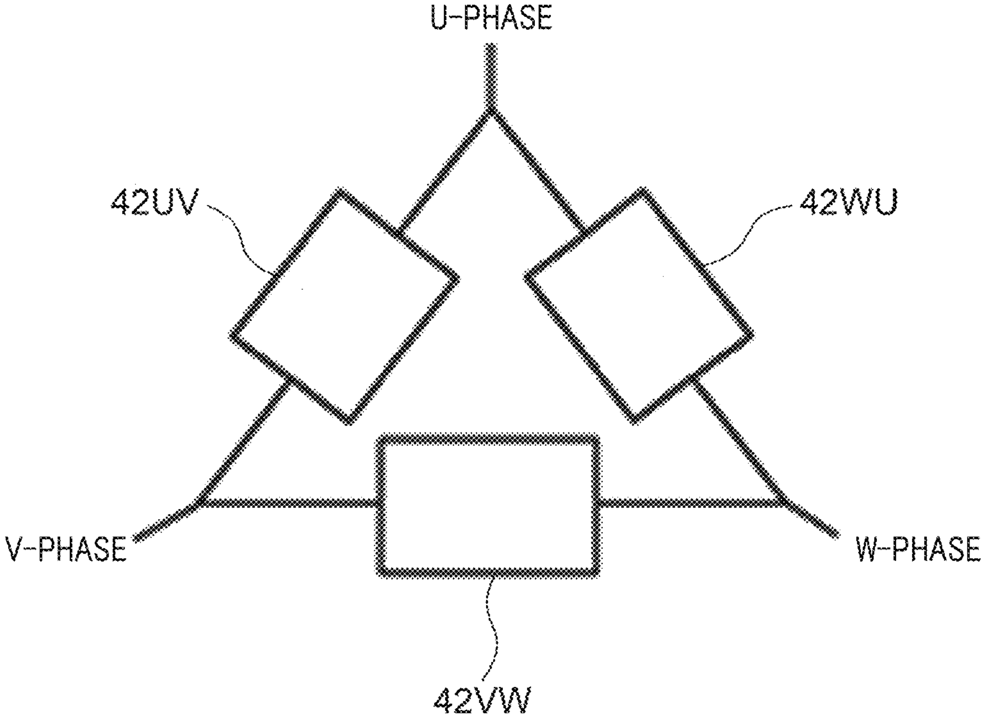
FIG. 23 is a view which shows a delta-connection of a coil assembly.
Figure 24:
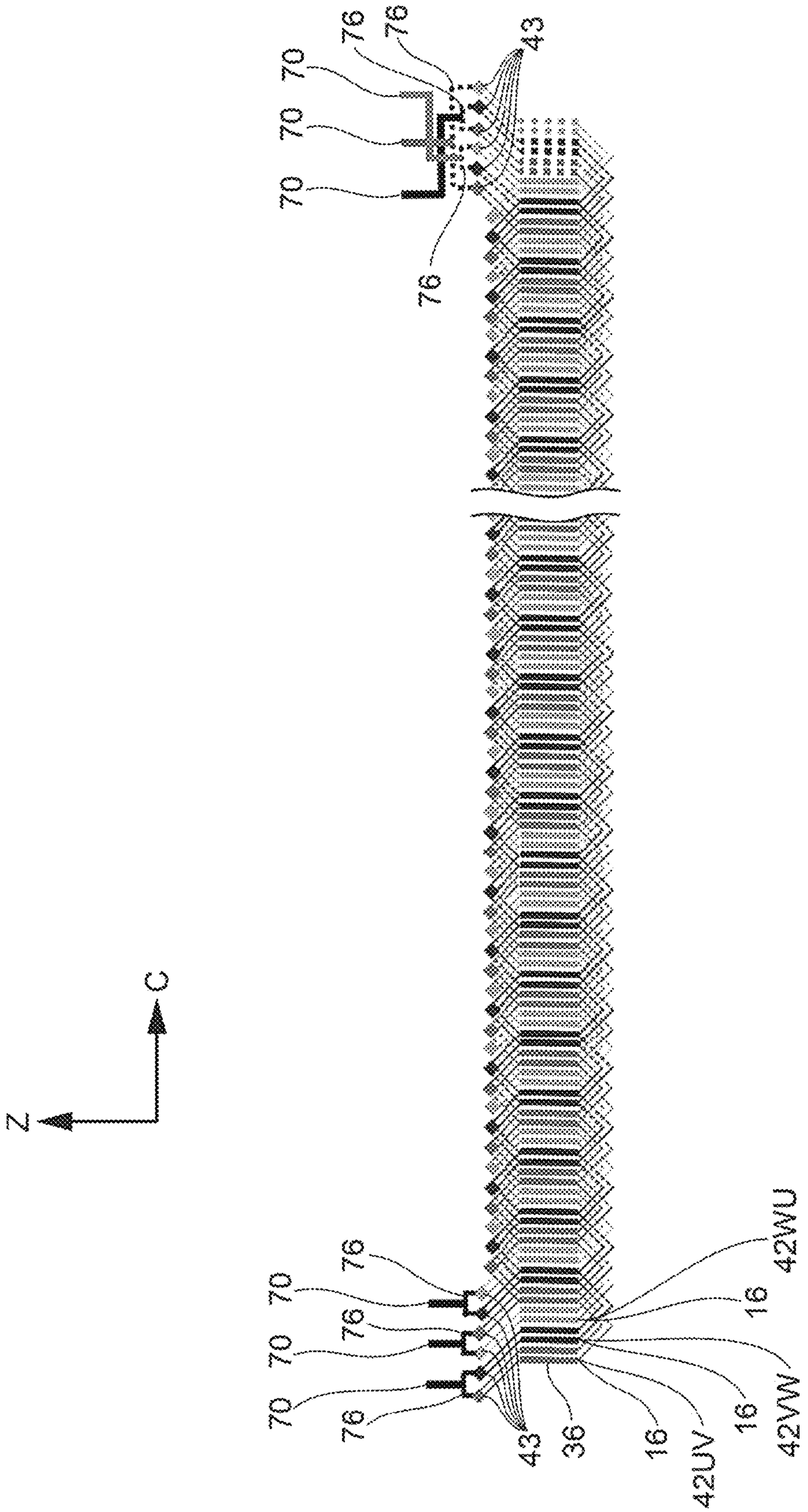
FIG. 24 is a development view which illustrates a coil assembly of a motor according to the sixth embodiment.
Figure 25:
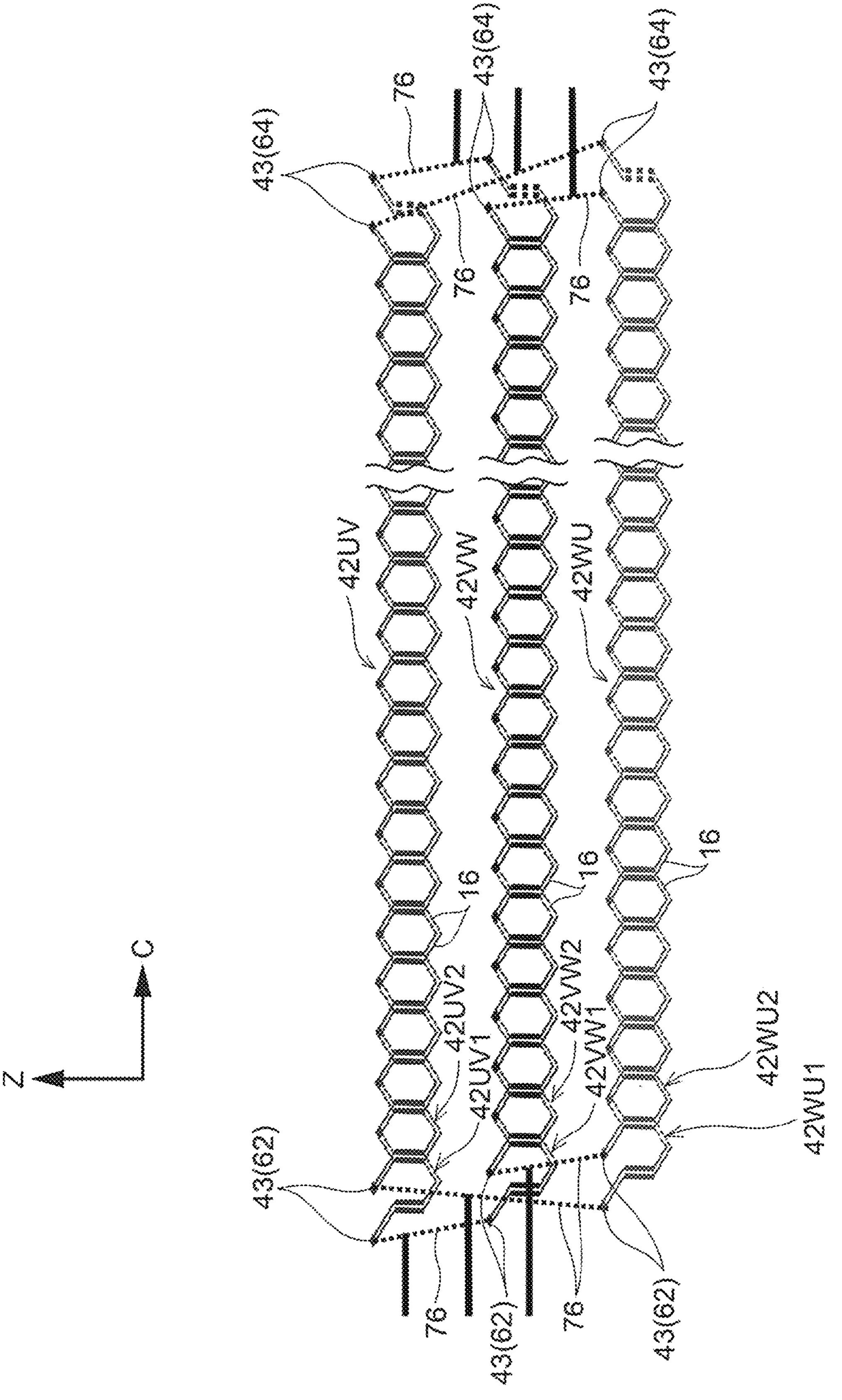
FIG. 25 is a development view which illustrates coils of a motor according to the sixth embodiment.

The motor 10 in this embodiment is, as can be seen in FIGS. 23 to 25, designed to have the U-V-phase coil group 42UV disposed between the U-phase and the V-phase, the V-W-phase coil group 42VW between the V-phase and the W-phase, and the W-U-phase coil group 42WU between the W-phase and the U-phase which are connected in a delta form.

The first connecting section 62 of an outermost one of the coils 16 of the first U-V-phase coil group 42UV1 in the second circumferential direction is, as can be seen in FIG. 25, used as the input terminal 43. Similarly, the first connecting section 62 of an outermost one of the coils 16 of the second U-V-phase coil group 42UV2 in the second circumferential direction is also used as the input terminal 43.

The first connecting section 62 of an outermost one of the coils 16 of the first V-W-phase coil group 42VW1 in the second circumferential direction is, as can be seen in FIG. 25, used as the input terminal 43. Similarly, the first connecting section 62 of an outermost one of the coils 16 of the second V-W-phase coil group 42VW2 in the second circumferential direction is also used as the input terminal 43.

The first connecting section 62 of an outermost one of the coils 16 of the first W-U-phase coil group 42WU1 in the second circumferential direction is, as can be seen in FIG. 25, used as the input terminal 43. Similarly, the first connecting section 62 of an outermost one of the coils 16 of the second W-U-phase coil group 42WU2 in the second circumferential direction is also used as the input terminal 43.

The first connecting section 62 (i.e., the input terminal 43) of an outermost one of the coils 16 of the first U-V-phase coil group 42UV1 in the second circumferential direction is connected to the first connecting section 62 (i.e., the input terminal 43) of an outermost one of the coils 16 of the first V-W-phase coil group 42VW1 in the second circumferential direction using the inter-phase connecting conductor 76.

The first connecting section 62 (i.e., the input terminal 43) of an outermost one of the coils 16 of the second U-V-phase coil group 42UV2 in the second circumferential direction is connected to the first connecting section 62 (i.e., the input terminal 43) of an outermost one of the coils 16 of the first W-U-phase coil group 42WU1 in the second circumferential direction using the inter-phase connecting conductor 76.

The first connecting section 62 (i.e., the input terminal 43) of an outermost one of the coils 16 of the second V-W-phase coil group 42VW2 in the second circumferential direction is connected to the first connecting section 62 (i.e., the input terminal 43) of an outermost one of the coils 16 of the second W-U-phase coil group 42WU2 in the second circumferential direction using the inter-phase connecting conductor 76.

The second connecting section 64 of an outermost one of the coils 16 of the first U-V-phase coil group 42UV1 in the first circumferential direction is, as can be seen in FIG. 25, used as the input terminal 43. Similarly, the second connecting section 64 of an outermost one of the coils 16 of the second U-V-phase coil group 42UV2 in the first circumferential direction is also used as the input terminal 43.

The second connecting section 64 of an outermost one of the coils 16 of the first V-W-phase coil group 42VW1 in the first circumferential direction is, as can be seen in FIG. 25, used as the input terminal 43. Similarly, the second connecting section 64 of an outermost one of the coils 16 of the second V-W-phase coil group 42VW2 in the first circumferential direction is also used as the input terminal 43.

The second connecting section 64 of an outermost one of the coils 16 of the first W-U-phase coil group 42WU1 in the first circumferential direction is, as can be seen in FIG. 25, used as the input terminal 43. Similarly, the second connecting section 64 of an outermost one of the coils 16 of the second W-U-phase coil group 42WU2 in the first circumferential direction is also used as the input terminal 43.

The second connecting section 64 (i.e., the input terminal 43) of an outermost one of the coils 16 of the first U-V-phase coil group 42UV1 in the first circumferential direction is connected to the second connecting section 64 (i.e., the input terminal 43) of an outermost one of the coils 16 of the second W-U-phase coil group 42WU2 in the first circumferential direction using the inter-phase connecting conductor 76.

The second connecting section 64 (i.e., the input terminal 43) of an outermost one of the coils 16 of the second U-V-phase coil group 42UV2 in the first circumferential direction is connected to the second connecting section 64 (i.e., the input terminal 43) of an outermost one of the coils 16 of the second V-W-phase coil group 42VW2 in the first circumferential direction using the inter-phase connecting conductor 76.

The second connecting section 64 (i.e., the input terminal 43) of an outermost one of the coils 16 of the first V-W-phase coil group 42VW1 in the first circumferential direction is connected to the second connecting section 64 (i.e., the input terminal 43) of an outermost one of the coils 16 of the first W-U-phase coil group 42WU1 in the first circumferential direction using the inter-phase connecting conductor 76.

The motor 10 in this embodiment has properties different from those of the motor 10 in the first embodiment.

Seventh and Eighth Embodiments

The motors 10 according to the seventh and eighth embodiments will be described below. The same reference numbers or symbols as those in the first embodiment will refer to the same parts, and explanation thereof in detail will be omitted here.

Figure 26:
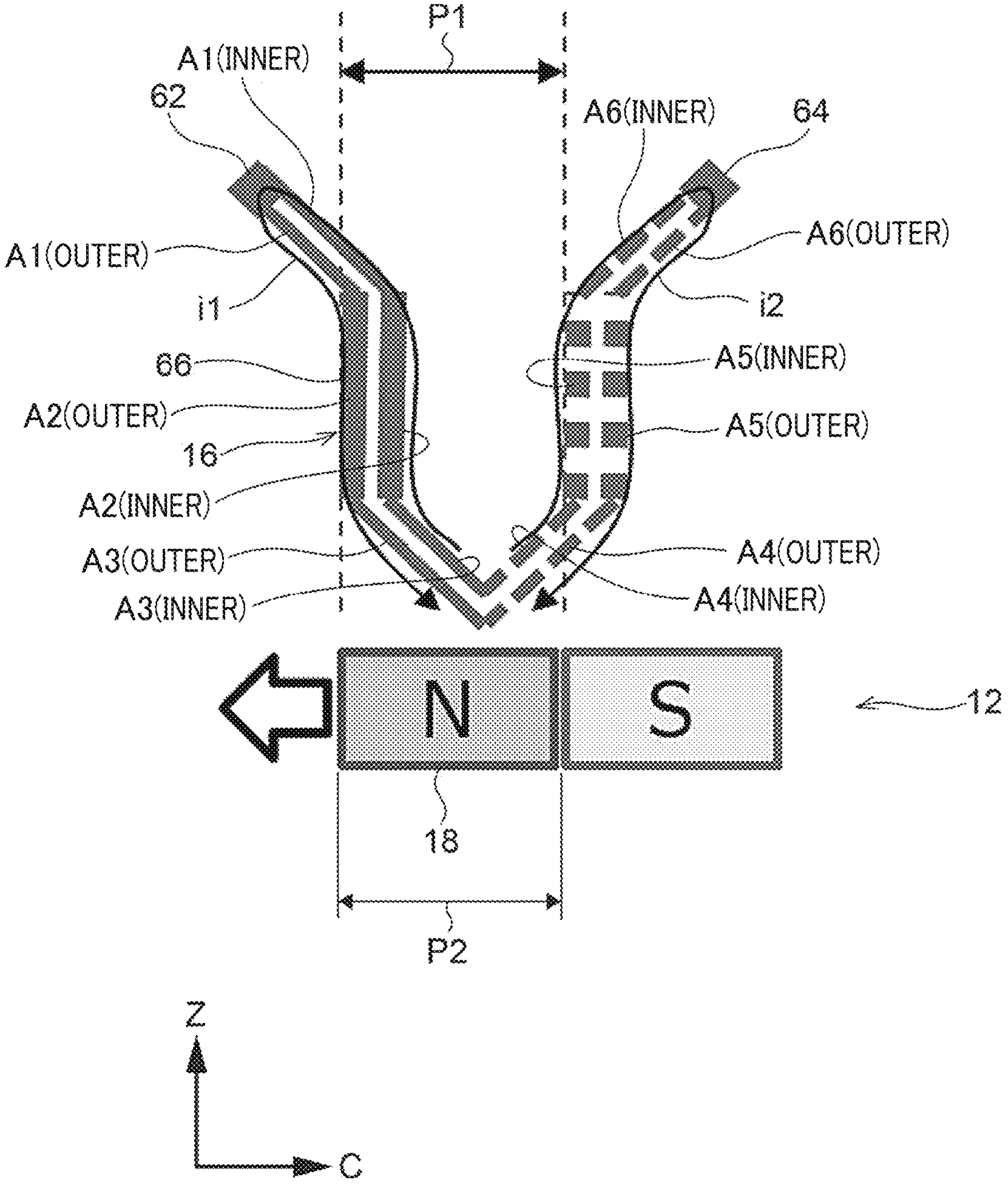
FIG. 26 is a schematic view which demonstrates a relation between a coil and a magnet of a rotor of a motor according to the seventh embodiment.

FIG. 26 schematically illustrates a positional relation between one of the coils 16 and the magnets 18 of the rotor 12 of the motor 10 in the seventh embodiment. In the following discussion, a pitch (i.e., an interval) between the second outer straight section A2 and the fifth inner straight section A5 in the circumferential direction of the coil assembly 32 (i.e., a direction in which the motor 10 rotates) is defined as the pitch P1 (degrees). A pitch between an end of the N-pole magnet 18 and an end of the S-pole magnet 18 in the circumferential direction of the coil assembly 32 (i.e., a direction in which the motor 10 rotates) is defined as the pitch P2 (degrees).

In FIG. 26, electrical current which is induced by passage of the N-pole magnet 18 over the coil 16 and created in the coil 16 is indicated by an arrow i1. The induced current i1 flows to the third inner straight section A3, to the second inner straight section A2, to the first inner straight section A1, to the first connecting section 62, to the first outer straight section A1, to the second outer straight section A2, and to the third outer straight section A3 in this sequence.

In FIG. 26, electrical current which is induced by passage of the S-pole magnet 18 over the coil 16 and created in the coil 16 is also indicated by an arrow i2. The induced current i2 flows to the fourth inner straight section A4, to the fifth inner straight section A5, to the sixth inner straight section A6, to the second connecting section 64, to the sixth outer straight section A6, to the fifth outer straight section A5, and to the fourth outer straight section A4 in this sequence.

The induced currents i1 and i2 flowing through the coil 16 is cancelled by each other. In other words, an electromotive force creating the flow of the induced current i1 and an electromotive force creating the flow of the induced current i2 are cancelled by each other.

The mutual cancellation of the induced currents i1 and i2 flowing through each of the coils 16 minimizes an electrical loss in the motor 10 which results from the generation of the induced currents i1 and i2. This enables the torque outputted by the motor 10 to be enhanced without having to increase the size of the motor 10. The reduction in electrical loss which will arise from the generation of the induced currents i1 and i2 minimizes an amount of heat generated by the coils 16. This realizes a low-heat-generating structure of the motor 10.

Figure 27:
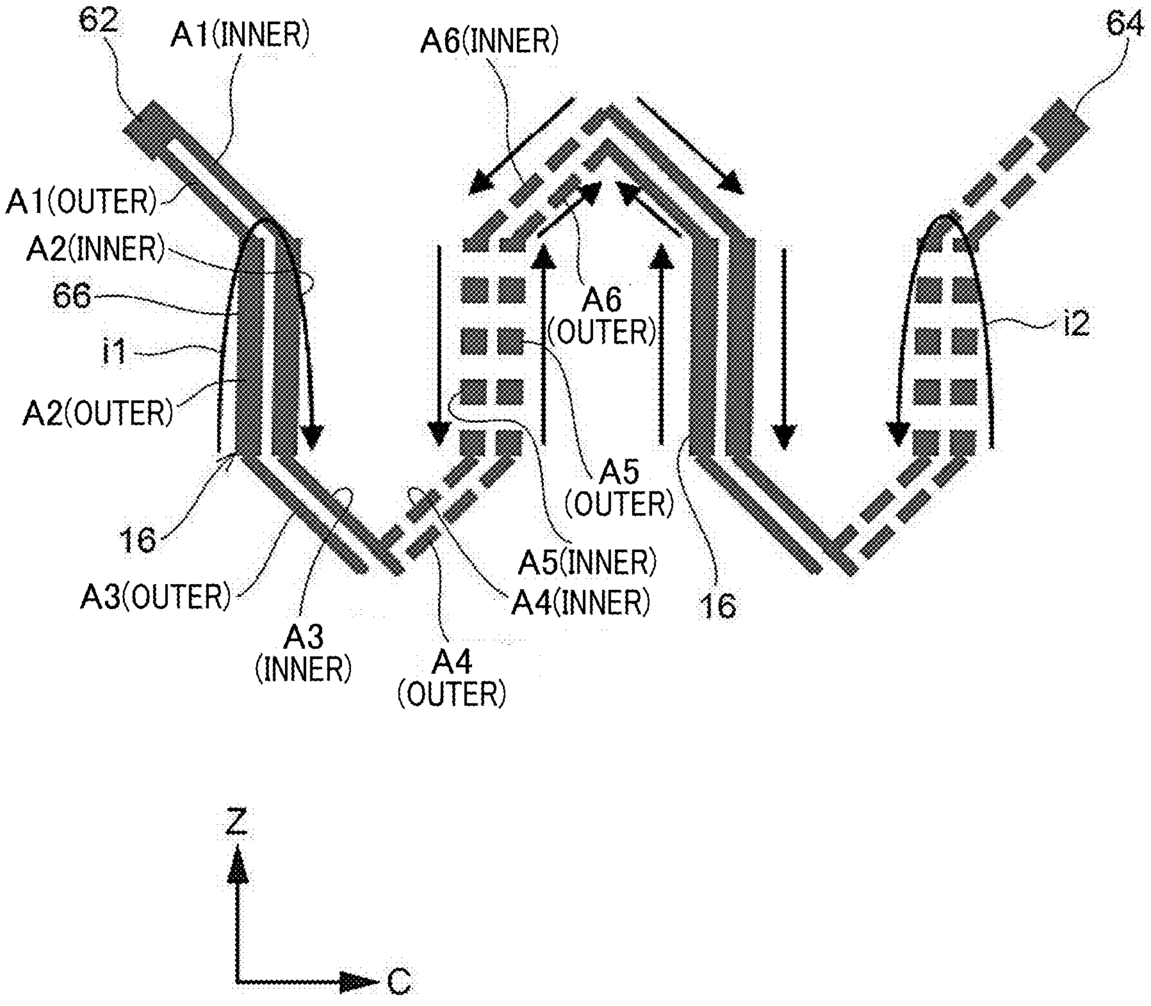
FIG. 27 is a view which illustrates coils of a motor according to the eighth embodiment.

FIG. 27 illustrates the coils 16 of the motor 10 in the eighth embodiment in which one closed circuit 66 is created in a respective circumferentially adjacent two of the coils 16. The induced currents i1 and i2 flowing through the adjacent coils 16 are cancelled by each other, thereby providing substantially the same effects as those in the seventh embodiment.

Ninth Embodiment

The motor 10 according to the ninth embodiment will be described below. The same reference numbers or symbols as those in the first embodiment will refer to the same parts, and explanation thereof in detail will be omitted here.

The motor 10 in this embodiment is identical in structure with that in the first embodiment except for dimensions of parts described below.

Figure 28:
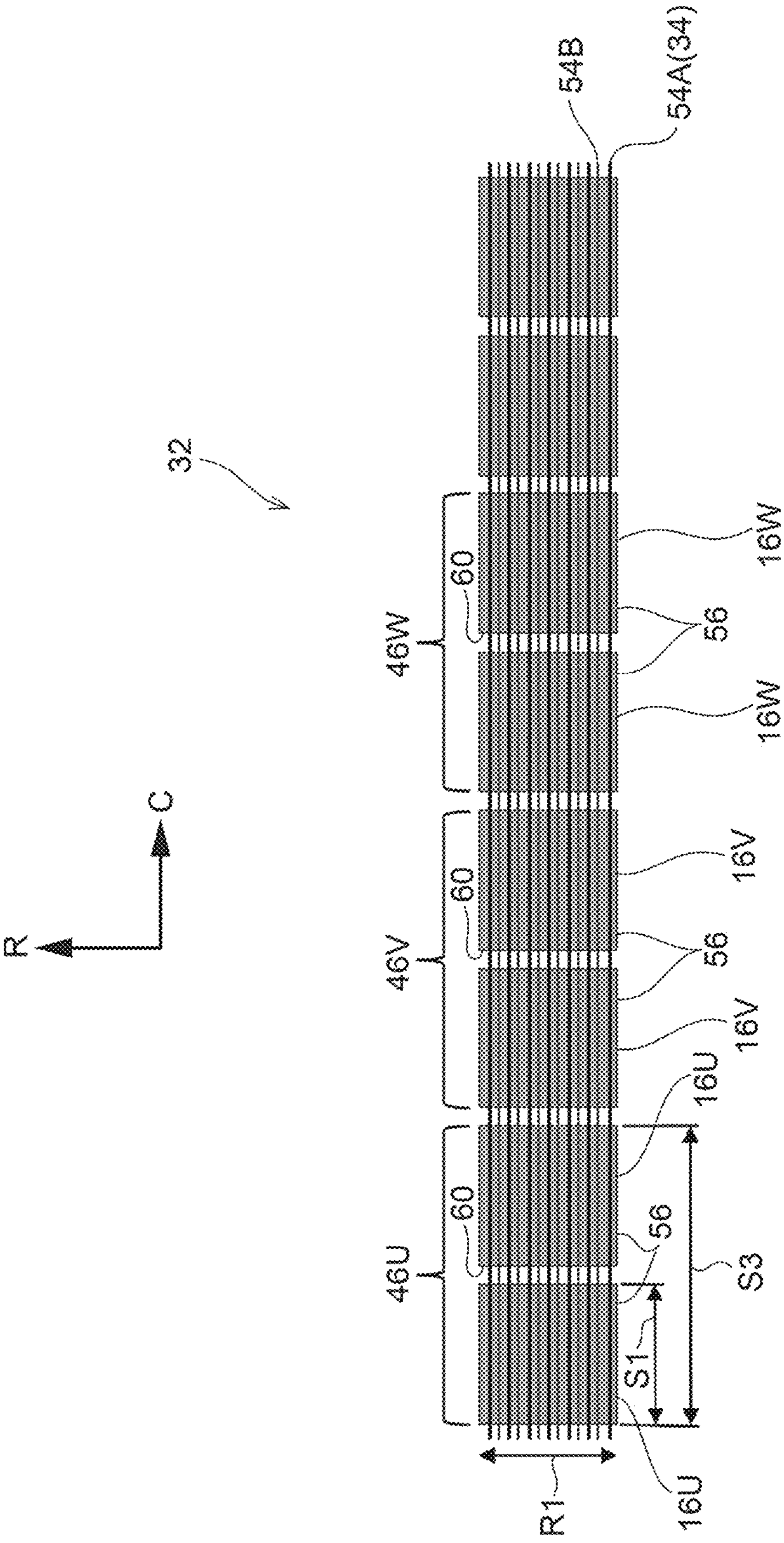
FIG. 28 is a schematic sectional view of a portion of coils of a motor, as taken in a radial direction thereof, according to the nineth embodiment.
Figure 29:
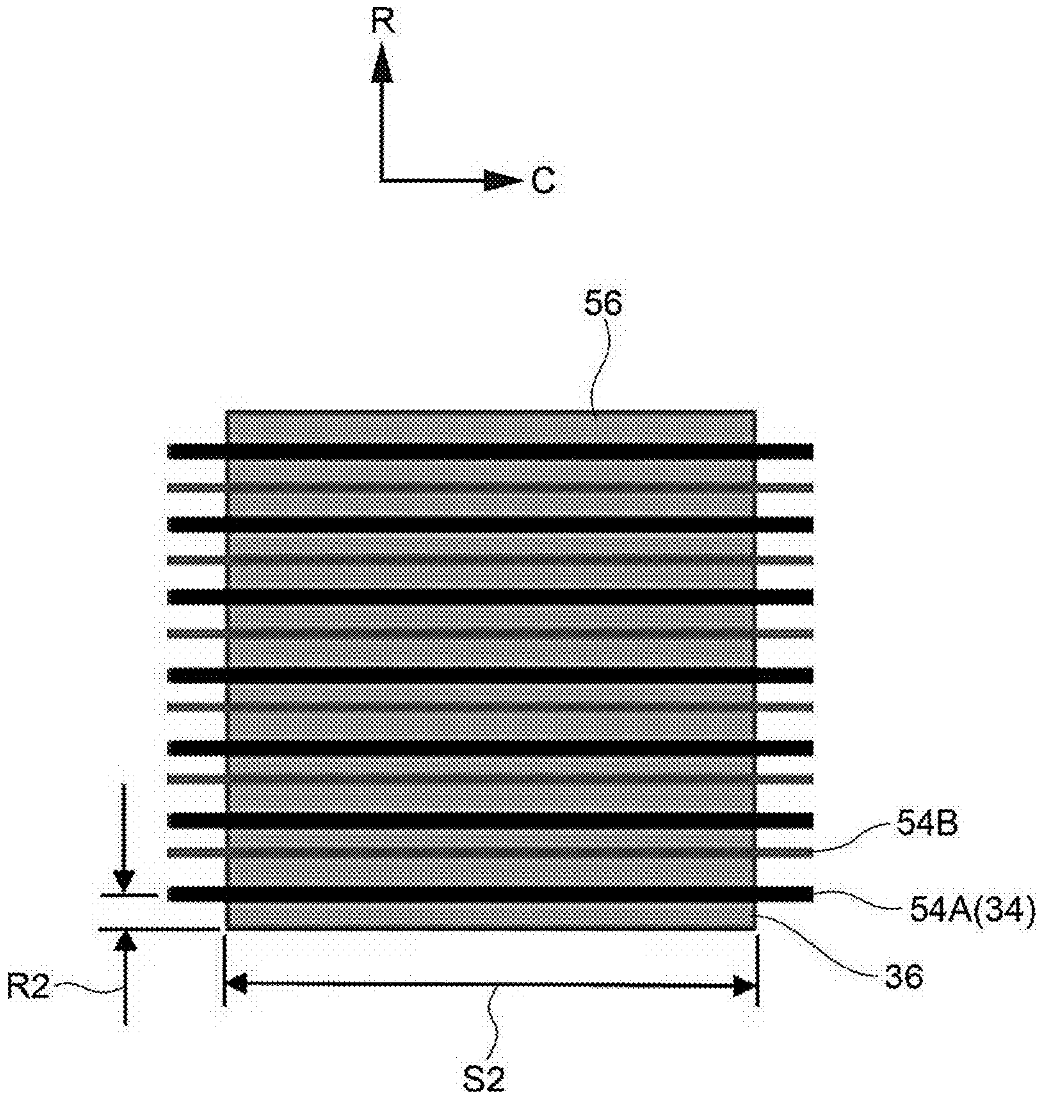
FIG. 29 is a schematic sectional view of stacks of vertical sections of coils, as taken in a radial direction of a coil assembly.

FIG. 28 is a sectional view of the coil assembly 32 taken along the thickness of the strip member 34, i.e., in the radial direction of the coil assembly 32. Each of the vertical stacks 56, as clearly illustrated in FIG. 28, has a rectangular cross section with a dimension R1 (i.e., thickness) in the radial direction of the coil assembly 32 and a dimension S1 in the circumferential direction of the coil assembly 32. The dimension R1 is greater than the dimension S1. The vertical sections 36 of each of the vertical stacks 56, as illustrated in FIG. 29, each have a dimension S2 in the circumferential direction of the coil assembly 32. The dimension S2 is greater than the dimension R2. Each of the U-phase, V-phase, and W-phase conductor groups 46U, 46V, and 46W, as illustrated in FIG. 28, has a radially inner end which has a dimension S3 in the circumferential direction of the coil assembly 32. The dimension S3 is greater than the dimension R1.

The dimension S3 of the radially inner end of the U-phase, V-phase, and W-phase conductor groups 46U, 46V, and 46W which faces the magnets 18 of the rotor 12 (i.e., an interval between circumferentially opposed outer ends of each of the U-phase, V-phase, and W-phase conductor groups 46U, 46V, and 46W) is, as described above, selected to be greater than the dimension R1 of each of the vertical stacks of the U-phase, V-phase, and W-phase conductor groups 46U, 46V, and 46W in the radial direction of the coil assembly 32. This dimensional relation results in a decreased thickness of the coil assembly 32 in the radial direction thereof, thereby reducing the size of a gap between each of the magnets 18 of the rotor 12 and the stator core 26. This results in a decreased magnetic resistance of the coil assembly 32 to enhance the degree of torque outputted by the motor 10.

The dimension R1 of each of the vertical stacks 56 in the radial direction of the coil assembly 32 is, as described above, selected to be greater than the dimension S1 thereof in the circumferential direction of the coil assembly 32, thereby enabling each of the vertical stacks 56 to have a decreased area facing the magnets 18 without sacrificing a required sectional area of the vertical stacks 56. This minimizes an eddy current which is generated by a radial magnetic flux in the vertical stacks 56 to enhance the degree of torque produced by the motor 10.

The dimension S2 of each of the vertical sections 36 of the vertical stacks 56 in the circumferential direction of the coil assembly 32 is, as described above, set to be greater than the dimension R2 thereof in the radial direction of the coil assembly 32, thereby reducing an eddy current which is generated by leakage magnetic flux interlinking between the magnets 18 of the rotor 12 and appears in the vertical stacks 56 to enhance the degree of torque produced by the motor 10.

Tenth and Eleventh Embodiments

The motors 10 according to the tenth and eleventh embodiments will be described below. The same reference numbers or symbols as those in the first embodiment will refer to the same parts, and explanation thereof in detail will be omitted here.

Figure 30:
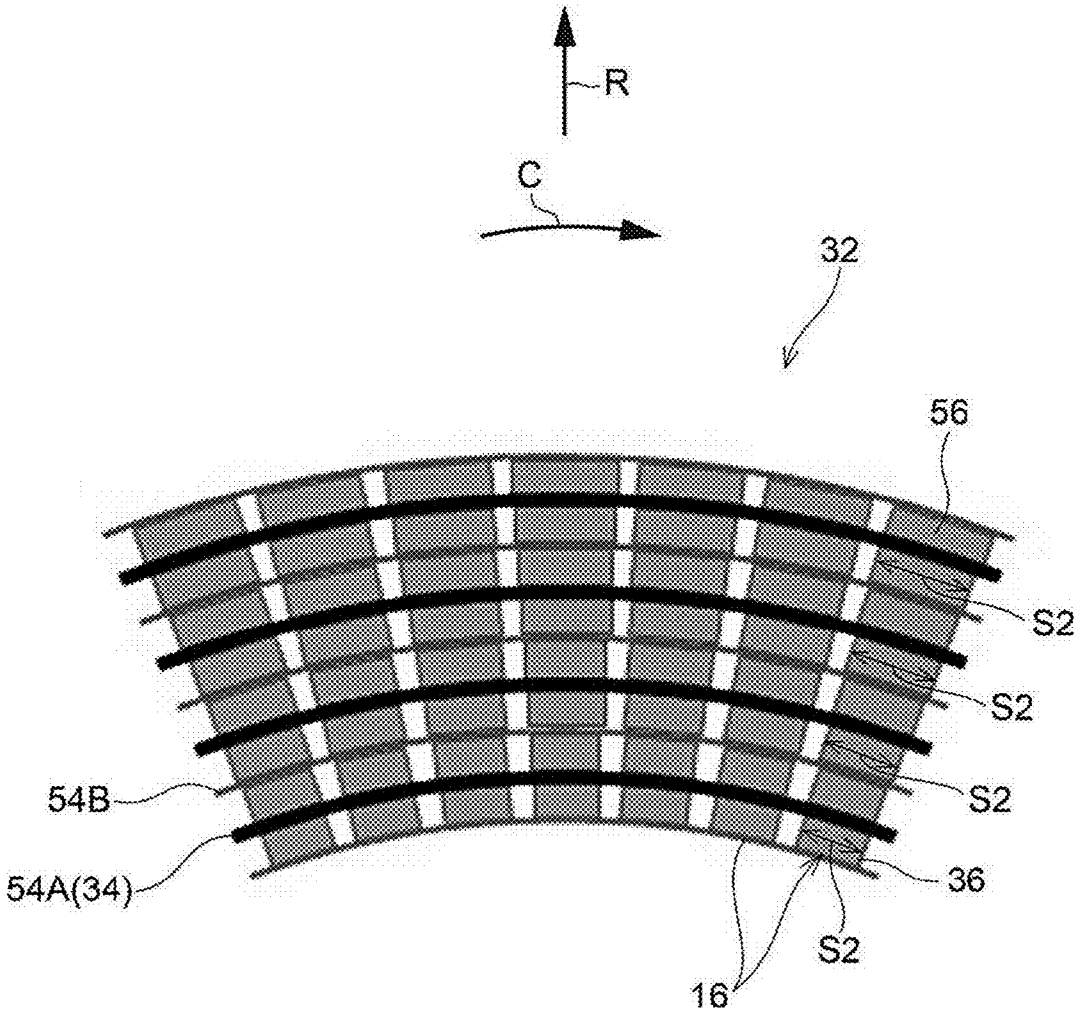
FIG. 30 is a schematic sectional view of a portion of coils, as taken in a radial direction of a coil assembly, according to the tenth embodiment.

The coil assembly 32 of the motor 10 in the tenth embodiment is, as illustrated in FIG. 30, designed to have the strip member 34 rolled into a plurality of turns. In the following discussion, the turns of the strip member 34 will also be referred to as the first strip member 34, the second strip member 34, the third strip member 34, and the fourth strip member 34 as counted from inside to outside of the coil assembly 32 in the radial direction thereof. The vertical sections of the coils 16 arranged on the first strip member 34 have the first dimension S2, as defined in the same way as described above. The same applies to the following second to fourth dimensions S2 to S4. The vertical sections of the coils 16 formed on the second strip member 34 have the second dimension S2 which is greater than the first dimension S2. The vertical sections of the coils 16 formed on the third strip member 34 have the third dimension S2 which is greater than the second dimension S2. The vertical sections of the coils 16 formed on the fourth strip member 34 have the fourth dimension S2 which is greater than the third dimension S2. This dimensional relation results in each of the vertical stacks 56 having a fan-shaped cross section taken in the radial direction of the coil assembly 32. In the following discussion, the first to fourth strip members 34 will also be referred to as the first layer to fourth layer.

The above-described structure of the motor 10 in the tenth embodiment enables each of the vertical stacks 56 to have a sectional area greater than that in the first embodiment, which results in a decrease in electrical resistance of the vertical stacks 56 of the coil assembly 32 as compared with that in the first embodiment and also enables the coils 16 to have a decreased stacking factor (also called space factor) as compared with the motor 10 in the first embodiment.

Figure 31:
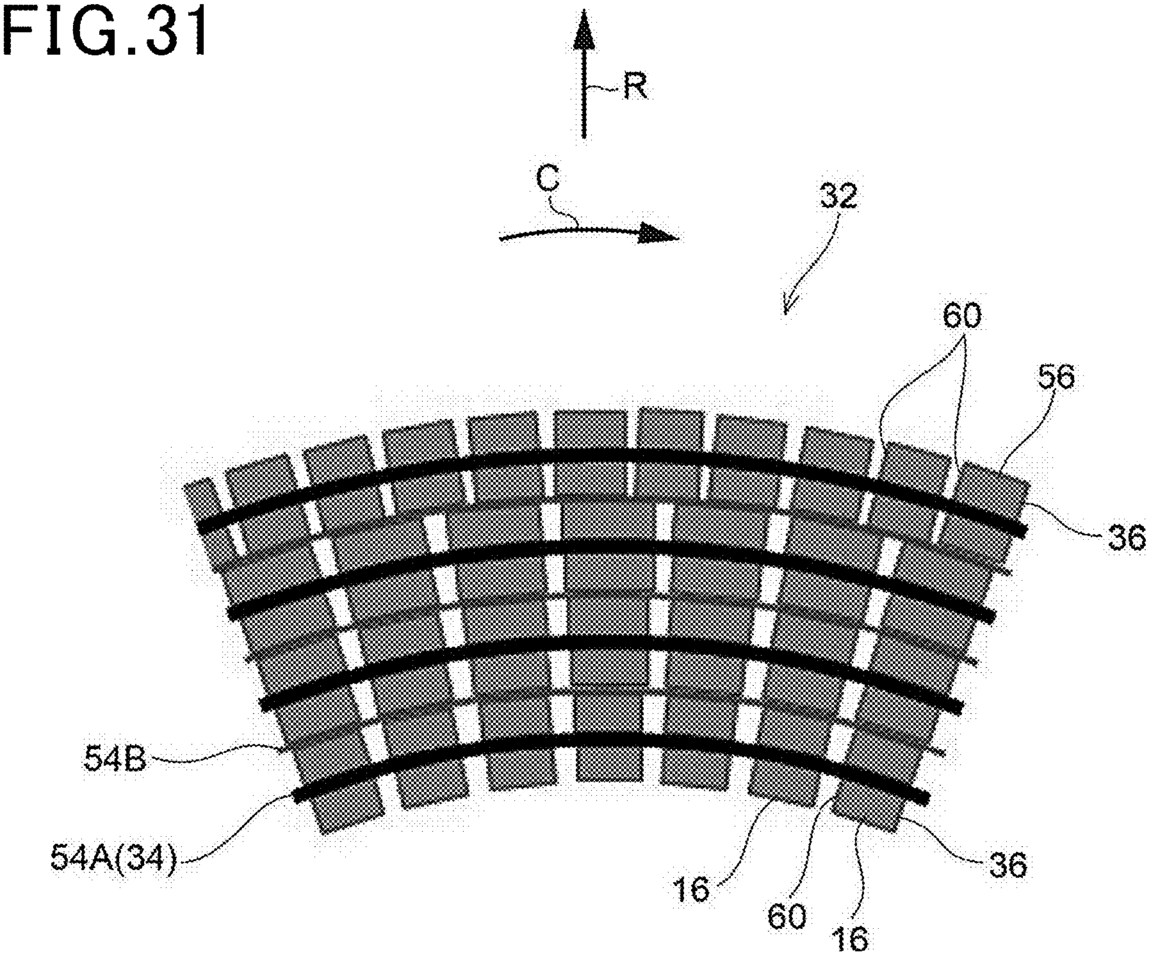
FIG. 31 is a schematic sectional view of a portion of coils, as taken in a radial direction of a coil assembly, according to the eleventh embodiment.
Figure 32:
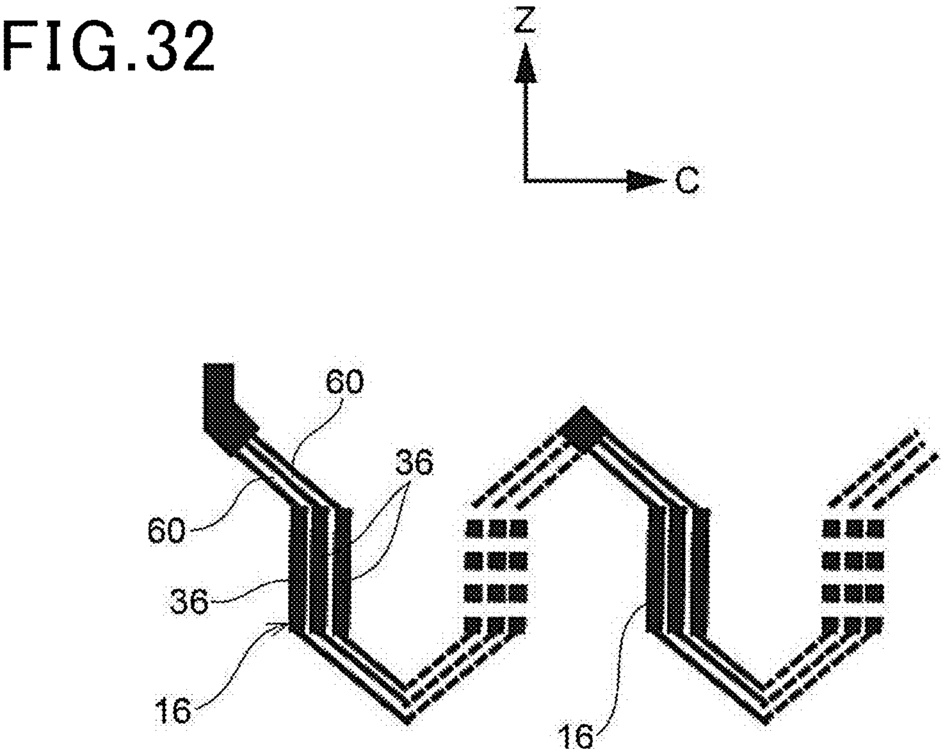
FIG. 32 is a view which illustrates coils formed on a fourth one of turns of a strip member.

FIGS. 31 and 32 illustrate the motor 10 in the eleventh embodiment in which the coils 16 arranged on a radially outer side of the coil assembly 32 include sections which are arranged away from each other in the circumferential direction and greater in number than those of the coils 16 arranged on a radially inner side of the coil assembly 32. Other arrangements are identical with those in the tenth embodiment, and explanation thereof in detail will be omitted here. Specifically, each of the coils 16 disposed on the fourth strip member 34 (i.e., a radially outermost one of the turns of the strip member 34) has two sets of vertical sections 36, each set having three vertical sections 36 separate from each other through two slits 60. This structure of the coil assembly 32 enables each of the vertical sections 36 of the coils 16 arranged on the fourth strip member 34 to have a decreased area facing the magnets 18 (see FIG. 10), thereby reducing an eddy current occurring in the vertical stacks 56 which enhances the degree of torque produced by the motor 10.

Twelfth Embodiment

The motor 10 according to the twelfth embodiment will be described below. The same reference numbers or symbols as those in the first embodiment will refer to the same parts, and explanation thereof in detail will be omitted here.

Figure 33:
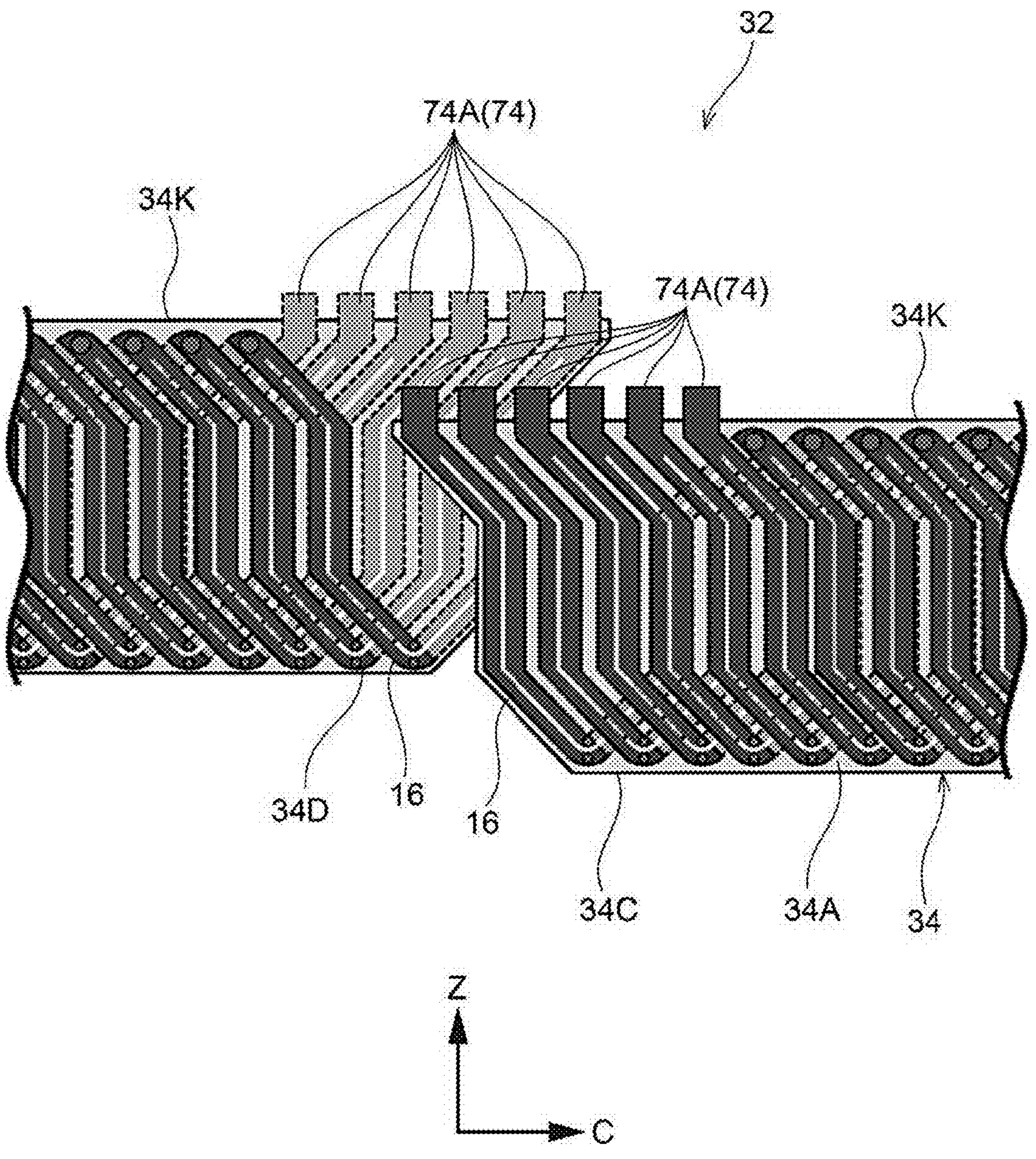
FIG. 33 is a partially enlarged view which illustrates a coil assembly of a motor according to the twelfth embodiment before inter-coil connectors are connected together.
Figure 34:
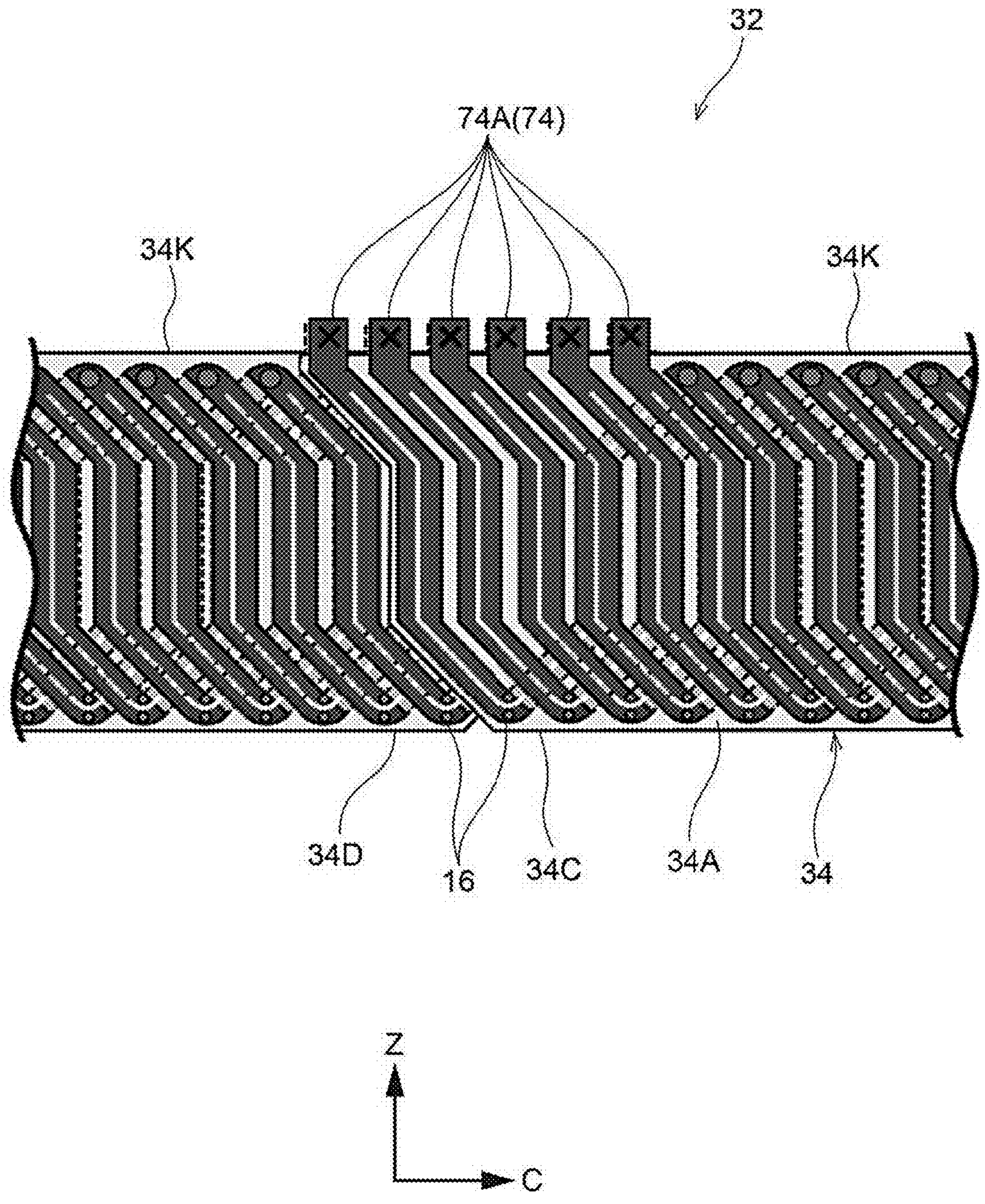
FIG. 34 is a partially enlarged view which illustrates a coil assembly of a motor according to the twelfth embodiment after inter-coil connectors are connected together.

FIGS. 33 and 34 illustrate the motor 10 in the twelfth embodiment in which the strip member 34 has the first end portion 34D and the second end portion 34C opposed to the first end portion 34D. The first end portion 34D faces in the first circumferential direction of the coil assembly 32. The second end portion 34C faces in the second circumferential direction o the coil assembly 32. The first and second end portions 34D and 34C are different in structure of the inter-coil connectors 74 from each other. Other arrangements are identical with those in the third embodiment (see FIGS. 16 and 17), and explanation thereof in detail will be omitted here.

Each of the inter-coil connectors 74 on the second end portion 34C of the strip member 34, as clearly illustrated in FIG. 33, has the end extension 74A which extends radially outside the axial ends 34K of the second end portion 34C of the strip member 34 which faces in the first axial direction of the coil assembly 32 (i.e., upward direction in FIG. 33). Similarly, each of the inter-coil connectors 74 on the first end portion 34D of the strip member 34 has the end extension 74A which extends radially outside the axial ends 34K of the first end portion 34D of the strip member 34 which faces in the first axial direction of the coil assembly 32.

The strip member 34 are, as described above, rolled to have the first end portion 34D and the second end portion 34C which are laid to overlap each other in the radial direction of the coil assembly 32. In this condition, the end extensions 74A of the inter-coil connectors 74 arranged on the first end portion 34D of the strip member 34 and the end extensions 74A of the inter-coil connectors 74 arranged on the second end portion 34C of the strip member 34 are, as clearly illustrated in FIG. 34, welded or soldered together. The end extensions 74A serve to facilitate the ease with which the inter-coil connectors 74 are joined together.

Thirteenth Embodiment

The motor 10 according to the thirteenth embodiment will be described below. The same reference numbers or symbols as those in the first embodiment will refer to the same parts, and explanation thereof in detail will be omitted here.

Figure 35:
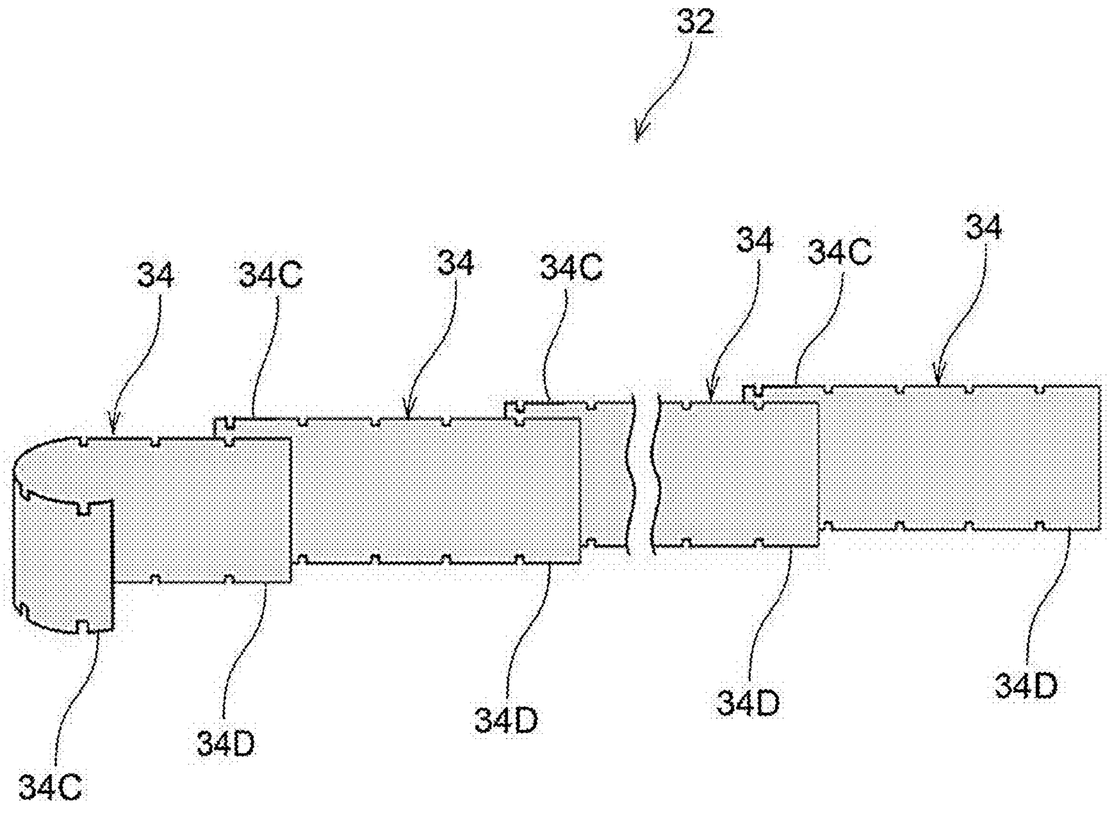
FIG. 35 is a view which illustrates strip members of a motor according to the thirteenth embodiment.
Figure 36:
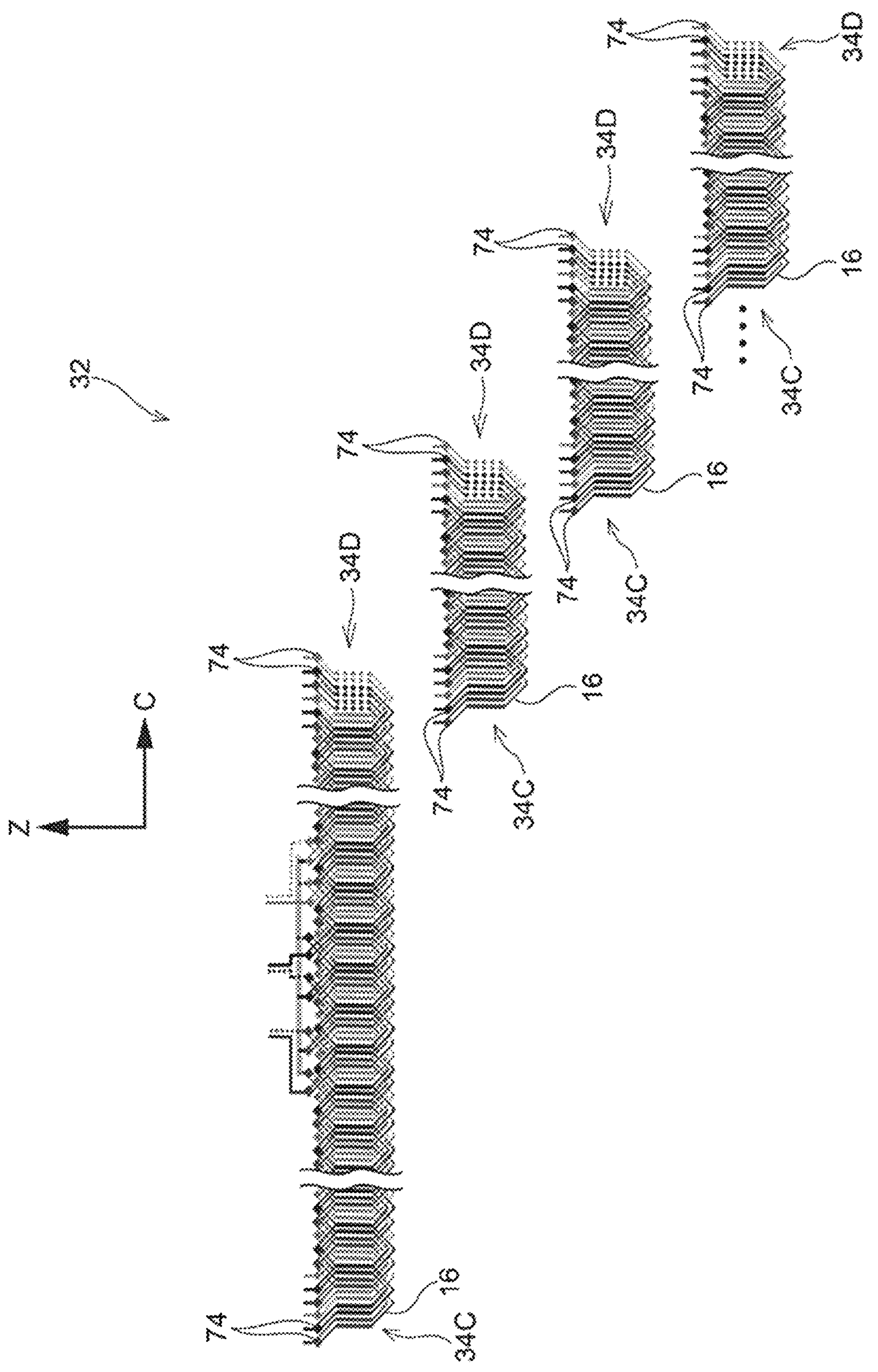
FIG. 36 is a development view which illustrates a coil assembly of a motor according to the thirteenth embodiment.

The coil assembly 32 in the thirteenth embodiment is, as illustrated in FIG. 35, designed to have a plurality of strip members 34 rolled and laid to overlap each other in the radial direction of the coil assembly 32. FIG. 36 illustrates the coils 16 formed on each of the strip members 34. For the ease of visibility, FIG. 36 demonstrates sets of the coils 16 disposed on the strip members 34 as being offset from each other in the axial direction of the coil assembly 32. Each of the strip members 34 has the inter-coil connectors 74 arranged on the first end portion 34D and the second end portion 34C thereof. The first end portion 34D of each of the strip members 34 is laid to radially overlap the second end portion 34C of an adjacent one of the strip members 34 with the inter-coil connectors 74 arranged on the first end portion 34D being connected to the inter-coil connectors 74 arranged on the second end portion 34C. This layout of the strip members 34 facilitates the ease with which the coils 16 on each of the strip members 34 are electrically connected to the coils 16 on a respective adjacent one of the strip members 34. The connections of the inter-coil connectors 74 arranged on the first end portion 34D of each of the strip members 34 with the inter-coil connectors 74 arranged on the second end portion 34C of the adjacent strip member 34 may be designed to have the structure in the twelfth embodiment (see FIGS. 33 and 34).

The first end portion 34D of each of the strip members 34 and the second end portions 34C of a respective adjacent one of the strip members 34, as described above, have the inter-coil connectors 74 to facilitate creation of electrical connections of the first end portions 34D with the second ends 34C of the strip members 34.

Fourteenth Embodiment

The motor 10 according to the fourteenth embodiment will be described below. The same reference numbers or symbols as those in the first embodiment will refer to the same parts, and explanation thereof in detail will be omitted here.

Figure 37:
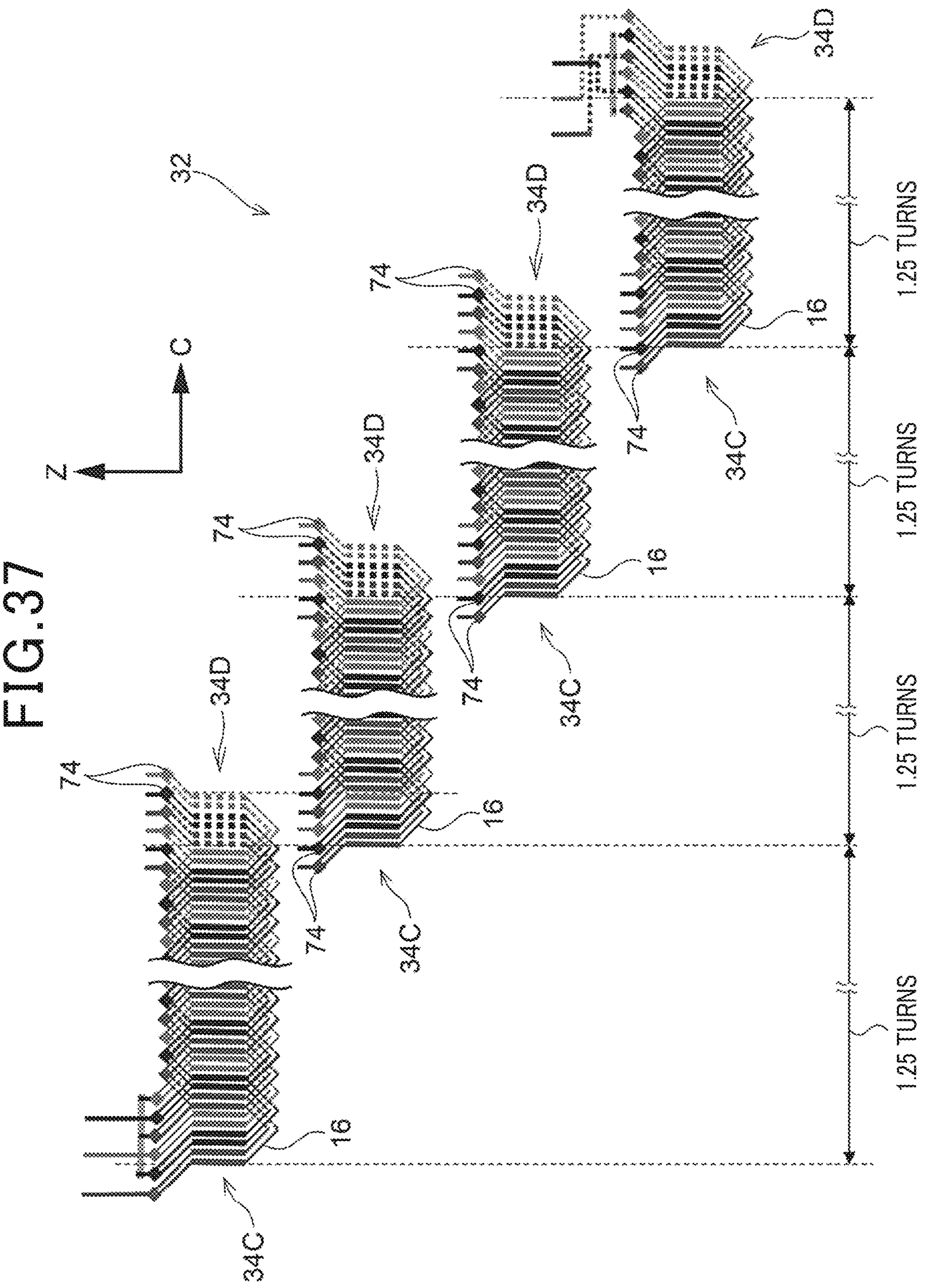
FIG. 37 is a development view which illustrates a coil assembly of a motor according to the fourteenth embodiment.
Figure 38:
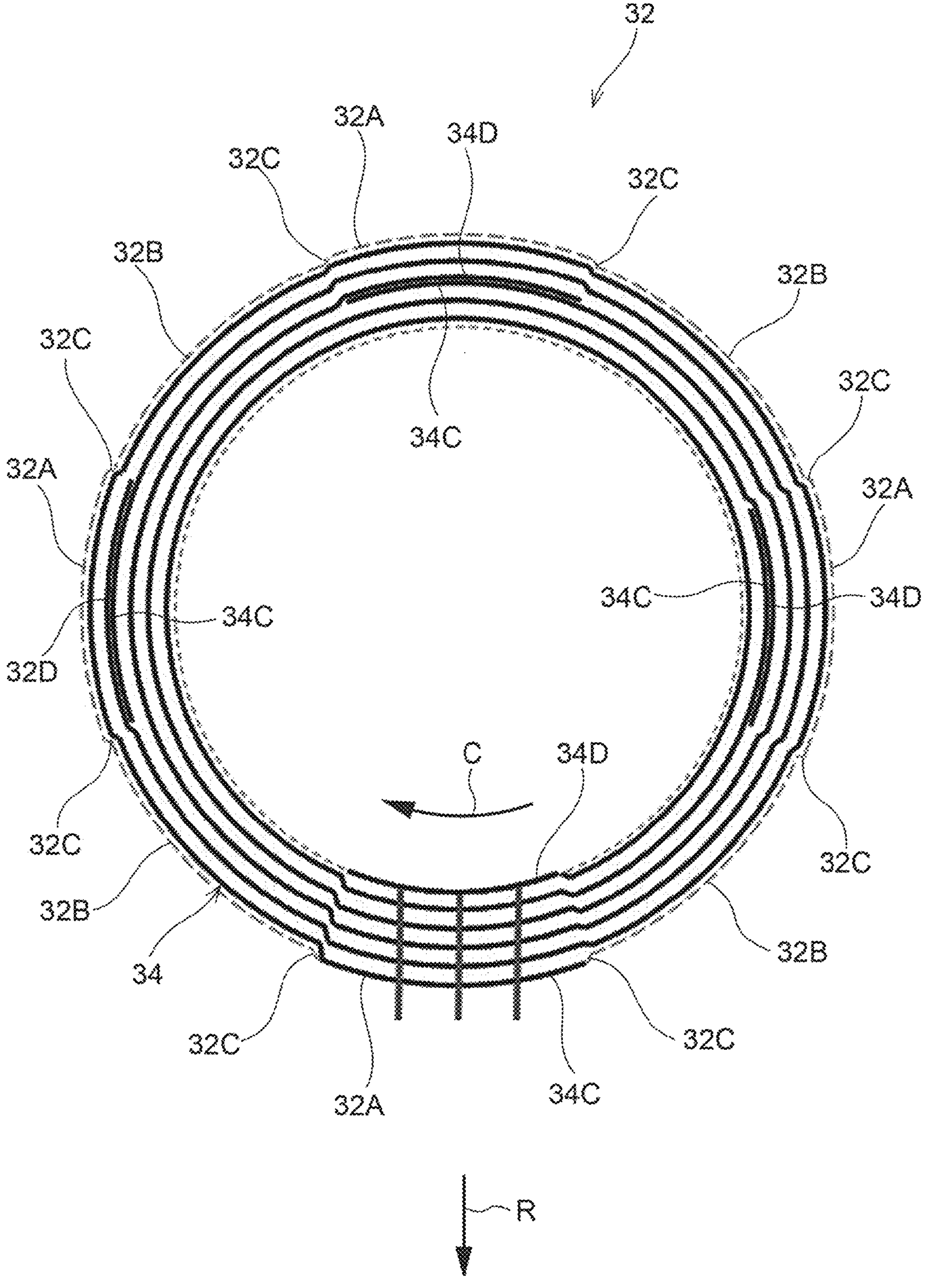
FIG. 38 is a sectional view of a coil assembly of a motor according to the fourteenth embodiment, as taken in a radial direction of the motor.
Figure 39:
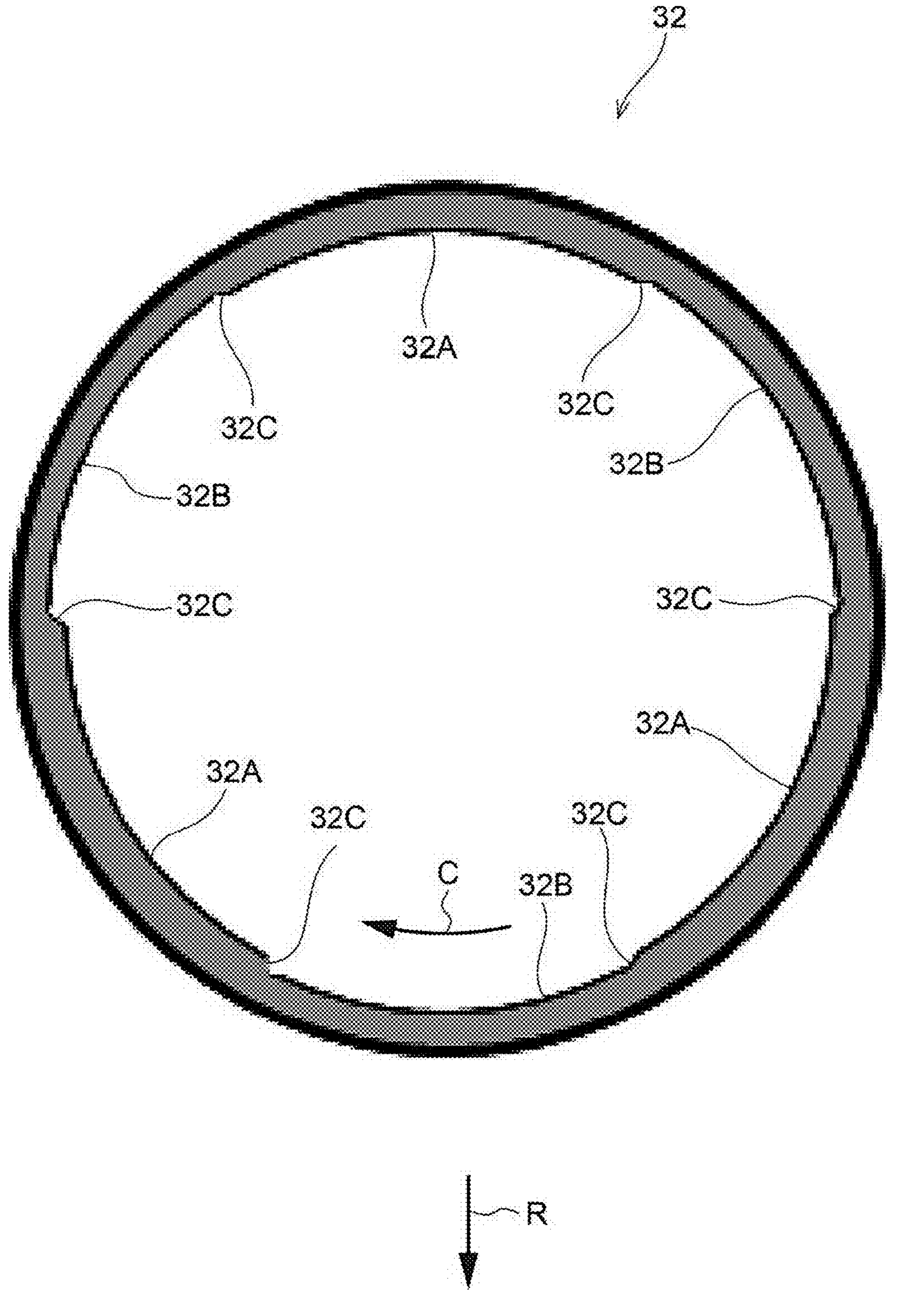
FIG. 39 is a sectional view of a modification of a coil assembly of a motor, as taken in a radial direction of the motor.

FIGS. 37 and 38 illustrate the coil assembly 32 of the motor 10 in the fourteenth embodiment. The coil assembly 32 is different from that in the first embodiment (see FIG. 4) only in that the coil assembly 32 is made of four strip members 34 rolled into a stack of turns. The first end portion 34D of each of the strip members 34 is connected to the second end portion 34C of a respective adjacent one of the strip members 34 using the same structure as that in the thirteenth embodiments.

Specifically, the coil assembly 32 in this embodiment is designed to have four strip members 34 which are joined together into a single strip member which continuously extends in the circumferential direction of the coil assembly 32 and rolled into five turns which will also be referred to below as a first turn to a fifth turn, as counted from inside to outside of the coil assembly 32 in the radial direction thereof. Each of the strip members 34, therefore, occupies 1.25 turns of the single strip member (i.e., 1.25 turns×4=five turns).

Each of the four strip members 34 joined together to define the single strip member 34, as clearly illustrated in FIG. 38, has the first end portion 34D facing in the first circumferential direction and the second end portion 34C facing in the second circumferential direction. The first end portion 34D of each of the strip members 34 is laid to overlap the second end portion 34C of a respective adjacent one of the strip members 34, thereby forming four thick-walled portions 32A each of which is greater in thickness than another portion of the coil assembly 34. The coil assembly 32 has four thin-walled portions 32B each of which is between a respective adjacent two of the thin-walled portions 32A. The coil assembly 32, therefore, has the four thick-walled portions 32A arranged at equal angular intervals away from each other in the circumferential direction of the coil assembly 32. The thick-walled portions 32A and the thin-walled portions 32B are, therefore, located alternately in the circumferential direction of the coil assembly 32.

The coil assembly 32 also has the shoulders 32C (i.e., steps) each of which lies at a boundary between each of the thin-walled portions 32B and a respective adjacent one of the thick-walled portions 32A and faces the stator core 26.

The coil assembly 32 of the motor 10 in the fourteenth embodiment, as described above, includes the four thick-walled portions 32A arranged at equal intervals away from each other in the circumferential direction of the coil assembly 32, thereby ensuring the stability in coaxial alignment of the coil assembly 32 with the stator core 26 with the coil assembly 32 disposed radially inside the stator core 26.

The coil assembly 32, as described above, has the shoulders 32C each of which lies at the boundary between each of the thin-walled portions 32B and a respective adjacent one of the thick-walled portions 32A. Each of the shoulders 32C faces the stator core 26 and creates a difference in thickness between the thin-walled portion 32B and the thick-walled portion 32A. In other words, the coil assembly 32 has a first peripheral surface facing the magnets 18 of the rotor 12 and a second peripheral surface facing the stator core 26. The first peripheral surface of the coil assembly 32 has irregularities smaller in size than those of the second peripheral surface. This configuration of the coil assembly 32 results in uniformity of an air gap between the first peripheral surface (i.e., inner peripheral surface) of the coil assembly 32 and outer peripheral surfaces of the magnets 18 of the rotor 12 as compared with when the second peripheral surface (i.e., outer peripheral surface) of the coil assembly 32 has the shoulders 32C formed thereon. This enables the motor 10 to be produced which produce less variation in output torque.

Figure 40:
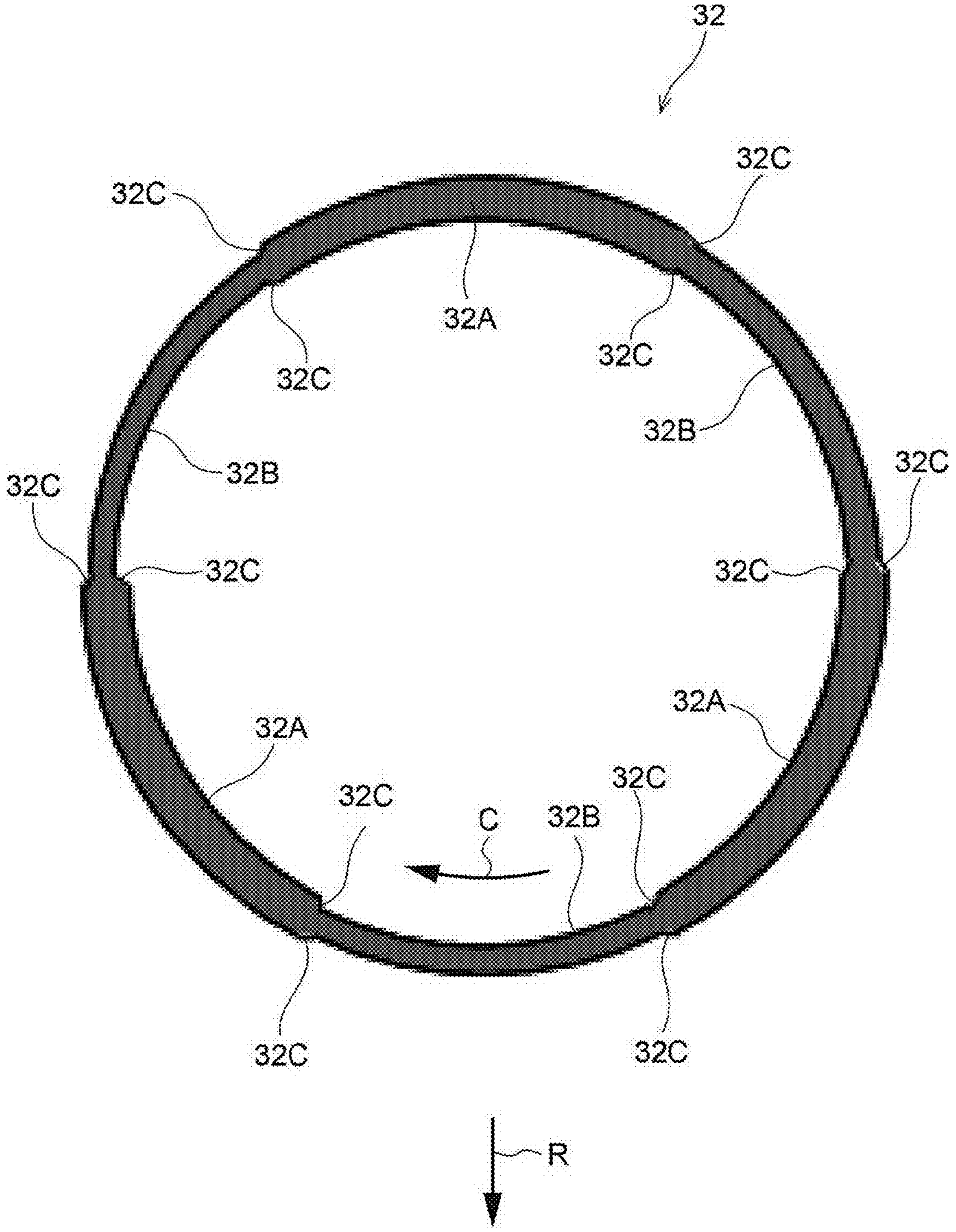
FIG. 40 is a sectional view of a modification of a coil assembly of a motor, as taken in a radial direction of the motor.

In a case where the coil assembly 32 is arranged to extend along the outer peripheral surface of the stator core 26, it is, as illustrated in FIG. 29, preferable that the coil assembly 32 has the shoulders 32C formed on an inner peripheral surface thereof. Alternatively, the coil assembly 32 may be designed to have the shoulders 32C in a way illustrated in FIG. 40 suitable both for a structure in which the coil assembly 32 is arranged to extend along the outer peripheral surface of the stator core 26 and for a structure in which the coil assembly 32 is arranged to extend along the inner peripheral surface of the stator core 26. In other words, the coil assembly 32 may be designed to be suitable for the motor 10 of either an outer-rotor type or an inner-rotor type. The coil assembly 32 illustrated in FIG. 40 has the shoulders 32C formed both on the inner peripheral surface and on the outer peripheral surface thereof. This structure of the coil assembly 32 has a potential problem in that local concentration of irregularities must be avoided on either of the outer peripheral surface or the inner peripheral surface of the coil assembly 32.

Fifteenth Embodiment

The motor 10 according to the fifteenth embodiment will be described below. The same reference numbers or symbols as those in the first embodiment will refer to the same parts, and explanation thereof in detail will be omitted here.

Figure 41:
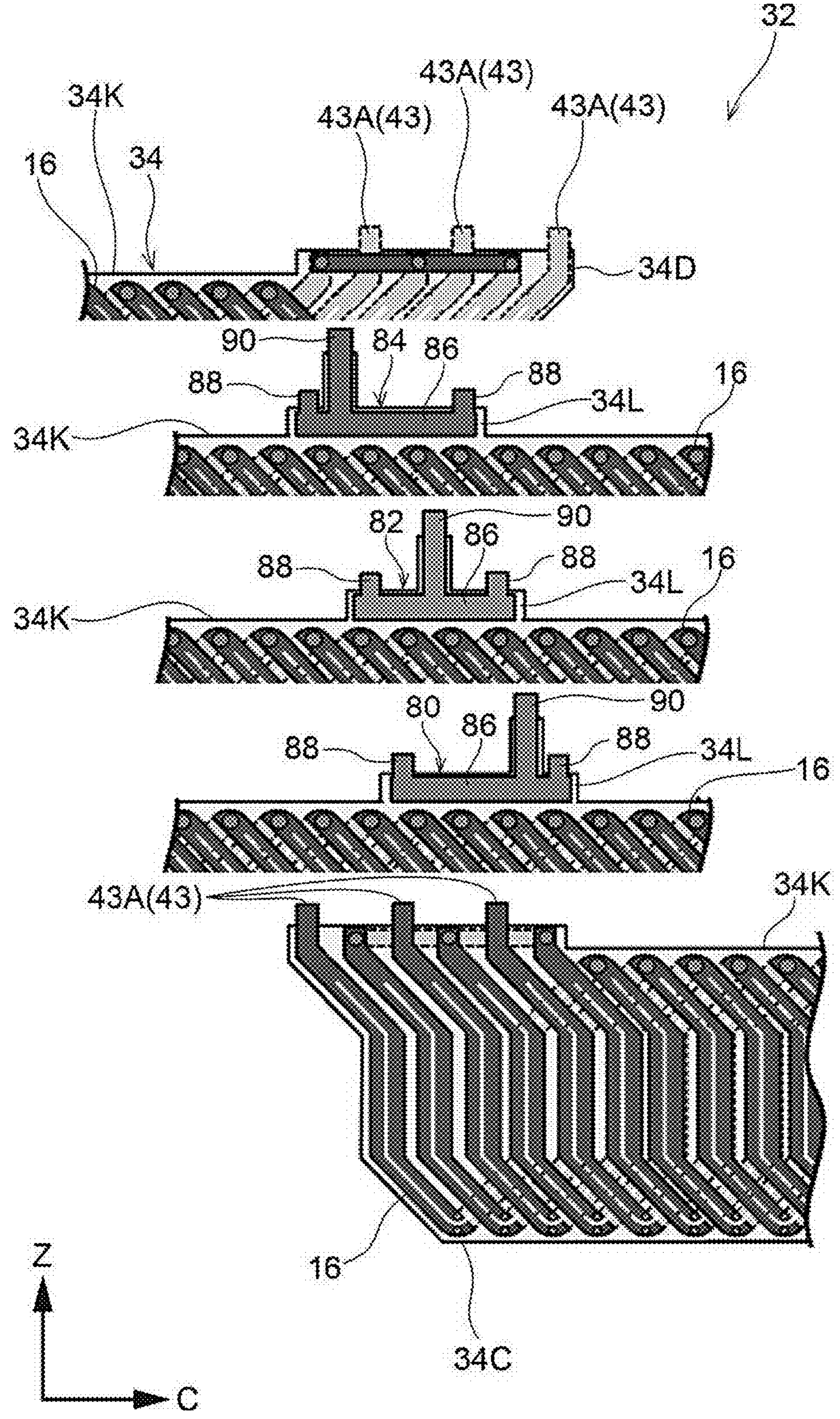
FIG. 41 is an enlarged view which illustrates a coil assembly of a motor according to the fifteenth embodiment before input terminals are connected.
Figure 42:
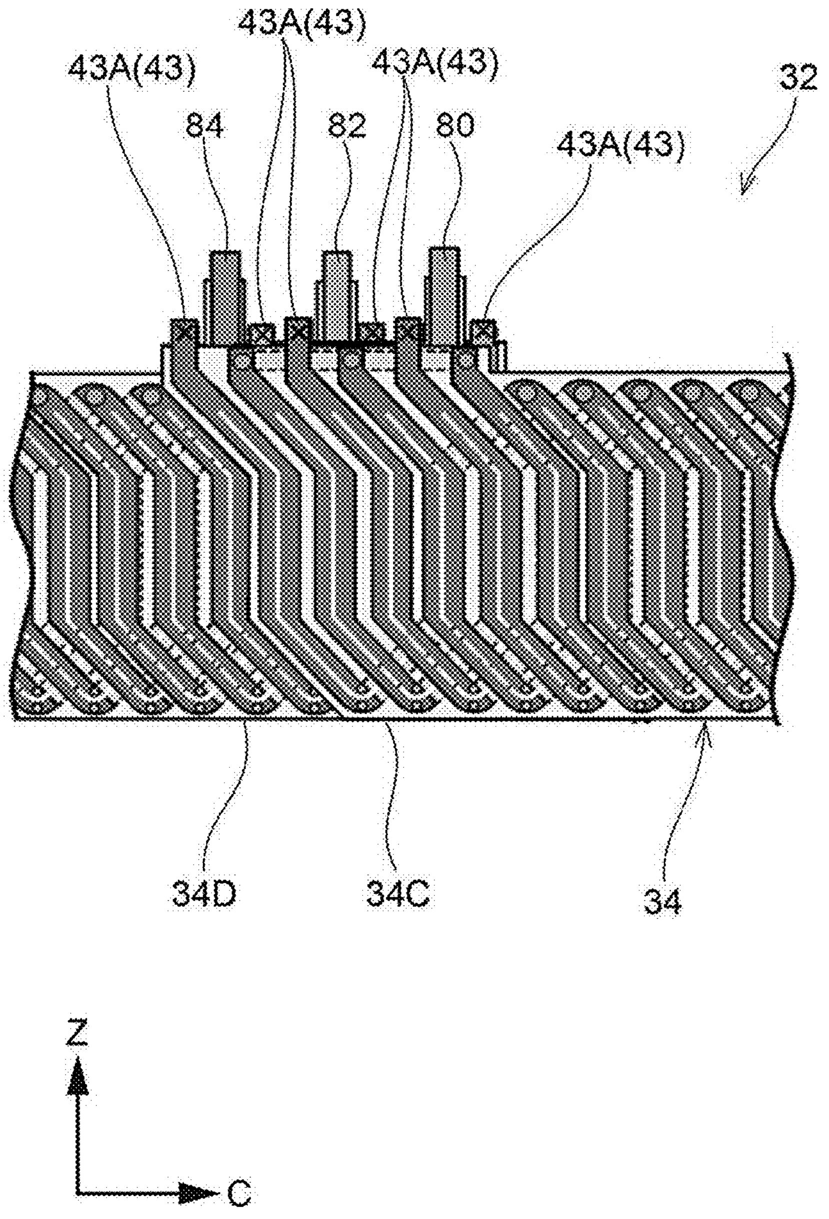
FIG. 42 is a partially enlarged view which illustrates a coil assembly of a motor according to the fifteenth embodiment after input terminals are connected together.

FIGS. 41 and 42 illustrate the coil assembly 32 of the motor 10 in the fifteenth embodiment. The coil assembly 32 in this embodiment is, as can be seen from FIGS. 41 and 42, identical in structure with that in the first embodiment except for the following arrangements.

Some of the coils 16 of the coil assembly 32 in this embodiment have the input terminals 43 in the same way as described above. Each of the input terminals 43 has the extension end 43A which protrudes outside the axial end 34K of the strip member 34 which faces in the first axial direction. The coil assembly 32 also includes three bypass connectors 80, 82, and 84 disposed on a middle portion of the strip member 34 in the circumferential direction thereof. The strip member 34 also includes three bypass connector-formed portions 34L each of which is of a tongue shape and formed on one of axially opposed ends of the strip member 34. The bypass connector-formed portions 34L protrude in the first axial direction of the coil assembly 32. Each of the bypass connectors 80, 82, and 84 is formed on a corresponding one of the bypass connector-formed portions 34L. Each of the bypass connectors 80, 82, and 84 includes the base 86 extending in the circumferential direction, a pair of extension-end connectors 88 extending in the first axial direction from circumferentially opposed ends of the base 86, and the input conductor 90 extending in the first axial direction from a circumferentially middle portion of the base 86. The bypass connectors 80, 82, and 84 arranged in this order in the first circumferential direction of the coil assembly 32. In the strip member 34 rolled into an annular shape, the bypass connectors 80, 82, and 84 are, as can be seen in FIG. 41, arranged to face the second end portion 34C and the first end portion 34D of the strip member 34.

The input terminal 43 (i.e., the extension end 43A) of the W-phase coils 16 which is disposed on the second end portion 34C of the strip member 34 and the input terminal 43 (i.e., the extension end 43A) of the W-phase coils 16 which is disposed on the first end portion 34D of the strip member 34 are connected to the extension-end connectors 88 of the bypass connector 80.

The input terminal 43 (i.e., the extension end 43A) of the V-phase coils 16 which is disposed on the second end portion 34C of the strip member 34 and the input terminal 43 (i.e., the extension end 43A) of the V-phase coils 16 which is disposed on the first end portion 34D of the strip member 34 are connected to the extension-end connectors 88 of the bypass connector 82.

The input terminal 43 (i.e., the extension end 43A) of the U-phase coils 16 which is disposed on the second end portion 34C of the strip member 34 and the input terminal 43 (i.e., the extension end 43A) of the U-phase coils 16 which is disposed on the first end portion 34D of the strip member 34 are connected to the extension-end connectors 88 of the bypass connector 84.

The coil assembly 32 in this embodiment is designed to connect the two input terminals 43 of each of the U-phase, V-phase, and W-phase groups of the coils 16 together using a corresponding one of the bypass connectors 80, 82, and 84. The structure of the coil assembly 32 ensures a desired sectional area of an electrical current flow path of each of the bypass connectors 80, 82, and 84, thereby enabling the coil assembly 32 to be used for a large amount of electrical current.

The coil assembly 32 in this embodiment has the bypass connectors 80, 82, and 84 staked on one another in the radial direction, not in the axial direction thereof. This enables the size of the coil assembly 32 to be reduced in the axial direction, which results in a decrease in overall size of the motor 10.

The bypass connectors 80, 82, and 84 may be formed on only one of the surfaces of the strip member 34 or both of the surfaces of the strip member 34. The coil assembly 32 may also have bypass connector(s) connecting between the neutral points 44 or the inter-coil connectors 74.

Sixteenth Embodiments

The motor 10 according to the sixteenth embodiment will be described below. The same reference numbers or symbols as those in the first embodiment will refer to the same parts, and explanation thereof in detail will be omitted here.

Figure 43:
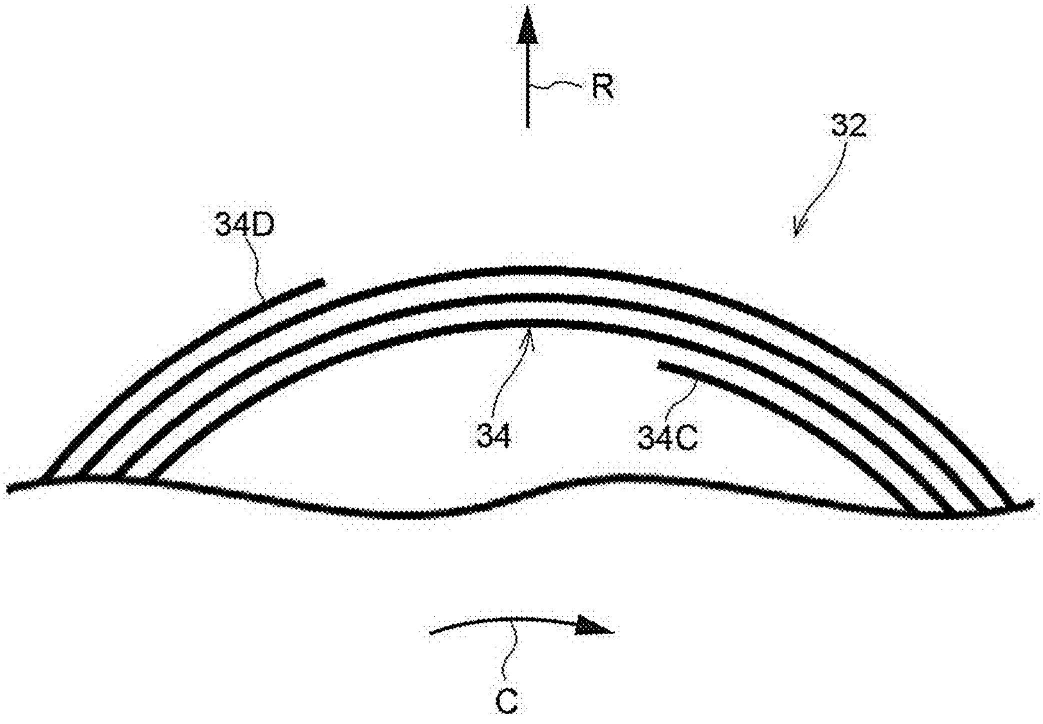
FIG. 43 is a sectional view of a coil assembly of a motor according to the sixteenth embodiment, as taken in a radial direction of the motor.

The coil assembly 32 of the motor 10 in this embodiment is, as can be seen in FIG. 43, designed to have the strip member 34 in which the second end portion 34C and the first end portion 34D are out of alignment with each other in the radial direction of the coil assembly 32, in other words, they are located away from each other in the circumferential direction of the coil assembly 32. This layout may depend on conditions of connections of the coils 16 formed on the strip member 34.

Seventeenth Embodiment

The motor 10 according to the seventeenth embodiment will be described below. The same reference numbers or symbols as those in the first embodiment will refer to the same parts, and explanation thereof in detail will be omitted here.

Figure 44:
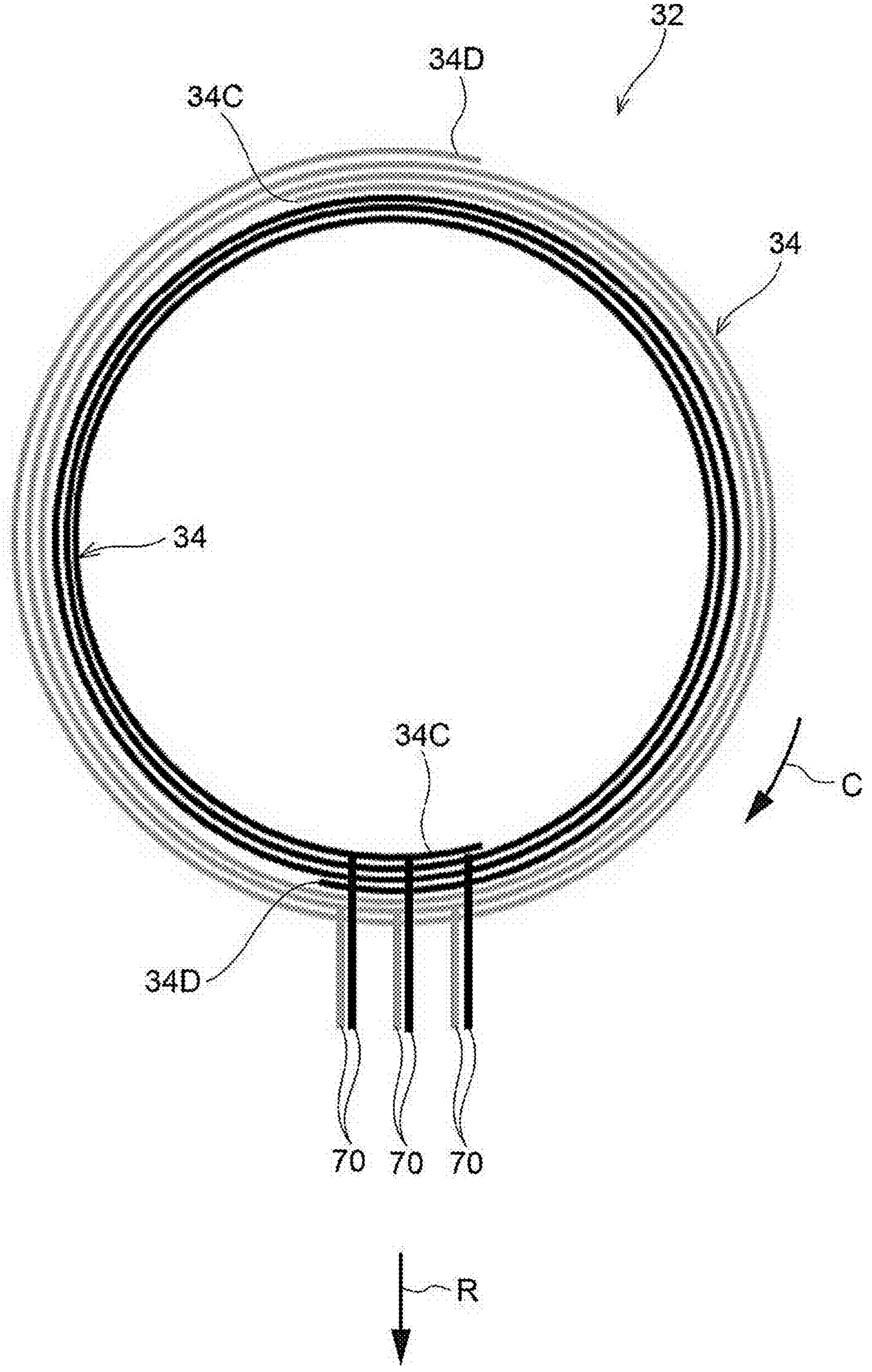
FIG. 44 is a sectional view of a coil assembly of a motor according to the seventeenth embodiment, as taken in a radial direction of the motor.

The structure of the coil assembly 32 of the motor 10 in this embodiment is, as can be seen in FIG. 44, identical with a structure in which the coil assembly 32 in the third embodiment (see FIG. 16) is disposed radially outside the coil assembly 32 in the first embodiment (see FIG. 4). In other words, the coil assembly 32 is equipped with two coil combinations stacked on one another in the radial direction which include a first combination of the coils 16 connected together in a first way and a second combination of the coils 16 connected together in a second way different from the first way.

Other Structures

The above-described embodiments may be combined to realize a structure of the motor 10, while structures described below may be combined to create a structure of the motor 10.

Figure 45:
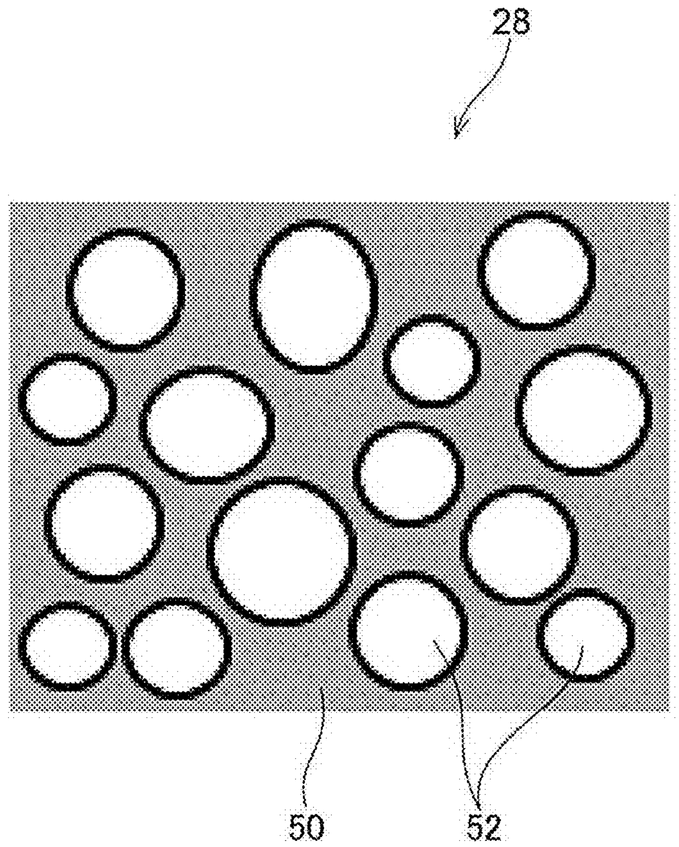
FIG. 45 is a partially enlarged view of an insulator.

FIG. 45 is an enlarged sectional view which schematically illustrates the insulator 28 disposed between the stator core

26 and the coil assembly 32. The insulator 28 includes the base member 50 and the soft magnetic members 52 disposed in the base member 50. The base member 50 is made from an electrically insulating material. Each of the soft magnetic members 52 is made from a soft magnetic material. The insulator 28 in this embodiment is designed to have the soft magnetic members 52 evenly arranged inside the whole of the insulator 28 (i.e., the base member 50). The base member 50 is made from, for example, resin material. Each of the soft magnetic members 52 is made from atomized metal powder, such as iron powder, having soft magnetic properties. The insulator 28 works to direct magnetic flux, as produced by the magnets 18, into stator core 26 through the soft magnetic members 52, thereby reducing a magnetic resistance between each of the magnets 18 and the stator core 26. This enables use of magnetic flux produced by the magnets 18 to enhance the degree of torque outputted by the motor 10.

Figure 46:
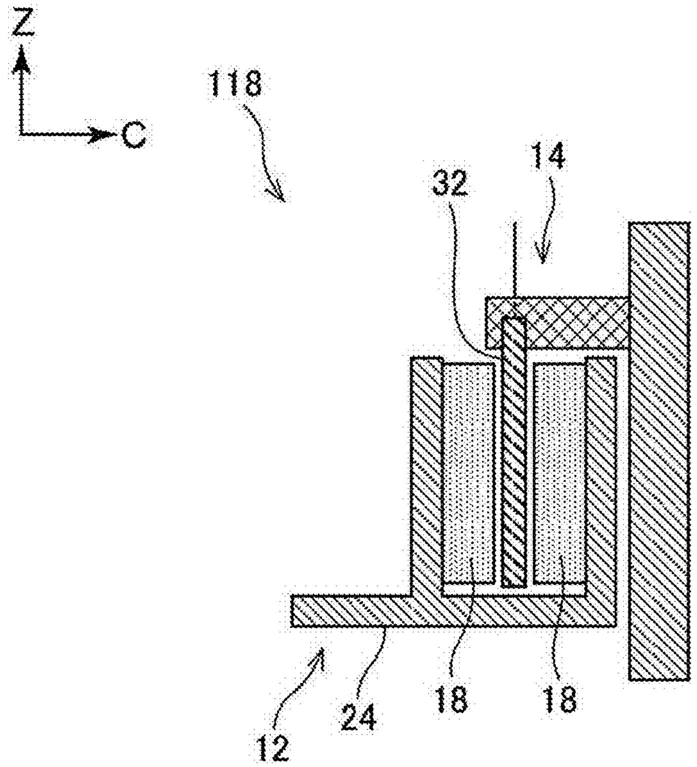
FIG. 46 is a sectional view which illustrates a motor in a modified form.

FIG. 46 illustrates the stator 14 installed in the motor 118 in a modified embodiment. The stator 14 is of a core-less structure which is not equipped with the stator core 26. The rotor 12 of the motor 118 includes the first magnets 18 disposed radially inside the coil assembly 32 and the second magnets 18 radially outside the coil assembly 32.

Figure 47:
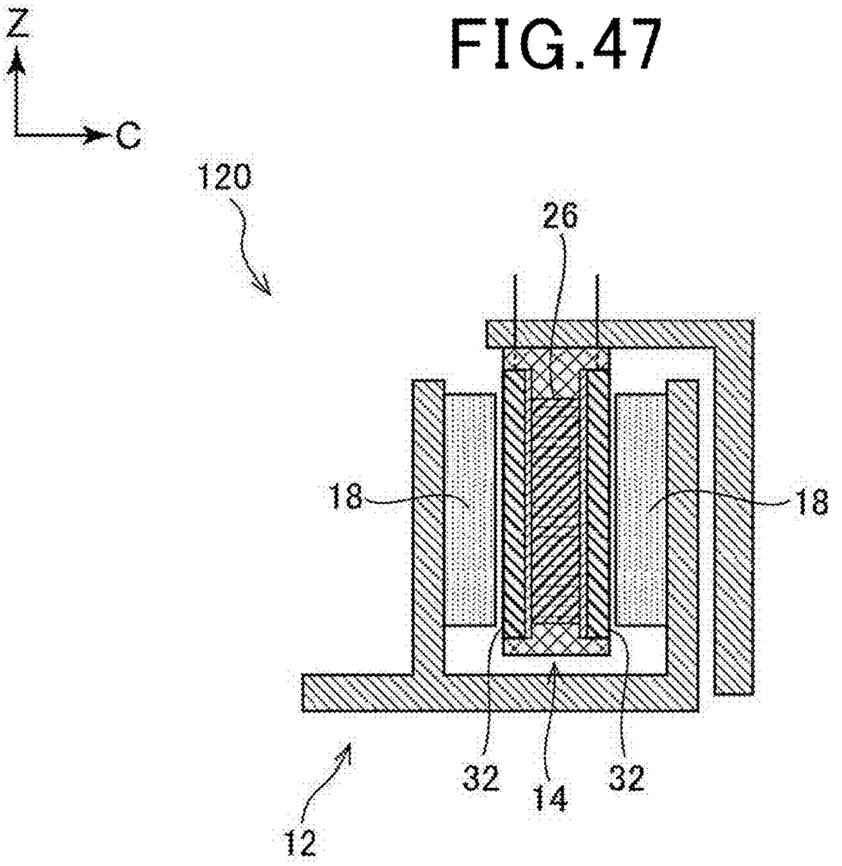
FIG. 47 is a sectional view which illustrates a motor in a modified form.

FIG. 47 illustrates the stator 14 installed in the motor 120 in a modified embodiment. The stator 14 includes the inner coil assembly 32 disposed radially inside the stator core 26 and the outer coil assembly 32 disposed radially outside the stator core 26. The rotor 12 of the motor 120 includes the first magnets 18 arranged radially inside the inner coil assembly 32 and the second magnets 18 arranged radially outside the outer coil assembly 32.

Figure 48:
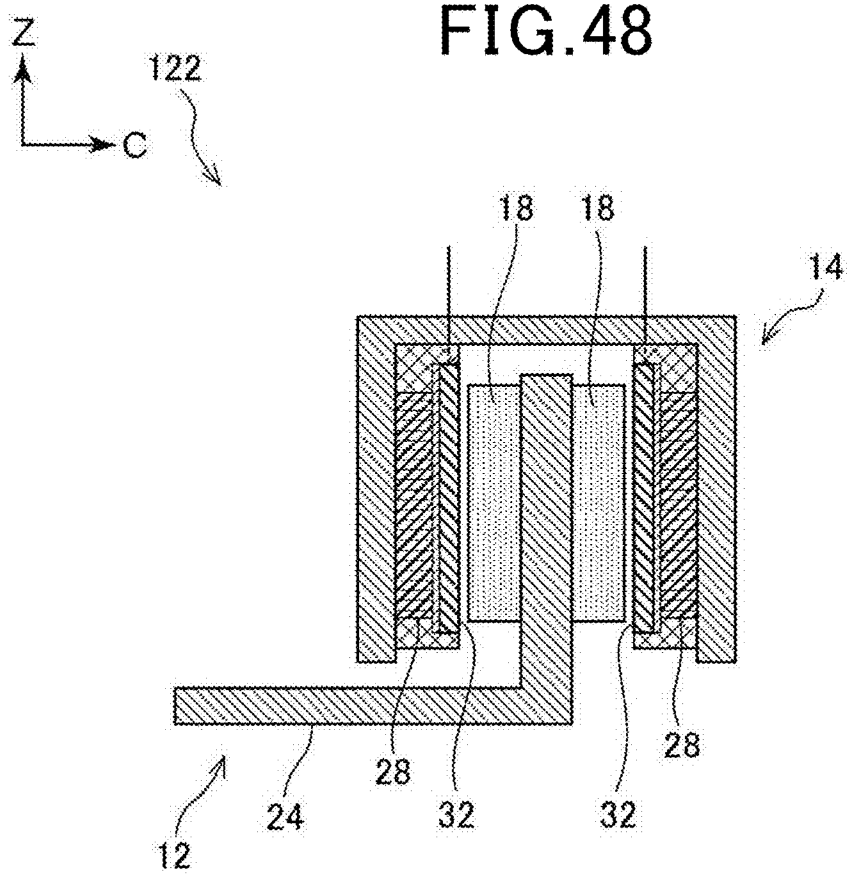
FIG. 48 is a sectional view which illustrates a motor in a modified form.

FIG. 48 illustrates the rotor 12 installed in the motor 122 in a modified embodiment. The rotor 12 includes the rotor core 24, the first magnets 18, and the second magnets 18. The rotor core 24 includes the second cylinder 24B (see FIG. 1). The first magnets 18 are secured to an inner peripheral surface of the second cylinder 24B. The second magnets 18 are secured to an outer peripheral surface of the second cylinder 24B. The stator 14 of the motor 122 includes the first stator core 26, the first coil assembly 32, the second stator core 26, and the second coil assembly 32. The first stator core 26 and the first coil assembly 32 are arranged to face the first magnets 18 attached to the inner peripheral surface of the second cylinder 24B. The second stator core 26 and the second coil assembly 32 are arranged to face the second magnets 18 attached to the outer peripheral surface of the second cylinder 24B.

Figure 49:
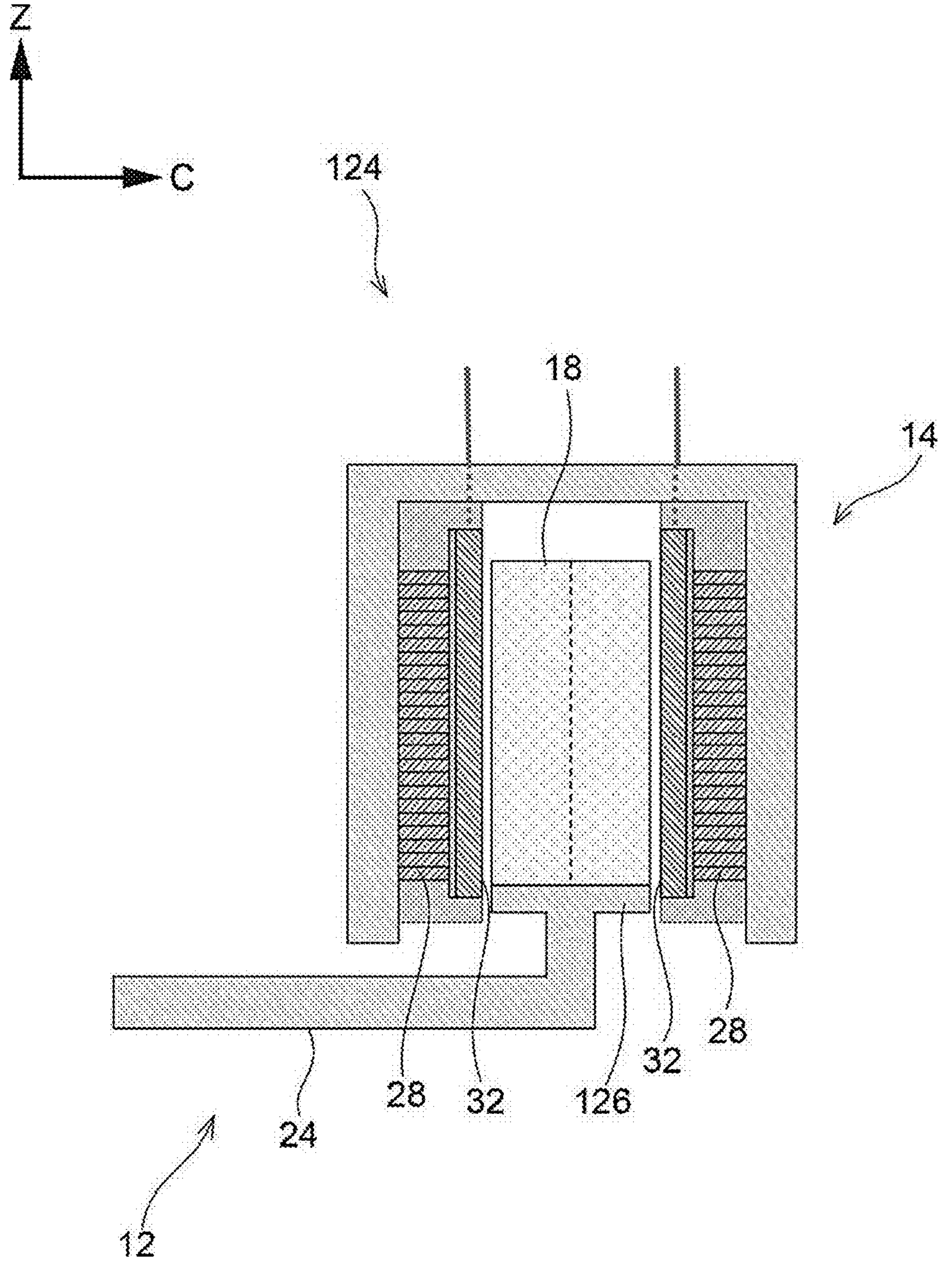
FIG. 49 is a sectional view which illustrates a motor in a modified form.

FIG. 49 illustrates the rotor 12 installed in the motor 124 in a modified embodiment. The rotor 12 includes the magnet retainer 126 and the magnets 18. The magnet retainer 126 is provided on an axial end of the second cylinder 24B which faces in the first axial direction. The magnets 18 are firmly secured to the magnet retainer 126. The stator 14 of the motor 124 includes the first stator core 26, the first coil assembly 32, the second stator core 26, and the second coil assembly 32. The first stator core 26 and the first coil assembly 32 are arranged to face inner peripheral surfaces of the magnets 18. The second stator core 26 and the second coil assembly 32 are arranged to face outer peripheral surfaces of the magnets 18.

The number or location(s) of the coil assembly (lies) 32 of the stator 14, the locations of the magnets 18 of the rotor 12, or the number of the stator cores 26 may be selected, like the motor 118, 120, 122, or 124, depending upon required output properties or required size of the motor.

Figure 50:
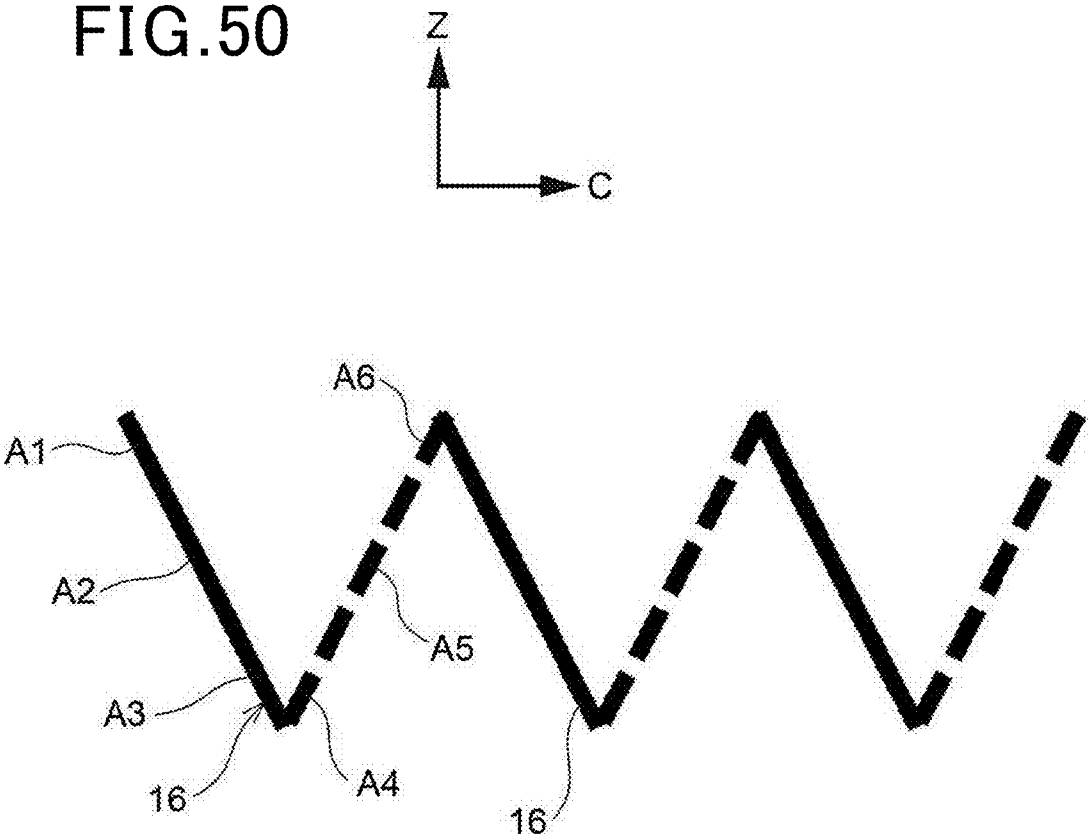
FIG. 50 is a view which shows coils in a modified form.
Figure 51:
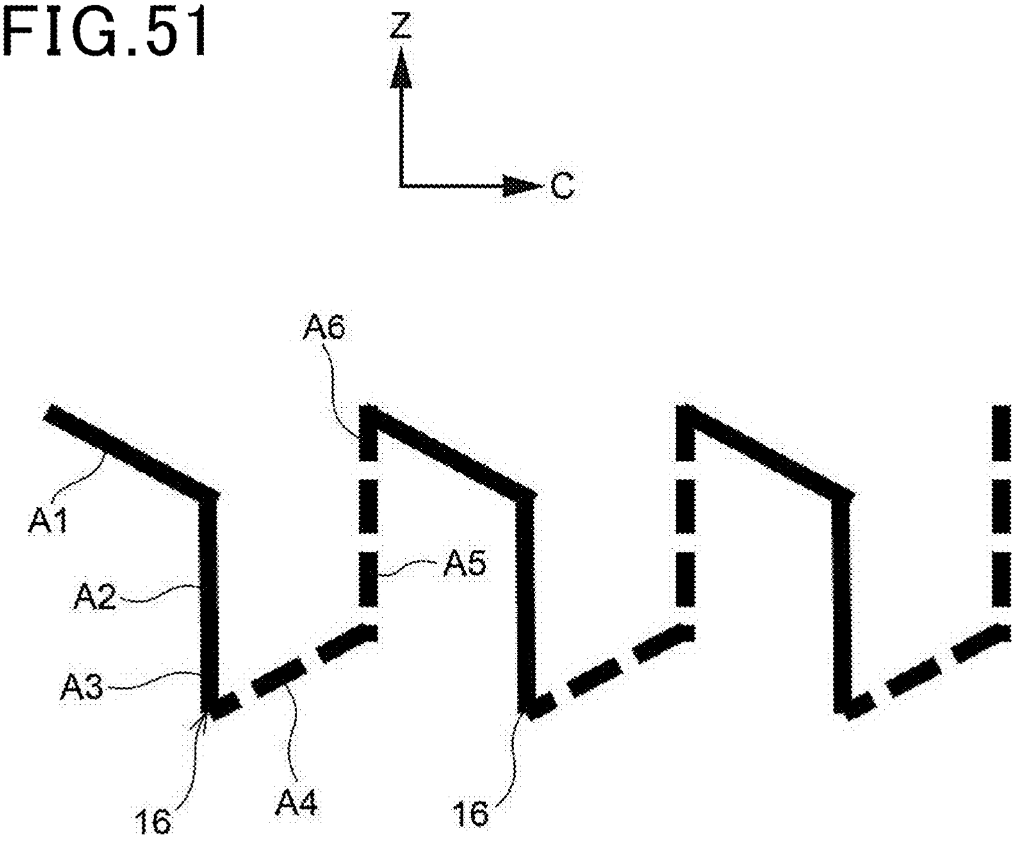
FIG. 51 is a view which shows coils in a modified form.
Figure 52:
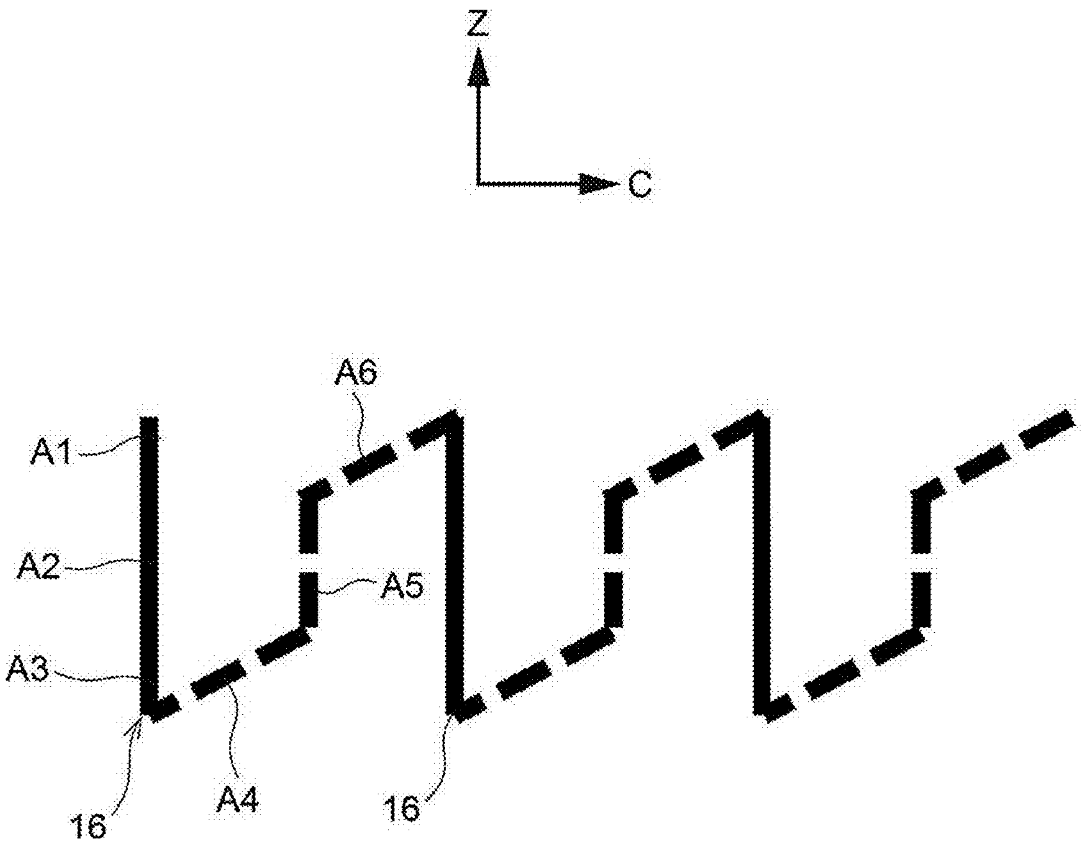
FIG. 52 is a view which shows coils in a modified form.

The configuration of the coils 16 is not limited to that illustrated in FIGS. 6 to 9. For instance, the coils 16 may be designed to have a shape illustrated in FIG. 50, 51, or 52. In FIGS. 50 to 52, parts of each of the coils 16 which are identical in function with those illustrated in FIGS. 6 to 9 are represented by the same refence numbers or symbols.

Eighteenth Embodiment

The motor 10 according to the eighteenth embodiment will be described below. The same reference numbers or symbols as those in the first embodiment will refer to the same parts, and explanation thereof in detail will be omitted here.

Figure 53:
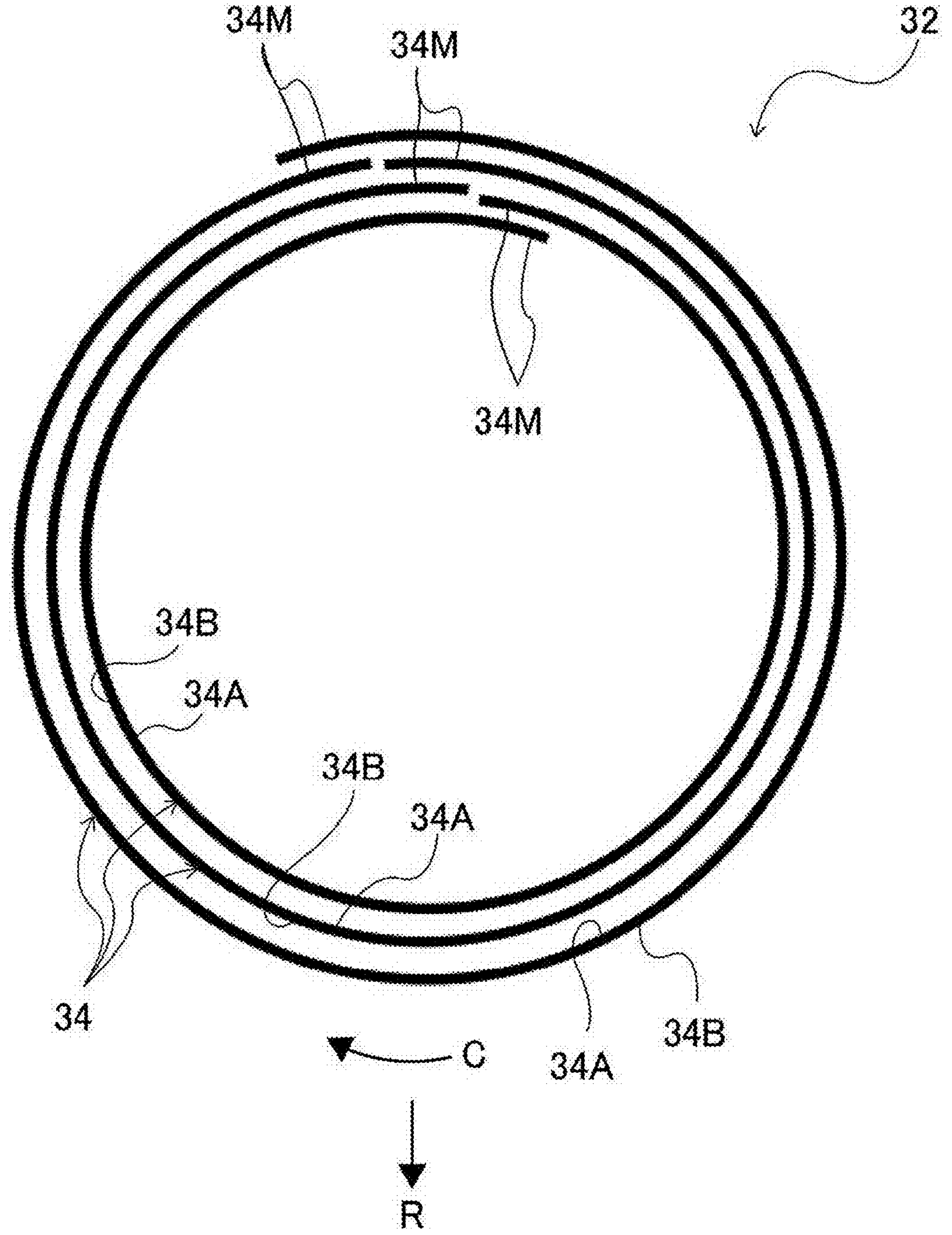
FIG. 53 is a view which illustrates a coil assembly of a motor according to the eighteenth embodiment.

FIG. 53 illustrates the coil assembly 32 installed in the motor 10 according to the eighteenth embodiment. The coil assembly 32 includes a plurality of strip members 34 rolled in the circumferential direction of the coil assembly 32 into a circular shape and stacked on one another in the radial direction of the coil assembly 34. Specifically, the coil assembly 32 includes three strip members: the first strip member 34, the second strip member 34, and third strip member 34 which are stacked on one another in the radial direction of the coil assembly 32. The first strip member 34 forms an innermost one of turns of the coil assembly 32 and will also be referred to below as a first layer. The second strip member 34 forms a middle one of the turns of the coil assembly 32 which lies radially outside the first layer and will also be referred to below as a second layer. The third strip member 34 forms an outermost one of the turns of the coil assembly 32 and will also be referred to below as a third layer. Each of the first to third strip members 34 is made of a single continuous strip, but however, may be made of a plurality of elongated discrete members joined together to form each of the first to third layers.

Figure 54:
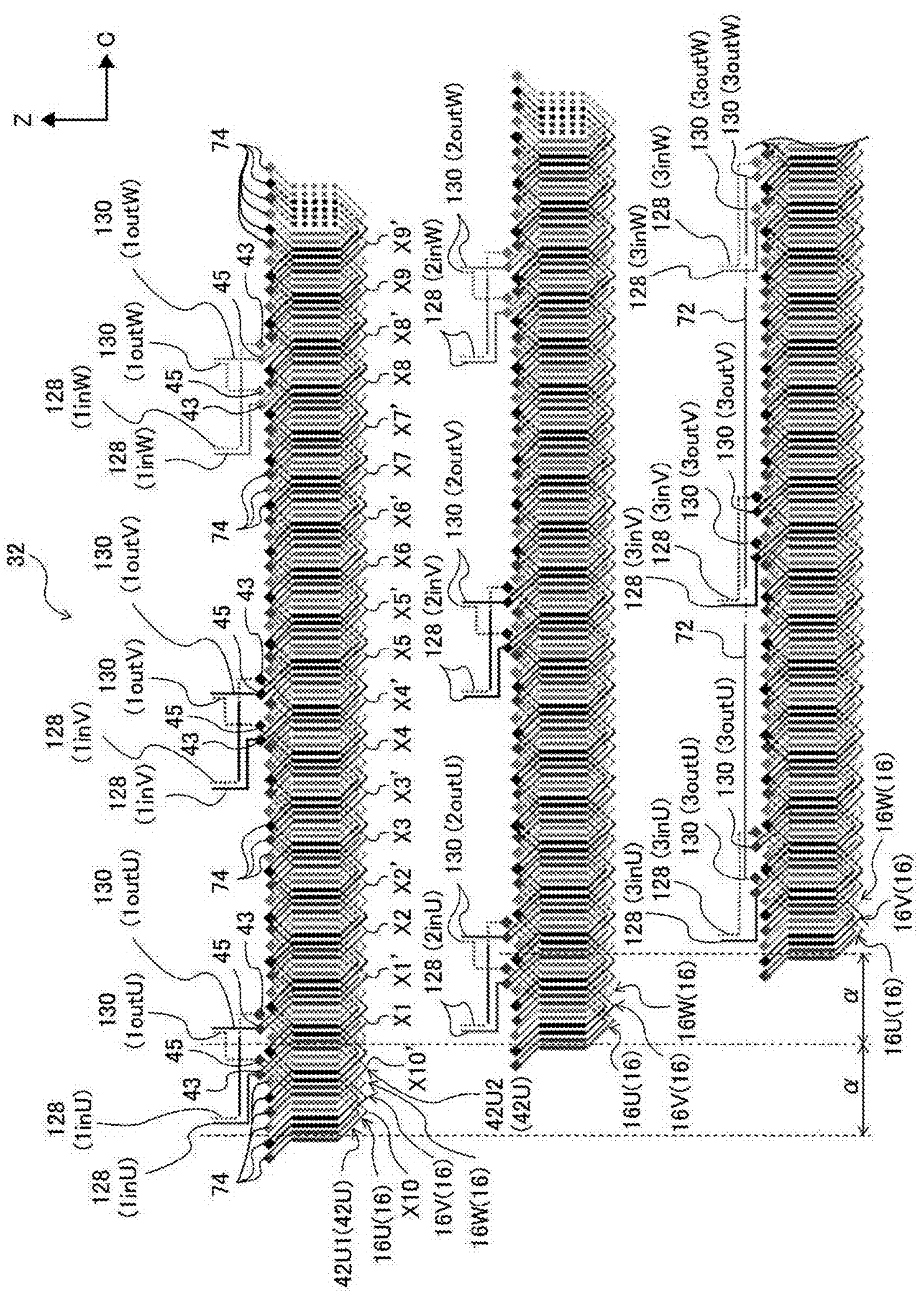
FIG. 54 is a development view which illustrates a coil assembly of a motor according to the eighteenth embodiment.

FIG. 54 illustrates the coils 16 formed on the first strip member 34 (i.e., the first layer), the coils 16 formed on the second strip member 34 (i.e., the second layer), and the coils 16 formed on the third strip member 34 (i.e., the third layer). In FIG. 54, the first to third layers are illustrated as being offset from each other in the axial direction of the coil assembly 32 for the ease of visibility. The coils 16 arranged on the second strip member 34 are, as can be seen in FIG. 54, offset from those arranged on the first strip member 34 in the second circumferential direction of the coil assembly 32. Similarly, the coils 16 arranged on the third strip member 34 are offset from those arranged on the second strip member 34 in the second circumferential direction of the coil assembly 32.

The first strip member 34 has formed thereon the twenty U-phase coils 16U, the twenty V-phase coils 16V, and the twenty W-phase coils 16W.

The U-phase coils 16U arranged on the first strip member 34 are connected together in a predetermined way between the input terminals 128 and the output terminals 130. Specifically, ten of the U-phase coils 16U are connected in series with each other to form the first coil group 42U1, while the remaining ten of the U-phase coils 16U are connected in series with each other to form the second U-phase coil group 42U2. The first U-phase coil group 42U1 and the second U-phase coil group 42U2 are connected in parallel to each other.

For the sake of convenience, the coils 16U of the first U-phase coil group 42U1 are assigned with reference symbols X1, X2, X3, X4, X5, X6, X7, X8, X9, and X10. In the following discussion, the coils 16U of the first U-phase coil group 42U1 will also be denoted by reference symbols 16U (X1) to 16U (X10). For simplicity of illustration, only the reference symbols X1 to X10 are also attached near the coils 16U.

The first strip member 34 (i.e., the first layer), as can be seen in FIG. 54 (also see FIG. 6), has the coil 16U (X10), the coil 16U (X1), the coil 16U (X2), the coil 16U (X3), the coil 16U (X4), the coil 16U (X5), the coil 16U (X6), the coil 16U (X7), the coil 16U (X8), and the coil 16U (X9) which are arranged in this order in the second circumferential direction of the coil assembly 32. The first connecting section 62 of the coil 16U (X1) is used as the input terminal 43. The first connecting section 62 of the coil 16U (X2) is connected to the second connecting section 64 of the coil 16U (X1). The first connecting section 62 of the coil 16U (X3) is connected to the second connecting section 64 of the coil 16U (X2). The first connecting section 62 of the coil 16U (X4) is connected to the second connecting section 64 of the coil 16U (X3). The first connecting section 62 of the coil 16U (X5) is connected to the second connecting section 64 of the coil 16U (X4). The first connecting section 62 of the coil 16U (X6) is connected to the second connecting section 64 of the coil 16U (X5). The first connecting section 62 of the coil 16U (X7) is connected to the second connecting section 64 of the coil 16U (X6). The first connecting section 62 of the coil 16U (X8) is connected to the second connecting section 64 of the coil 16U (X7). The first connecting section 62 of the coil 16U (X9) is connected to the second connecting section 64 of the coil 16U (X8). The second connecting section 64 of the coil 16U (X9) and the first connecting section 62 of the coil 16U (X10) are used as the inter-coil connectors 74 connected together. The second connecting section 64 of the coil 16U (X10) is used as the output terminal 45.

For the sake of convenience, the coils 16U of the second U-phase coil group 42U2 are assigned with reference symbols X1', X2', X3', X4', X5', X6', X7', X8', X9', and X10'. In the following discussion, the coils 16U of the second U-phase coil group 42U2 will also be denoted by reference symbols 16U (X1') to 16U (X10'). For convenience of the drawing, only the reference symbols X1' to X10' are also attached near the coils 16U.

The first strip member 34 (i.e., the first layer) also has the coil 16U (X10'), the coil 16U (X1'), the coil 16U (X2'), the coil 16U (X3'), the coil 16U (X4'), the coil 16U (X5'), the coil 16U (X6'), the coil 16U (X7'), the coil 16U (X8'), and the coil 16U (X9') which are arranged in this order in the second circumferential direction of the coil assembly 32. The first connecting section 62 of the coil 16U (X1') is used as the output terminal 45. The first connecting section 62 of the coil 16U (X2') is connected to the second connecting section 64 of the coil 16U (X1'). The first connecting section 62 of the coil 16U (X3') is connected to the second connecting section 64 of the coil 16U (X2'). The first connecting section 62 of the coil 16U (X4') is connected to the second connecting section 64 of the coil 16U (X3'). The first connecting section 62 of the coil 16U (X5') is connected to the second connecting section 64 of the coil 16U (X4'). The first connecting section 62 of the coil 16U (X6') is connected to the second connecting section 64 of the coil 16U (X5'). The first connecting section 62 of the coil 16U (X7') is connected to the second connecting section 64 of the coil 16U (X6'). The first connecting section 62 of the coil 16U (X8') is connected to the second connecting section 64 of the coil 16U (X7'). The first connecting section 62 of the coil 16U (X9') is connected to the second connecting section 64 of the coil 16U (X8'). The second connecting section 64 of the coil 16U (X9') and the first connecting section 62 of the coil 16U (X10') are used as the inter-coil connectors 74 connected together. The second connecting section 64 of the coil 16U (X10') is used as the input terminal 43.

The input terminal 43 of the coil 16U (X1) and the input terminal 43 of the coil 16U (X10') are connected together using the input terminals 128. The output terminal 45 of the coil 16U (X10) and the output terminal 45 of the coil 16U (X1') are connected together using the output terminals 130. In the following discussion, the input terminals 128 leading to the input terminal 43 of the coil 16U (X1) and the input terminal 43 of the coil 16U (X10') will also be referred to as the first U-phase layer input terminals 128 (1inU). Similarly, the output terminals 130 leading to the output terminal 45 of the coil 16U (X10) and the output terminal 45 of the coil 16U (X1') will also be referred to as the first U-phase layer output terminals 130 (1outU).

The connection of the twenty V-phase coils 16V and connection of the twenty W-phase coils 16W formed on the first strip member 34 (i.e., the first layer) are each achieved in the same way as the twenty U-phase coils 16U. In the following discussion, the connections of the V-phase coils 16V and the W-phase coils 16W will be described without use of drawings and reference numbers or symbols.

The twenty V-phase coils 16V formed on the first strip member 34 are connected together between the input terminals 128 and the output terminals 130 in a predetermined way. Specifically, ten of the V-phase coils 16V are connected in series with each other and form the first coil group 42V1, while the remaining ten of the V-phase coils 16V are connected in series with each other and form the second V-phase coil group 42V2. The first V-phase coil group 42V1 and the second V-phase coil group 42V2 are connected n parallel to each other.

For the sake of convenience, the coils 16V of the first V-phase coil group 42V1 are assigned with reference symbols Y1, Y2, Y3, Y4, Y5, Y6, Y7, Y8, Y9, and Y10 in this order from the input terminals 43 to the output terminals 45. In the following discussion, the coils 16V of the first V-phase coil group 42V1 will also be denoted by reference symbols 16V (Y1) to 16V (Y10).

The first strip member 34 (i.e., the first layer) has the coil 16V (Y7), the coil 16V (Y8), the coil 16V (Y9), the coil 16V (Y10), the coil 16V (Y1), the coil 16V (Y2), the coil 16V (Y3), the coil 16V (Y4), the coil 16V (Y5), and the coil 16V (Y6) which are arranged in this order in the second circumferential direction of the coil assembly 32. The first connecting section 62 of the coil 16V (Y1) is used as the input terminal 43. The first connecting section 62 of the coil 16V (Y2) is connected to the second connecting section 64 of the coil 16V (Y1). The first connecting section 62 of the coil 16V (Y3) is connected to the second connecting section 64 of the coil 16V (Y2). The first connecting section 62 of the coil 16V (Y4) is connected to the second connecting section 64 of the coil 16V (Y3). The first connecting section 62 of the coil 16V (Y5) is connected to the second connecting section 64 of the coil 16V (Y4). The first connecting section 62 of the coil 16V (Y6) is connected to the second connecting section 64 of the coil 16V (Y5). The second connecting section 64 of the coil 16V (Y6) and the first connecting section 62 of the coil 16V (Y7) are used as the inter-coil connectors 74 connected together. The first connecting section 62 of the coil 16V (Y8) is connected to the second connecting section 64 of the coil 16V (Y7). The first connecting section 62 of the coil 16V (Y9) is connected to the second connecting section 64 of the coil 16V (Y8). The first connecting section 62 of the coil 16V (Y10) is connected to the second connecting section 64 of the coil 16V (Y9). The second connecting section 64 of the coil 16V (Y10) is used as the output terminal 45.

For the sake of convenience, the coils 16V of the second V-phase coil group 42V2 are assigned with reference symbols Y1', Y2', Y3', Y4', Y5', Y6', Y7', Y8', Y9', and Y10' in this order from the output terminals 45 to the input terminals 43. In the following discussion, the coils 16V of the second V-phase coil group 42V2 will also be denoted by reference symbols 16V (Y1') to 16V (Y10').

The first strip member 34 (i.e., the first layer) has the coil 16V (Y6'), the coil 16V (Y7'), the coil 16V (Y8'), the coil 16V (Y9'), the coil 16V (Y10'), the coil 16V (Y1'), the coil 16V (Y2'), the coil 16V (Y3'), the coil 16V (Y4'), and the coil 16V (Y5') which are arranged in this order in the second circumferential direction of the coil assembly 32. The first connecting section 62 of the coil 16V (Y1') is used as the output terminal 45. The first connecting section 62 of the coil 16V (Y2') is connected to the second connecting section 64 of the coil 16V (Y1'). The first connecting section 62 of the coil 16V (Y3') is connected to the second connecting section 64 of the coil 16V (Y2'). The first connecting section 62 of the coil 16V (Y4') is connected to the second connecting section 64 of the coil 16V (Y3'). The first connecting section 62 of the coil 16V (Y5') is connected to the second connecting section 64 of the coil 16V (Y4'). The second connecting section 64 of the coil 16V (Y5') and the first connecting section 62 of the coil 16V (Y6') are used as the inter-coil connectors 74 connected together. The first connecting section 62 of the coil 16V (Y7') is connected to the second connecting section 64 of the coil 16V (Y6'). The first connecting section 62 of the coil 16V (Y8') is connected to the second connecting section 64 of the coil 16V (Y7'). The first connecting section 62 of the coil 16V (Y9') is connected to the second connecting section 64 of the coil 16V (Y8'). The first connecting section 62 of the coil 16V (Y10') is connected to the second connecting section 64 of the coil 16V (Y9'). The second connecting section 64 of the coil 16V (Y10') is used as the input terminal 43.

The input terminal 43 of the coil 16V (Y1) and the input terminal 43 of the coil 16V (Y10') are connected together using the input terminals 128. The output terminal 45 of the coil 16V (Y10) and the output terminal 45 of the coil 16V (Y1') are connected together using the output terminals 130. In the following discussion, the input terminals 128 leading to the input terminal 43 of the coil 16V (Y1) and the input terminal 43 of the coil 16V (Y10') will also be referred to as the first V-phase layer input terminals 128 (1inV). Similarly, the output terminals 130 leading to the output terminal 45 of the coil 16V (Y10) and the output terminal 45 of the coil 16V (Y1') will also be referred to as the first V-phase layer output terminals 130 (1outV).

The twenty W-phase coils 16W formed on the first strip member 34 are connected together between the input terminals 128 and the output terminals 130 in a predetermined way. Specifically, ten of the W-phase coils 16W are connected in series with each other and form the first coil group 42W1, while the remaining ten of the W-phase coils 16W are connected in series with each other and form the second W-phase coil group 42W2. The first W-phase coil group 42W1 and the second W-phase coil group 42W2 are connected in parallel to each other.

For the sake of convenience, the coils 16W of the first W-phase coil group 42W1 are assigned with reference symbols Z1, Z2, Z3, Z4, Z5, Z6, Z7, Z8, Z9, and Z10 in this order from the input terminals 43 to the output terminals 45. In the following discussion, the coils 16W of the first W-phase coil group 42W1 will also be denoted by reference symbols 16W (Z1) to 16W (Z10).

The first strip member 34 (i.e., the first layer) has the coil 16W (Z3), the coil 16W (Z4), the coil 16W (Z5), the coil 16W (Z6), the coil 16W (Z7), the coil 16W (Z8), the coil 16W (Z9), the coil 16W (Z10), the coil 16W (Z1), and the coil 16W (Z2) which are arranged in this order in the second circumferential direction of the coil assembly 32. The first connecting section 62 of the coil 16W (Z1) is used as the input terminal 43. The first connecting section 62 of the coil 16W (Z2) is connected to the second connecting section 64 of the coil 16W (Z1). The second connecting section 64 of the coil 16W (Z2) and the first connecting section 62 of the coil 16W (Z3) are used as the inter-coil connectors 74 connected together. The first connecting section 62 of the coil 16W (Z4) is connected to the second connecting section 64 of the coil 16W (Z3). The first connecting section 62 of the coil 16W (Z5) is connected to the second connecting section 64 of the coil 16W (Z4). The first connecting section 62 of the coil 16W (Z6) is connected to the second connecting section 64 of the coil 16W (Z5). The first connecting section 62 of the coil 16W (Z7) is connected to the second connecting section 64 of the coil 16W (Z6). The first connecting section 62 of the coil 16W (Z8) is connected to the second connecting section 64 of the coil 16W (Z7). The first connecting section 62 of the coil 16W (Z9) is connected to the second connecting section 64 of the coil 16W (Z8). The first connecting section 62 of the coil 16W (Z10) is connected to the second connecting section 64 of the coil 16W (Z9). The second connecting section 64 of the coil 16W (Z10) is used as the output terminal 45.

For the sake of convenience, the coils 16W of the second W-phase coil group 42W2 are assigned with reference symbols Z1', Z2', Z3', Z4', Z5', Z6', Z7', Z8', Z9', and Z10' in this order from the output terminals 45 to the input terminals 43. In the following discussion, the coils 16W of the second W-phase coil group 42W2 will also be denoted by reference symbols 16W (Z1') to 16W (Z10').

The first strip member 34 (i.e., the first layer) has the coil 16W (Z3'), the coil 16W (Z4'), the coil 16W (Z5'), the coil 16W (Z6'), the coil 16W (Z7'), the coil 16W (Z8'), the coil 16W (Z9'), the coil 16W (Z10'), the coil 16W (Z1'), and the coil 16W (Z2') which are arranged in this order in the second circumferential direction of the coil assembly 32. The first connecting section 62 of the coil 16V (Y1') is used as the output terminal 45. The first connecting section 62 of the coil 16V (Y2') is connected to the second connecting section 64 of the coil 16V (Y1'). The first connecting section 62 of the coil 16V (Y3') is connected to the second connecting section 64 of the coil 16V (Y2'). The first connecting section 62 of the coil 16V (Y4') is connected to the second connecting section 64 of the coil 16V (Y3'). The first connecting section 62 of the coil 16W (Z1') is used as the output terminal 45. The first connecting section 62 of the coil 16W (Z2') is connected to the second connecting section 64 of the coil 16W (Z1'). The second connecting section 64 of the coil 16W (Z2') and the first connecting section 62 of the coil 16W (Z3') are used as the inter-coil connectors 74 connected together. The first connecting section 62 of the coil 16W (Z4') is connected to the second connecting section 64 of the coil 16W (Z3'). The first connecting section 62 of the coil 16W (Z5') is connected to the second connecting section 64 of the coil 16W (Z4'). The first connecting section 62 of the coil 16W (Z6') is connected to the second connecting section 64 of the coil 16W (Z5'). The first connecting section 62 of the coil 16W (Z7') is connected to the second connecting section 64 of the coil 16W (Z6'). The first connecting section 62 of the coil 16W (Z8') is connected to the second connecting section 64 of the coil 16W (Z7'). The second connecting section 64 of the coil 16W (Z9') is connected to the second connecting section 64 of the coil 16W (Z8'). The first connecting section 62 of the coil 16W (Z10') is connected to the second connecting section 64 of the coil 16W (Z9'). The second connecting section 64 of the coil 16W (Z10') is used as the input terminal 43.

The input terminal 43 of the coil 16W (Z1) and the input terminal 43 of the coil 16W (Z10') are connected together using the input terminals 128. The output terminal 45 of the coil 16W (Z10) and the output terminal 45 of the coil 16W (Z1') are connected together using the output terminals 130. In the following discussion, the input terminals 128 leading to the input terminal 43 of the coil 16W (Z1) and the input terminal 43 of the coil 16W (Z10') will also be referred to as the first W-phase layer input terminals 128 (1inW). Similarly, the output terminals 130 leading to the output terminal 45 of the coil 16W (Z10) and the output terminal 45 of the coil 16W (Z1') will also be referred to as the first W-phase layer output terminals 130 (1outW).

The second strip member 34 and the coils 16 formed on the second strip member 34 are identical in structure with the first strip member 34 and the coils 16 formed on the first strip member 34. Specifically, an electrical circuit extending through the coils 16 on the second strip member 34 is identical in pattern with that of the coils 16 on the first strip member 34. Similarly, an electrical circuit extending through the input terminals 128 and the output terminals 130 formed on the second strip member 34 is identical in pattern with that extending through the input terminals 128 and the output terminals 130 formed on the first strip member 34. The coils 16 arranged on the second strip member 34 which correspond to those arranged on the first strip member 34 will also be assigned with the same reference numbers or symbols as those assigned to the coils 16 on the first strip member 34. The input terminals 128 and the output terminals 130 on the second strip member 34 will also be referred to as the second U-phase layer input terminals 128 (2inU) and the second U-phase layer output terminals 130 (2outU), the second V-phase layer input terminals 128 (2inV) and the second V-phase layer output terminals 130 (2outV), or the second W-phase layer input terminals 128 (2inW) and the second W-phase layer output terminals 130 (2outW), respectively.

The third strip member 34 is identical in structure with the first strip member 34 and the coils 16 formed on the first strip member 34. Specifically, an electrical circuit extending through the coils 16 on the third strip member 34 is identical in pattern with that of the coils 16 on the first strip member 34. Similarly, an electrical circuit extending through the input terminals 128 and the output terminals 130 formed on the third strip member 34 is identical in pattern with that extending through the input terminals 128 and the output terminals 130 formed on the first strip member 34. The coils 16 arranged on the third strip member 34 which correspond to those arranged on the first strip member 34 will also be assigned with the same reference numbers or symbols as those assigned to the coils 16 on the first strip member 34. The input terminals 128 and the output terminals 130 formed on the third strip member 34 will also be referred to as the third U-phase layer input terminals 128 (3inU) and the third U-phase layer output terminals 130 (3outU), the third V-phase layer input terminals 128 (3inV) and the third V-phase layer output terminals 130 (3outV), or the third W-phase layer input terminals 128 (3inW) and the third W-phase layer output terminals 130 (3outW), respectively. The third U-phase layer output terminals 130 (3outU), the third V-phase layer output terminals 130 (3outV), and the third W-phase layer output terminals 130 (3outW) are connected together using the neutral point-connecting patterns 72.

The second strip member 34 is, as can be seen in FIG. 54, offset from the first strip member 34 by an angle $\alpha$ degrees in the first circumferential direction. This causes ends of the first U-phase layer output terminals 130 (1outU) on the first strip member 34 and ends of the second U-phase layer input terminals 128 (2inU) on the second strip member 34 to coincide with each other in the circumferential direction of the coil assembly 32. Similarly, ends of the first V-phase layer output terminals 130 (1outV) and ends of the second V-phase layer input terminals 128 (2inV) coincide with each other in the circumferential direction of the coil assembly 32. Similarly, ends of the first W-phase layer output terminals 130 (1outW) and ends of the second W-phase layer input terminals 128 (2inW) coincide with each other in the circumferential direction of the coil assembly 32. The angle $\alpha$ degrees is, as illustrated in FIG. 54 (also see FIG. 6) is selected to be twice an angle between the center of the second straight section A2 of the coil 16 and the center of the fifth straight section A5 of the coil 16 in the circumferential direction of the coil assembly 32.

The third strip member 34 is, as can be seen in FIG. 54, offset from the second strip member 34 by an angle $\alpha$ degrees in the first circumferential direction. This causes ends of the second U-phase layer output terminals 130 (2outU) and ends of the third U-phase layer input terminals 128 (3inU) to coincide with each other in the circumferential direction of the coil assembly 32. Similarly, ends of the second V-phase layer output terminals 130 (2outV) and ends of the third V-phase layer input terminals 128 (3inV) coincide with each other in the circumferential direction of the coil assembly 32. Similarly, ends of the second W-phase layer output terminals 130 (2outW) and ends of the third W-phase layer input terminals 128 (3inW) coincide with each other in the circumferential direction of the coil assembly 32.

Figure 55:
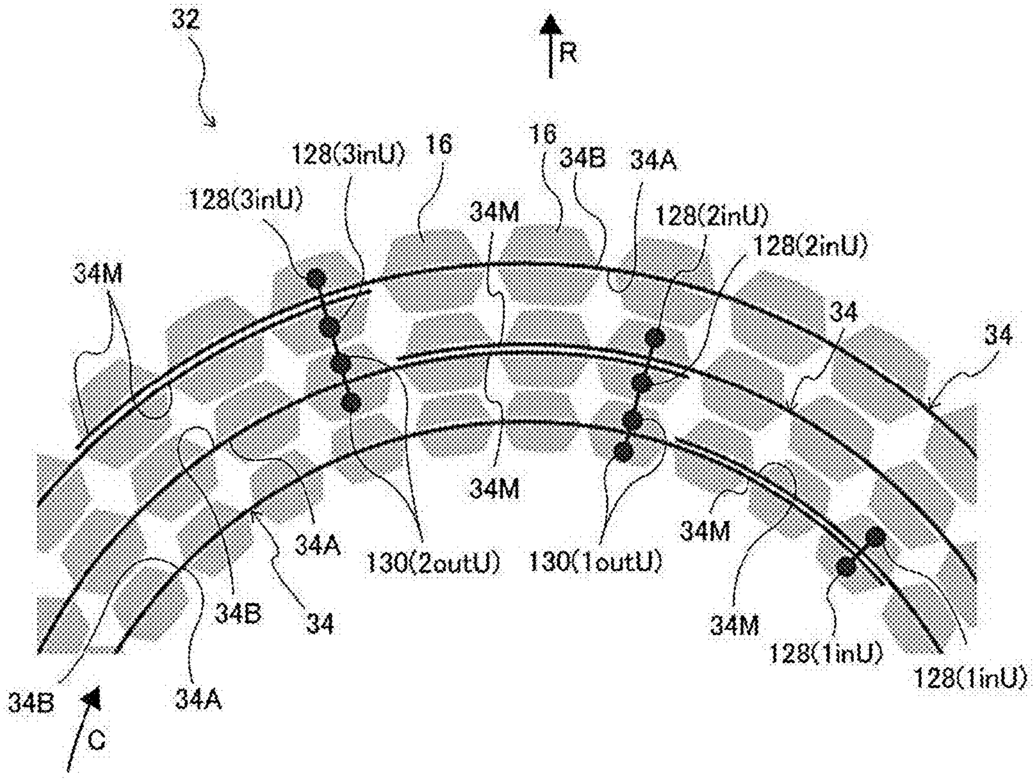
FIG. 55 is an enlarged view which illustrates a coil assembly of a motor according to the eighteenth embodiment, as viewed in an axial direction of the motor.

Ends of the first U-phase layer output terminals 130 (1outU) and ends of the second U-phase layer input terminals 128 (2inU), as can be seen in FIG. 55, coincide with each other in the circumferential direction of the coil assembly 32. Similarly, ends of the second U-phase layer output terminals 130 (2outU) and ends of the third U-phase layer input terminals 128 (3inU) coincide with each other in the circumferential direction of the coil assembly 32. The ends of the first U-phase layer output terminals 130 (1outU) and the ends of the second U-phase layer input terminals 128 (2inU) are connected together through vias or conductors. Similarly, the ends of the second U-phase layer output terminals 130 (2outU) and the ends of the third U-phase layer input terminals 128 (3inU) are connected together using vias or other conductors.

Although not illustrated, ends of the first V-phase layer output terminals 130 (1outV) and ends of the second V-phase layer input terminals 128 (2inV) coincide with each other in the circumferential direction of the coil assembly 32. Ends of the second V-phase layer output terminals 130 (2outV) and ends of the third V-phase layer input terminals 128 (3inV) coincide with each other in the circumferential direction of the coil assembly 32. Ends of the first W-phase layer output terminals 130 (1outW) and ends of the second W-phase layer input terminals 128 (2inW) coincide with each other in the circumferential direction of the coil assembly 32. Ends of the second W-phase layer output terminals 130 (2outW) and ends of the third W-phase layer input terminals 128 (3inW) coincide with each other in the circumferential direction of the coil assembly 32.

The first U-phase layer input terminals 128 (1inU), the first V-phase layer input terminals 128 (1inV), and the first W-phase layer input terminals 128 (1inW) are connected to the power supply.

The second strip member 34 is longer in length than the first strip member 34 in the circumferential direction of the coil assembly 32. Similarly, the third strip member 34 is longer in length than the second strip member 34. The width or distance between the ends of each pattern of the coils 16 formed on the second strip member 34 in the circumferential direction of the coil assembly 32 is, therefore, selected to be greater than that of each pattern of the coils 16 formed on the first strip member 34. Similarly, the width or distance between the ends of each pattern of the coils 16 formed on the third strip member 34 in the circumferential direction of the coil assembly 32 is selected to be greater than that of each pattern of the coils 16 formed on the second strip member 34.

The above-described coil assembly 32 in this embodiment, as can be seen in FIGS. 53, 54, and 55, facilitates the ease with which the output terminals 130 on the first strip member 34 (i.e., the first layer) and the input terminals 128 on the second strip member 34 (i.e., the second layer) are electrically connected together at the same positions in the circumferential direction of the coil assembly 32 and also facilitates the ease with which the output terminals 130 on the second strip member 34 and the input terminals 128 on the third strip member 34 are electrically connected together at the same positions in the circumferential direction of the coil assembly 32.

In the coil assembly 32 in this embodiment, the first strip member 34, as clearly illustrated in FIGS. 53 and 55, has the ends laid to overlap each other in the radial direction of the coil assembly 32 to form the overlap 34M. Similarly, the second strip member 34 has the ends laid to overlap each other in the radial direction of the coil assembly 32 to form the overlap 34M. Similarly, the third strip member 34 has the ends laid to overlap each other in the radial direction of the coil assembly 32 to form the overlap 34M. The overlaps 34M of the first, second, and third strip members 34 are offset from each other in the circumferential direction of the coil assembly 32, thereby minimizing deformation of the coil assembly 32 in the radial direction thereof as compared with when the overlaps 34M of the first, second, and third strip members 34 are arranged in alignment with each other in the radial direction of the coil assembly 32. The coil assembly 32 in this embodiment is also designed to have the coils 16 whose circuit patterns on one of the strip members 34 are identical with those of the coils 16 on another of the strip members 34, thereby enabling the coils 16 to be designed in similar ways to all the strip members 34, which results in a decrease in number of production steps of the coil assembly 32.

The coil assembly 32 in this embodiment has three layers: the first to third strip members 34, but however, may alternatively be designed to have the strip members 34 stacked in the form of two layers or four or more layers. In such a case, the offset between or among the strip members 34 which is an integral multiple of a is achieved by altering or regulating the positions of the input terminals 128 and the output terminals 130.

Nineteenth Embodiment

The motor 10 according to the nineteenth embodiment will be described below. The same reference numbers or symbols as those in the first embodiment will refer to the same parts, and explanation thereof in detail will be omitted here.

Figure 56:
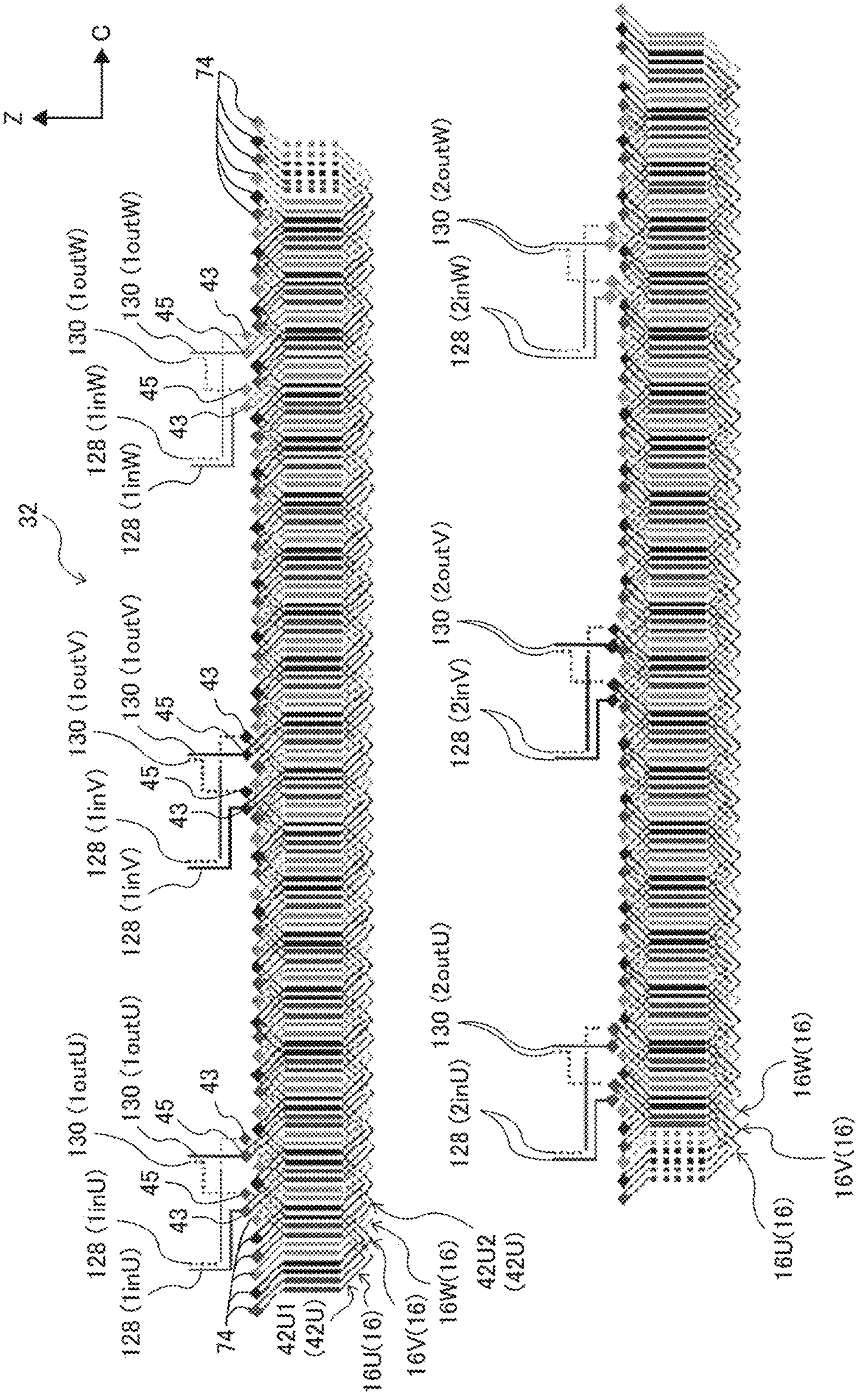
FIG. 56 is a development view which illustrates a coil assembly of a motor according to the nineteenth embodiment.

FIG. 56 illustrates the coils 16 formed on the first strip member 34 and the second strip member 34 as being offset from each other in the axial direction of the coil assembly 32 for the ease of visibility. The coils 16 on the second strip member 34 are offset from those on the first strip member 34 in the second axial direction of the coil assembly 32. The coil assembly 32 in the nineteenth embodiment is basically identical in structure with that in the eighteenth embodiment except for the coils 16 on the second strip member 34 being designed to have structures as will be described below.

The coils 16 which correspond to or are identical with those of the coils 16, as denoted by solid lines, on the first surface 34A (see FIG. 53) of the first strip member 34 are formed on the second surface 34B of the second strip member 34. The coils 16 which correspond to or are identical with those of the coils 16, as denoted by broken lines, on the second surface 34B (see FIG. 53) of the first strip member 34 are formed on the first surface 34A of the second strip member 34. For the sake of simplicity of the disclosure, the following discussion will refer to comparison between the U-phase coils 16 arranged on the first strip member 34 and the U-phase coils 16U arranged on the second strip member 34.

Figure 57:
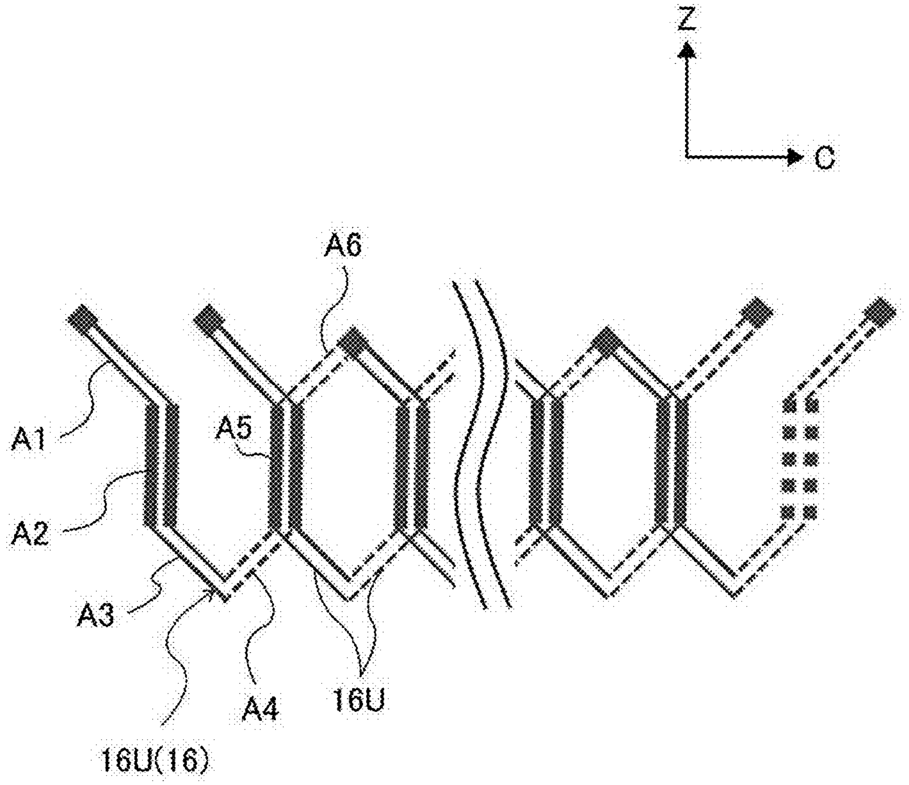
FIG. 57 is a view which illustrates U-phase coils formed on a first one of turns of a strip member.

FIG. 57 illustrates the U-phase coils 16U formed on the first strip member 34 (i.e., the first layer). Specifically, each of the U-phase coils 16U has the first straight sections A1, the second straight sections A2, and the third straight sections A3 arranged on the first surface 34A and also has the fourth straight sections A4, the fifth straight sections A5, and the sixth straight sections A6 arranged on the second surface 34B. Although not illustrated, each of the W-phase coils 16V formed on the first strip member 34 has the first straight sections A1, the second straight sections A2, and the third straight sections A3 arranged on the first surface 34A and also has the fourth straight sections A4, the fifth straight sections A5, and the sixth straight sections A6 formed on the second surface 34B. Each of the W-phase coils 16W formed on the first strip member 34 has the first straight sections A1, the second straight sections A2, and the third straight sections A3 arranged on the first surface 34A and also has the fourth straight sections A4, the fifth straight sections A5, and the sixth straight sections A6 arranged on the second surface 34B.

Figure 58:
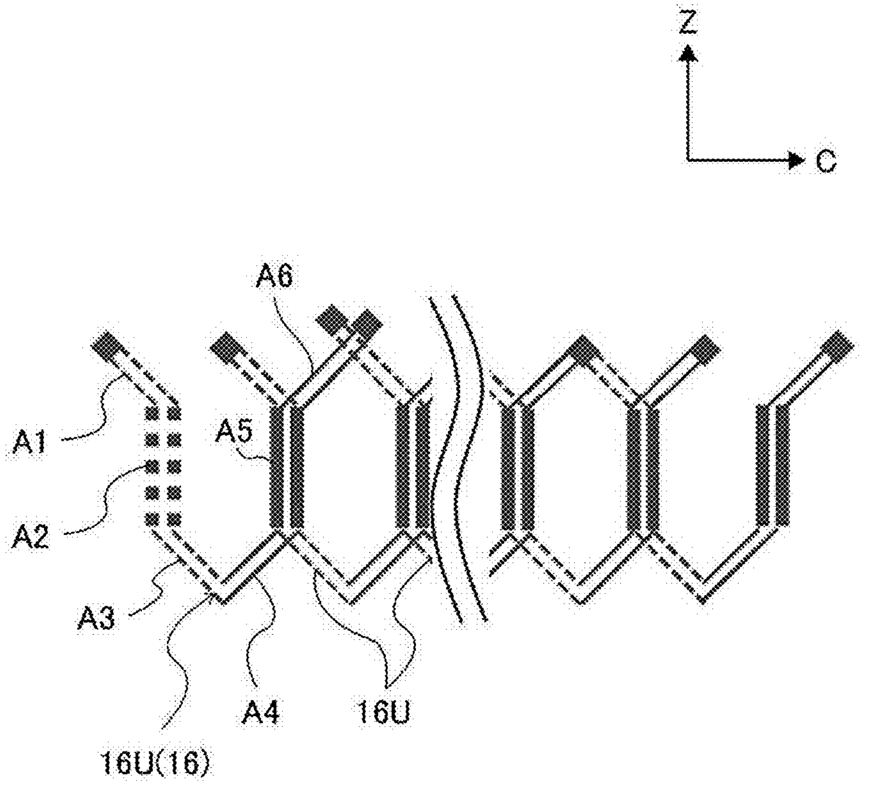
FIG. 58 is a view which illustrates U-phase coils formed on a second one of turns of a strip member.

FIG. 58 illustrates the U-phase coils 16U formed on the second strip member 34. Specifically, each of the U-phase coils 16U formed on the second strip member 34 has the first straight sections A1, the second straight sections A2, and the third straight sections A3 arranged on the second surface 34B and also has the fourth straight sections A4, the fifth straight sections A5, and the sixth straight sections A6 arranged on the first surface 34A. Although not illustrated, each of the V-phase coils 16V formed on the second strip member 34 has the first straight sections A1, the second straight sections A2, and the third straight sections A3 arranged on the second surface 34B and also has the fourth straight sections A4, the fifth straight sections A5, and the sixth straight sections A6 arranged on the first surface 34A. Each of the W-phase coils 16W formed on the second strip member 34 has the first straight sections A1, the second straight sections A2, and the third straight sections A3 arranged on the second surface 34B and also has the fourth straight sections A4, the fifth straight sections A5, and the sixth straight sections A6 arranged on the first surface 34A.

The above-described structure of the coil assembly 32 in this nineteenth embodiment offers substantially the same beneficial advantages as those in the eighteenth embodiment.

Twentieth Embodiment

The motor 10 according to the twentieth embodiment will be described below. The same reference numbers or symbols as those in the first embodiment will refer to the same parts, and explanation thereof in detail will be omitted here.

Figure 59:
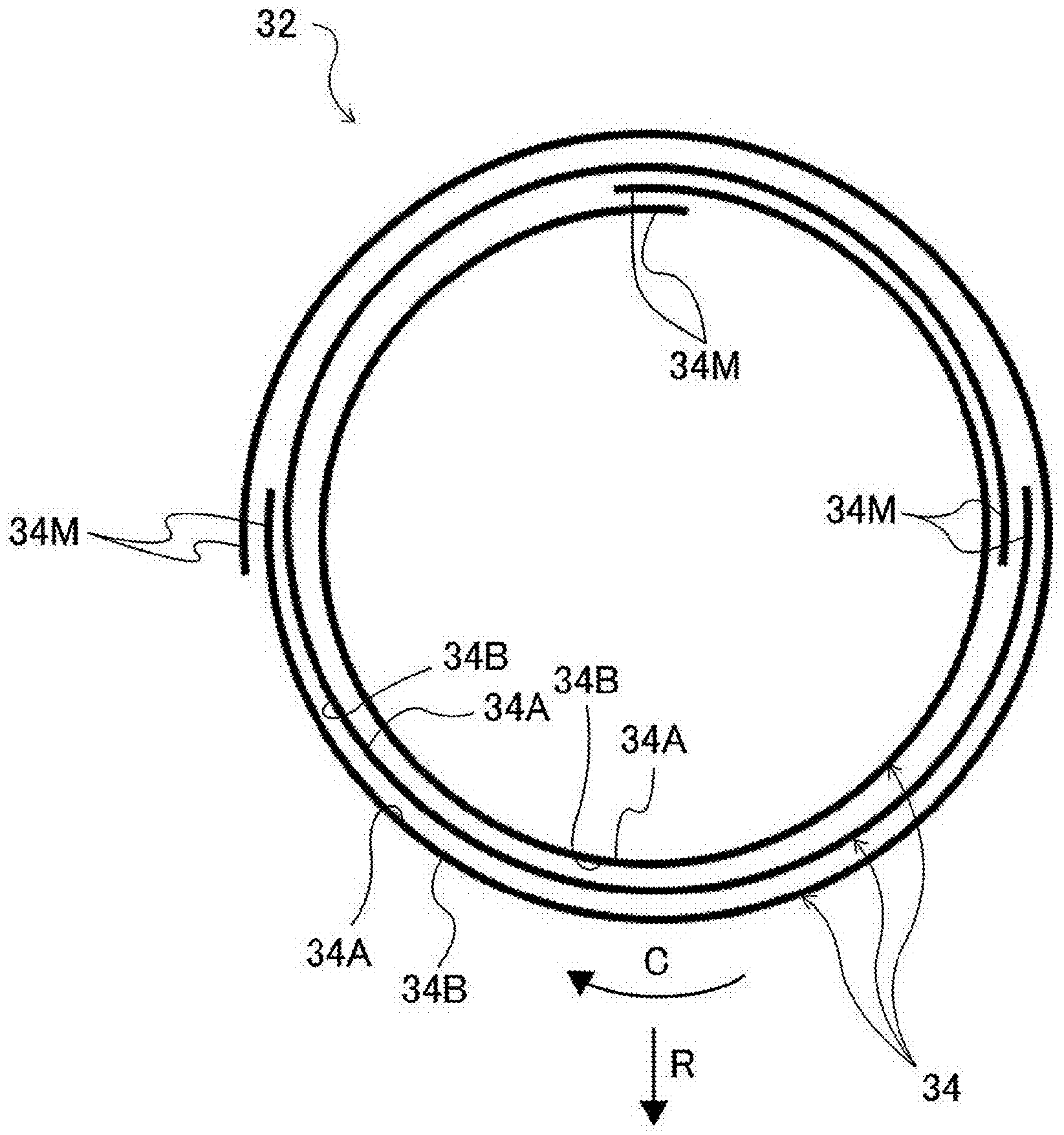
FIG. 59 is a view which illustrates a coil assembly of a motor according to the twentieth embodiment, as viewed in an axial direction of the motor.

In the coil assembly 32 in this embodiment, the first strip member 34, as clearly illustrated in FIG. 59, has the ends laid to overlap each other in the radial direction of the coil assembly 32 to form the overlap 34M. Similarly, the second strip member 34 has the ends laid to overlap each other in the radial direction of the coil assembly 32 to form the overlap 34M. Similarly, the third strip member 34 has the ends laid to overlap each other in the radial direction of the coil assembly 32 to form the overlap 34M. The overlaps 34M of the first, second, and third strip members 34 are arranged at an angular interval away from each other which is greater than that in the coil assembly 32 in the eighteenth embodiment illustrated in FIG. 53.

Figure 60:
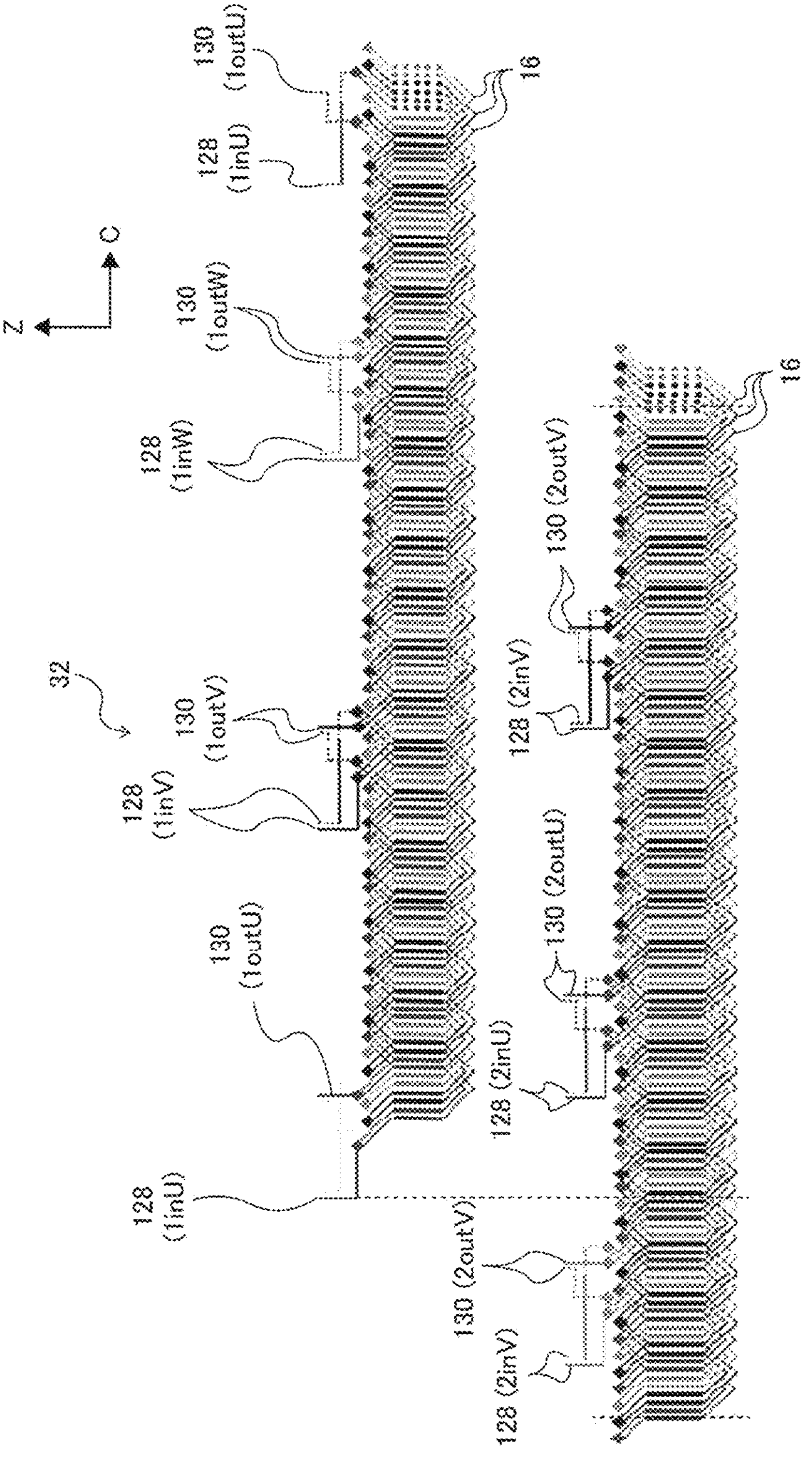
FIG. 60 is a development view which illustrates a coil assembly of a motor according to the twentieth embodiment.

FIG. 60 illustrates the coils 16 formed on the first strip member 34 and the second strip member 34 as being offset from each other in the axial direction of the coil assembly 32 for the ease of visibility. The coils 16 on the second strip member 34 are offset from those on the first strip member 34 in the second axial direction of the coil assembly 32. The coil assembly 32 in the twentieth embodiment is different in locations of the input terminals 128 and the output terminals 130 on each of the strip members 34 from that in the eighteenth embodiment. Other arrangements are identical and explanation thereof in detail will be omitted here.

The above-described structure of the coil assembly 32 in this embodiment enables the overlaps 34M, as formed by joints of the ends of the strip members 34, to be arranged at angular intervals away from each other which are greater than those in the eighteenth embodiment by altering the locations of the input terminals 128 and the output terminals 130 on the strip members 34.

Twenty-First Embodiment

The motor 10 according to the twenty-first embodiment will be described below. The same reference numbers or symbols as those in the first embodiment will refer to the same parts, and explanation thereof in detail will be omitted here.

Figure 61:
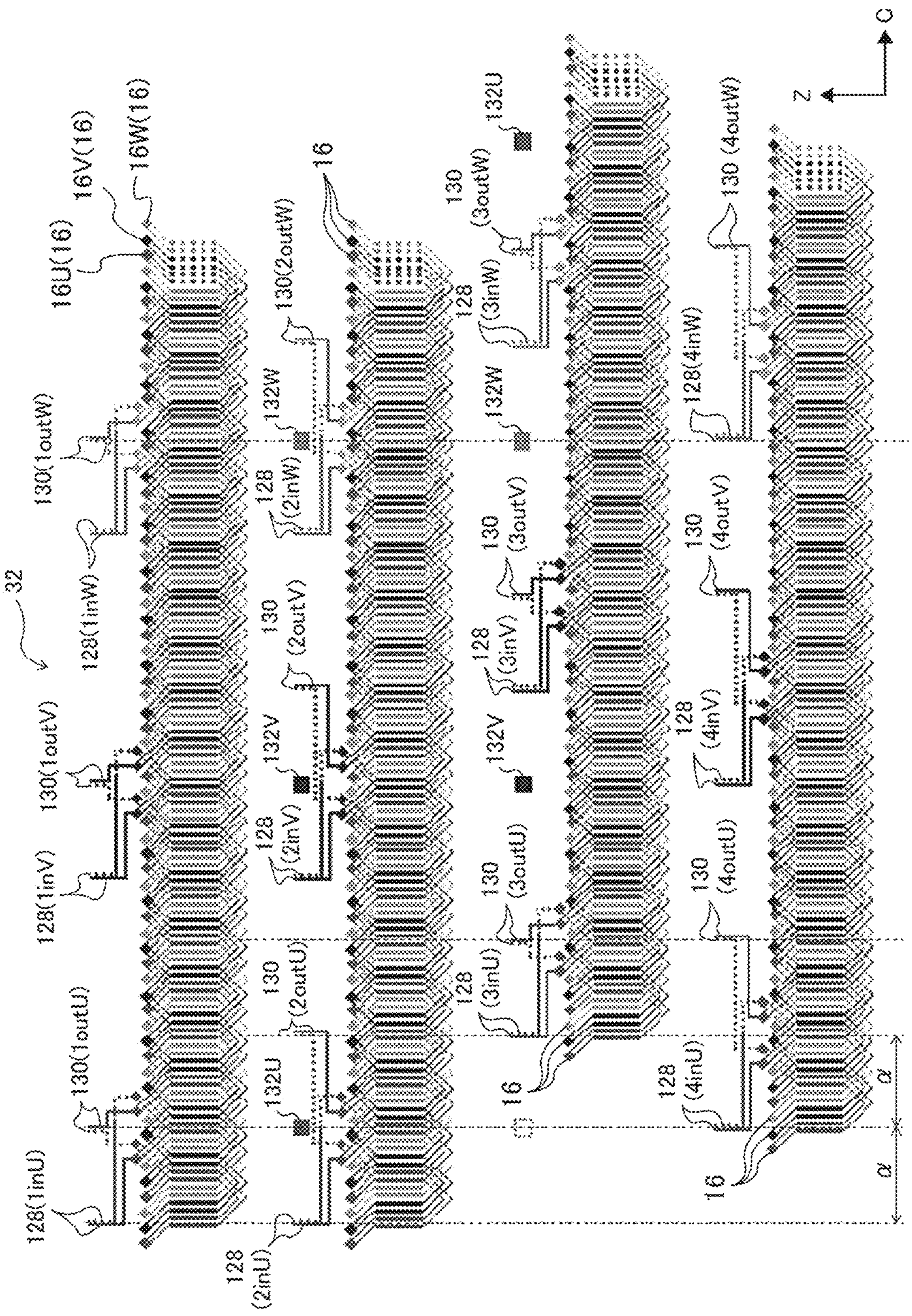
FIG. 61 is a development view which illustrates a coil assembly of a motor according to the twenty-first embodiment.

FIG. 61 illustrates the coils 16 formed on the first strip member 34, the coils 16 formed on the second strip member 34, the coils 16 formed on the third strip member 34, and the coils 16 formed on the fourth strip member 34 (i.e., fourth layer or rightmost layer, as viewed in the drawing) as being offset from each other in the axial direction of the coil assembly 32 for the sake of ease of visibility. Specifically, the coil assembly 32 in the twenty-first embodiment is made of four layers: the first to fourth strip members 34 stacked on one another in the radial direction of the coil assembly 32. The coils 16 on the second strip member 34 are shown as being offset from the coils 16 on the first strip member 34 in the second axial direction of the coil assembly 32. The coils 16 on the third strip member 34 are shown as being offset from the coils 16 on the second strip member 34 in the second axial direction of the coil assembly 32. The coils 16 on the fourth strip member 34 are shown as being offset from the coils 16 on the third strip member 34 are offset from the coils 16 on the second strip member 34 in the second axial direction of the coil assembly 32.

The coils 16, the input terminals 128, and the output terminals 130 disposed on the first strip member 34 are identical in structure with the coils 16, the input terminals 128, and the output terminals 130 disposed on the third strip member 34. Similarly, the coils 16, the input terminals 128, and the output terminals 130 disposed on the second strip member 34 are identical in structure with the coils 16, the input terminals 128, and the output terminals 130 disposed on the fourth strip member 34. In the following discussion, the input terminals 128 and the output terminals 130 on the fourth strip member 34 will also be referred to as the fourth U-phase layer input terminals 128 (4inU) and the fourth U-phase layer output terminals 130 (4outU), the fourth V-phase input terminals 128 (4inV) and the fourth V-phase output terminals 130 (4outV), or the fourth W-phase input terminals 128 (4inW) and the fourth W-phase output terminals 130 (4outW), respectively.

The second strip member 34 is, as can be seen in FIG. 61, located in coincidence with the first strip member 34 in the circumferential direction of the coil assembly 32, so that the first U-phase layer input terminals 128 (1inU) and the second U-phase layer input terminals 128 (2inU) coincide with each other in the circumferential direction. The first U-phase input terminals 128 (1inU) and the second U-phase layer input terminals 128 (2inU) are electrically connected together. The first V-phase layer input terminals 128 (1inV) and the second V-phase layer input terminals 128 (2inV) are located in coincidence with each other in the circumferential direction of the coil assembly 32. The first V-phase layer input terminals 128 (1inV) and the second V-phase layer input terminals 128 (2inV) are electrically connected together. The first W-phase layer input terminals 128 (1inW) and the second W-phase layer input terminals 128 (2inW) are located in coincidence with each other in the circumferential direction of the coil assembly 32. The first W-phase layer input terminals 128 (1inW) and the second W-phase layer input terminals 128 (2inW) are electrically connected together.

The third strip member 34 is, as can be seen in FIG. 61, offset from the second strip member 34 by twice an angle $\alpha$ ($2\times\alpha$) degrees in the first circumferential direction, so that the third U-phase layer input terminals 128 (3inU) and the second U-phase layer output terminals 130 (2outU) are located at the same positions in the circumferential direction of the coil assembly 32. The third U-phase layer input terminals 128 (3inU) and the second U-phase layer output terminals 130 (2outU) are electrically connected together. This causes the U-phase coils 16U on the second strip member 34 and the U-phase coils 16U on the third strip member 34 to be connected in series with each other. The third V-phase layer input terminals 128 (3inV) and the second V-phase layer output terminals 130 (2outV) are located at the same positions in the circumferential direction of the coil assembly 32. The third V-phase layer input terminals 128 (3inV) and the second V-phase layer output terminals 130 (2outV) are electrically connected together. This causes the V-phase coils 16V on the second strip member 34 and the V-phase coils 16V on the third strip member 34 to be electrically connected in series with each other. The third W-phase layer input terminals 128 (3inW) and the second W-phase layer output terminals 130 (2outW) are located at the same positions in the circumferential direction of the coil assembly 32, so that the third W-phase layer input terminals 128 (3inW) and the second W-phase layer output terminals 130 (2outW) are electrically connected together. This causes the W-phase coils 16W on the second strip member 34 and the W-phase coils 16W on the third strip member 34 to be electrically connected in series with each other.

The fourth strip member 34 is offset from the second strip member 34 by an angle α degrees in the first circumferential direction, so that the third U-phase layer output terminals 130 (3outU) and the fourth U-phase output terminals 130 (4outU) are located at the same positions in the circumferential direction of the coil assembly 32. The third U-phase layer output terminals 130 (3outU) and the fourth U-phase output terminals 130 (4outU) are electrically connected together. The third V-phase layer output terminals 130 (3outV) and the fourth V-phase output terminals 130 (4outV) are located at the same positions in the circumferential direction of the coil assembly 32. The third V-phase layer output terminals 130 (3outV) and the fourth V-phase output terminals 130 (4outV) are electrically connected together. The third W-phase layer output terminals 130 (3outW) and the fourth W-phase output terminals 130 (4outW) are located at the same positions in the circumferential direction of the coil assembly 32. The third W-phase layer output terminals 130 (3outW) and the fourth W-phase output terminals 130 (4outW) are electrically connected together.

Each of the second strip member 34 and the third strip member 34 has three bypass conductors 132U, 132V, and 132W disposed thereon. The first U-phase layer output terminals 130 (1outU) and the fourth U-phase input terminals 128 (4inU) are electrically connected together using the bypass conductor 132U on the second strip member 34 and the bypass conductor 132U on the third strip member 34. This causes the U-phase coils 16U on the first strip member 34 and the U-phase coils 16U on the fourth strip member 34 to be electrically connected in series with each other. The first V-phase layer output terminals 130 (1outV) and the fourth V-phase input terminals 128 (4inV) are electrically connected together using the bypass conductor 132V on the second strip member 34 and the bypass conductor 132V on the third strip member 34. This causes the V-phase coils 16V on the first strip member 34 and the V-phase coils 16V on the fourth strip member 34 to be electrically connected in series with each other. The first W-phase layer output terminals 130 (1outW) and the fourth W-phase input terminals 128 (4inW) are electrically connected together using the bypass conductor 132W on the second strip member 34 and the bypass conductor 132W on the third strip member 34. This causes the W-phase coils 16W on the first strip member 34 and the W-phase coils 16W on the fourth strip member 34 to be electrically connected in series with each other.

Figure 62:
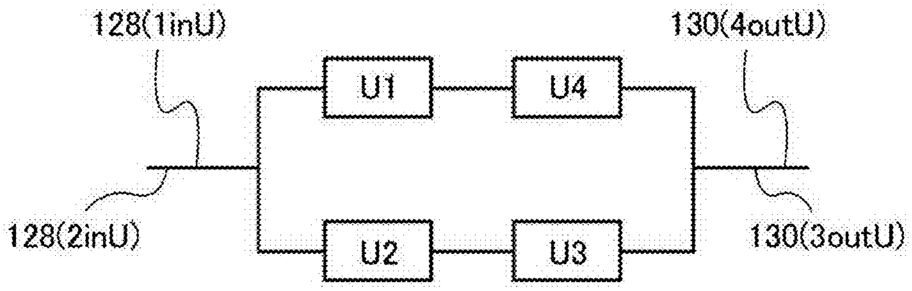
FIG. 62 is a view which schematically illustrates connections of coils formed on first to fourth turns of a strip member.

In FIG. 62, an assembly of the U-phase coils 16U formed on the first strip member 34 is denoted by "U1". An assembly of the U-phase coils 16U formed on the second strip member 34 is denoted by "U2". An assembly of the U-phase coils 16U formed on the third strip member 34 is denoted by "U3". An assembly of the U-phase coils 16U formed on the fourth strip member 34 is denoted by "U4". The coil assembly 32 in this embodiment, as can be seen from the drawing, has the coils 16U on the first and fourth strip members 34 connected in parallel to the coils 16U on the second and third strip members 34. Although not illustrated, the coil assembly 32 also has the V-phase coils 16V on the first and fourth strip members 34 connected in parallel to the V-phase coils 16V on the second and third strip members 34. The coil assembly 32 also has the W-phase coils 16V on the first and fourth strip members 34 connected in parallel to the W-phase coils 16V on the second and third strip members 34.

As apparent from the above discussion, the structure of the coil assembly 32 in the twenty-first embodiment enables the coils 16 formed on one of the strip members 34 to be electrically connected in parallel to the coils 16 formed on another of the strip members 34.

Twenty-Second Embodiment

The motor 10 according to the twenty-second embodiment will be described below. The same reference numbers or symbols as those in the first embodiment will refer to the same parts, and explanation thereof in detail will be omitted here.

Figure 63:
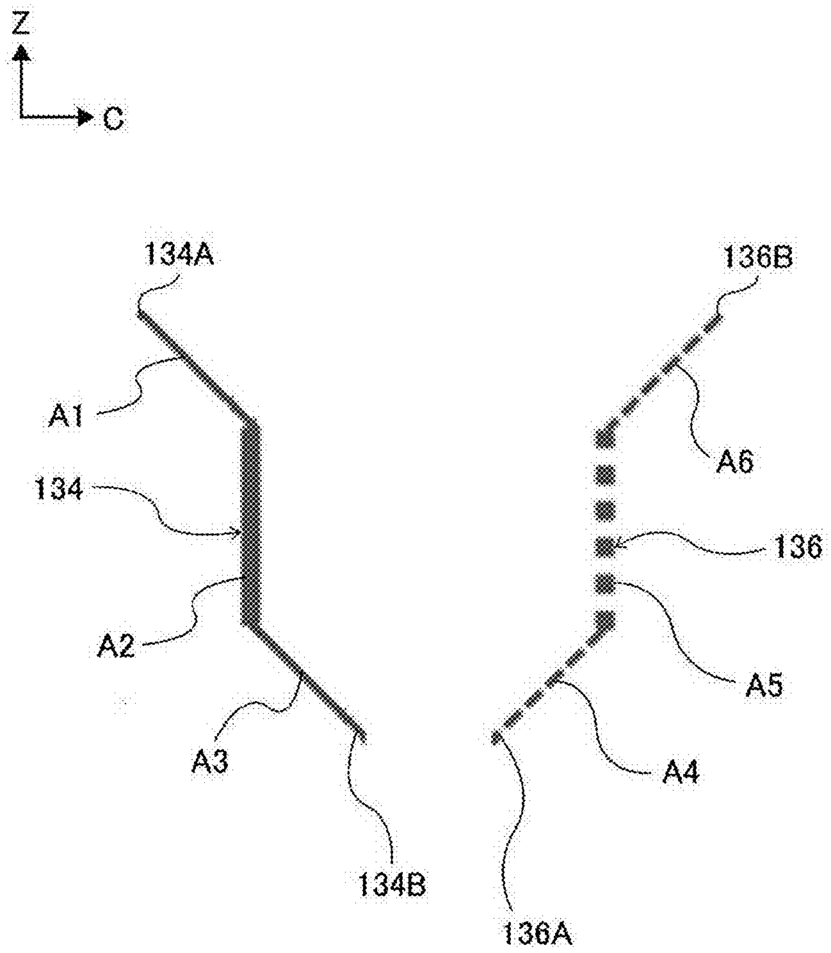
FIG. 63 is a view which illustrates a first coil section and a second coil section of a coil of a motor according to the twenty-second embodiment.
Figure 64:
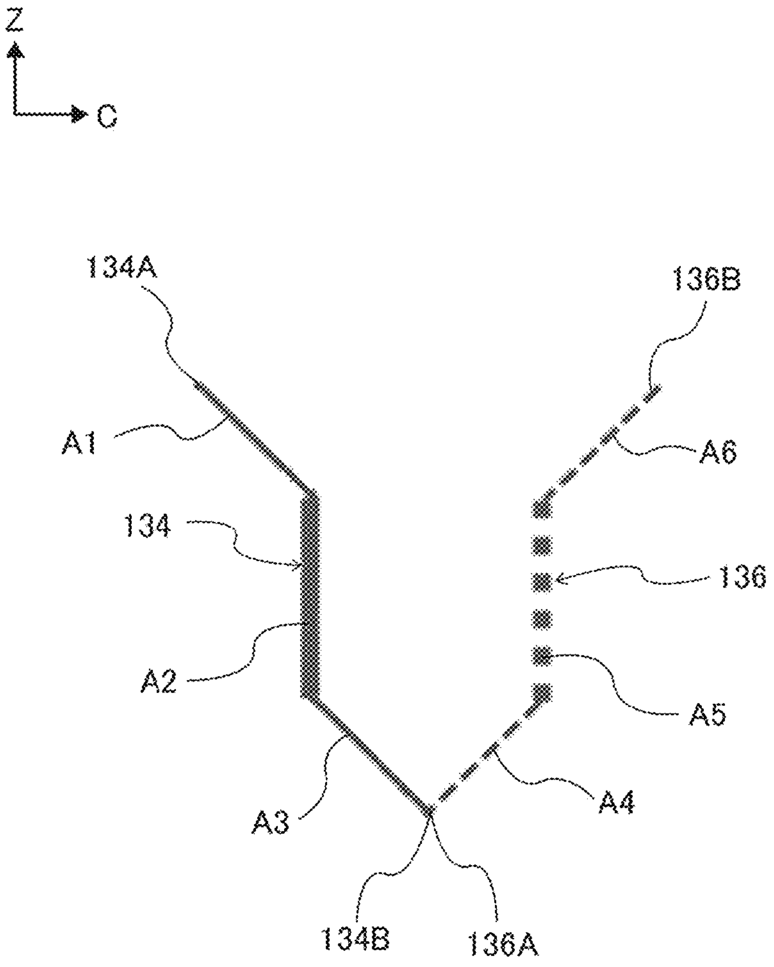
FIG. 64 is a view which illustrates a first coil section and a second coil section of a coil of a motor which are connected together in the twenty-second embodiment.

Each of the coils 16 in this embodiment, as clearly illustrated in FIGS. 63 and 64, includes the first coil section 134 and the second coil section 136. In FIGS. 63 and 64, the same reference numbers as those used in FIG. 7 refer to the same parts.

The first coil section 134 is formed on the first surface 34A of each of the strip member 34 (see FIG. 53). The first coil section 134 includes the first straight section A1 and the second straight section A2. The first straight section A1 extends downward, as viewed in FIG. 63, (i.e., the second axial direction), obliquely in the first circumferential direction of the coil assembly 32. The second straight section A2 extends downward, as viewed in FIG. 63, in the second axial direction from an end of the first straight section A1 which faces in the first circumferential direction. The first coil section 134 also includes the third straight section A3 which extends downward (i.e., the second axial direction) obliquely in the first circumferential direction from an end of the second straight section A2 which faces away from the first straight section A1. The first coil section 134 has the first end 134A which faces in the first axial direction. The first coil section 134 also has the second end 134B which faces in the second axial direction of the strip member 34.

The second coil section 136 is formed on the second surface 34B of each of the strip members 34 (see FIG. 53). The second coil section 136 includes the fourth straight section A4 and the fifth straight section A5. The fourth straight section A4 extends upward, as viewed in FIG. 63, in the first axial direction obliquely in the first circumferential direction of the coil assembly 32. The fifth straight section A5 extends in the first axial direction from an end of the fourth straight section A4 which faces in the first circumferential direction. The second coil section 136 also includes the sixth straight section A6 which extends in the first axial direction obliquely in the first circumferential direction from an end of the fifth straight section A5 which faces away from the fourth straight section A4. The second coil section 136 has the third end 136A which faces in the second axial direction of the strip member 34. The second coil section 136 also has the fourth end 136B which faces in the first axial direction of the strip member 34.

Figure 65:
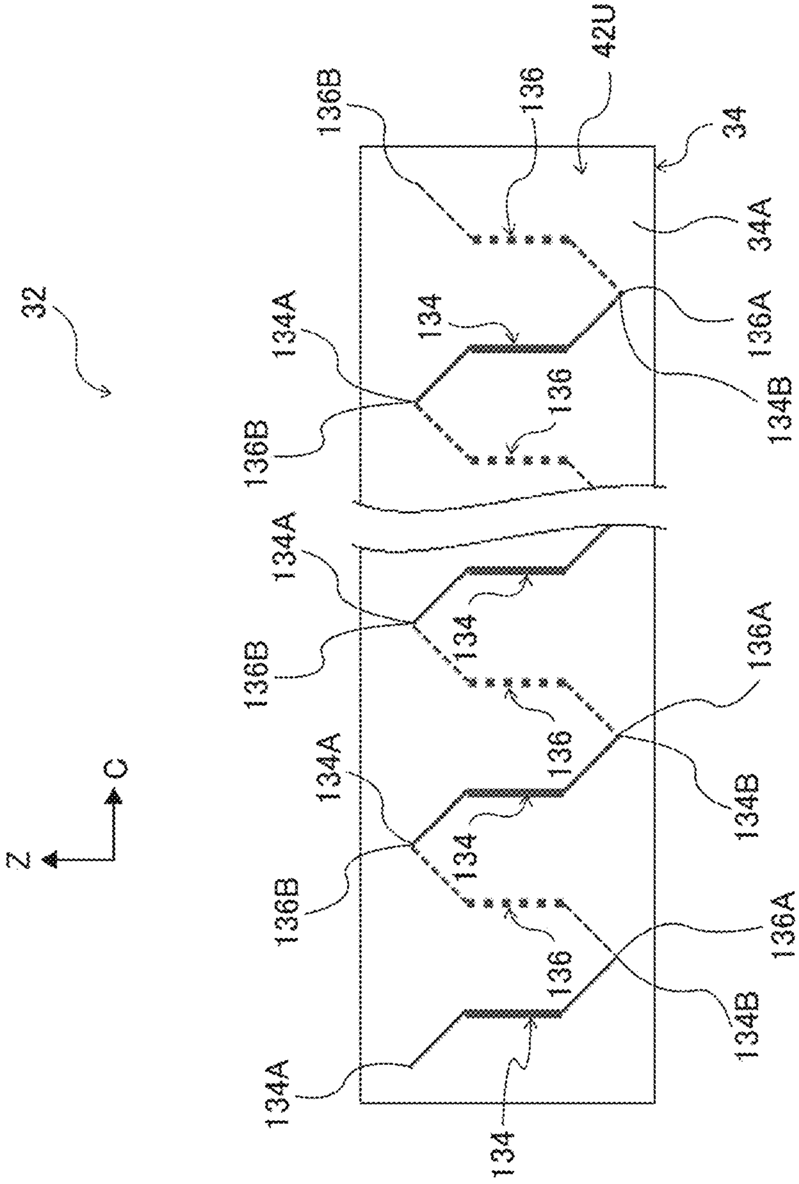
FIG. 65 is a view which illustrates first U-phase coil sections and second U-phase coil sections of a coil assembly in the twenty-second embodiment.

FIG. 65 illustrates the first coil sections 134 and the second coil sections 136 of some of the U-phase coils 16. The coil assembly 32 in this embodiment, as can be seen in the drawing, has the first coil sections 134 and the second coil sections 136 arranged alternately adjacent to each other in the circumferential direction of the coil assembly 32. The first end 134A of the first coil section 134 and the fourth end 136B of the second coil section 136 of a respective adjacent two of the coils 16 are electrically connected together through a via or a through-hole, not shown, formed in the strip member 34. The second end 134B of the first coil section 134 and the third end 136A of a respective adjacent two of the coils 16 are electrically connected together through a via or a through-hole, not shown, formed in the strip member 34. In this way, the first coil sections 134 and the second coil sections 136 of the coils 16 are connected together to form the U-phase coil group 42U.

Figure 66:
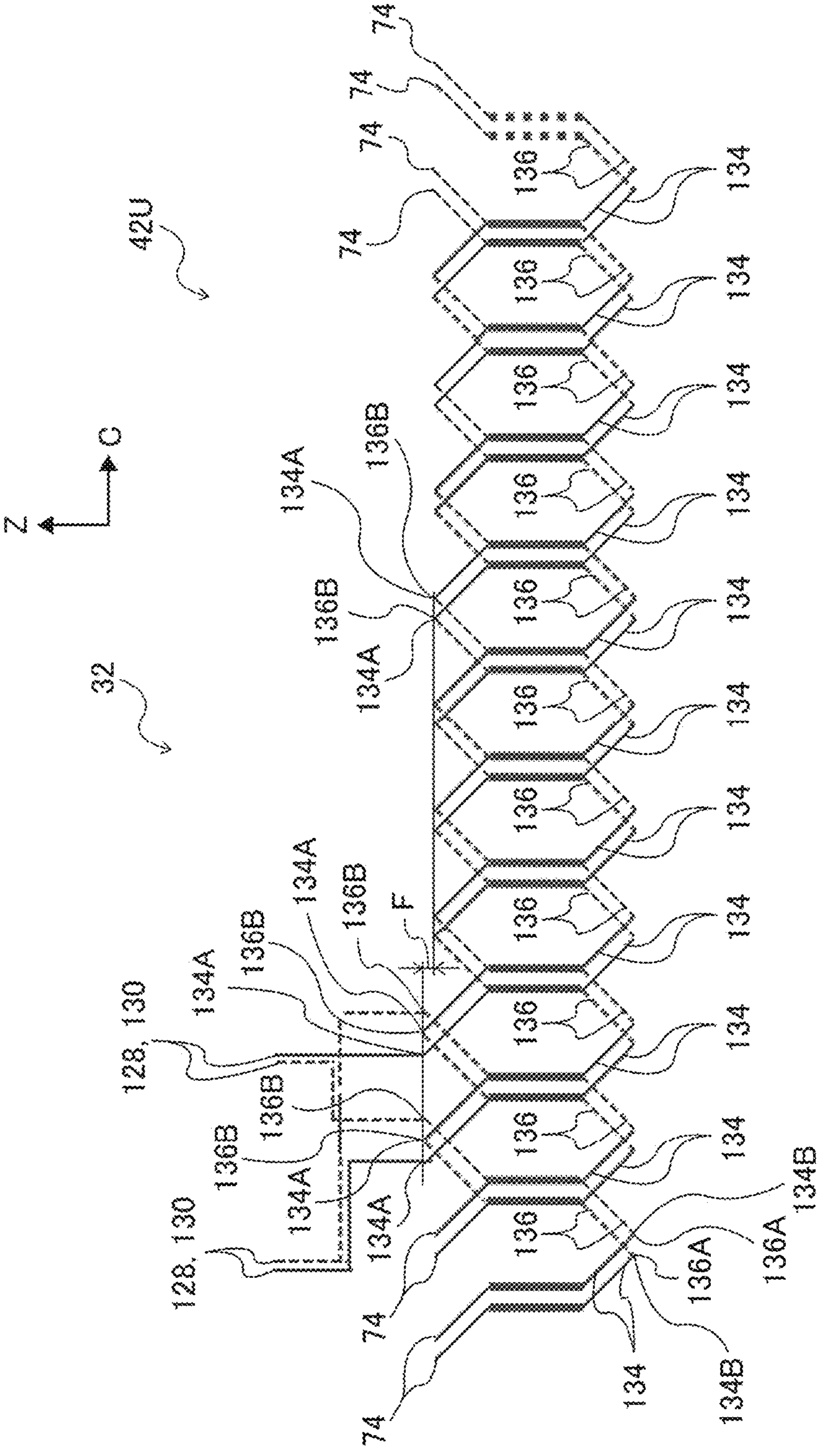
FIG. 66 is a development view which illustrates U-phase coil group formed on a strip member.

FIG. 66 illustrates the U-phase coil group 42U formed on each of the strip members 34 (see FIG. 65). Although not illustrated, the V-phase coil group 42V and the W-phase coil group 42W are identical in structure with the U-phase coil group 42U on the strip member 34. Joints of the second ends 134B of the first coil sections 134 to the third ends 136A of the second coil sections 136 are located at the same positions in the axial direction of the coil assembly 32, in other words, aligned with each other in the circumferential direction of the coil assembly 32.

In the coil assembly 32 in this embodiment, the first ends 134A of the first coil sections 134 and the fourth ends 136B of the second sections 136 of a first set of the coils 16 arranged on a first end portion (also referred to as a first width end portion) of the strip member 34 which faces in the first axial direction are, as clearly illustrated in FIG. 66, offset by a distance F from the first ends 134A and the fourth ends 136B of a second set of the coils 16. Specifically, a circumferentially adjacent two of the first ends 134A of the first coil sections 134 leading to the input terminal 128 and the output terminal 130 and a circumferentially adjacent two of the fourth ends 136B of the second coil sections 136 leading to the input terminal 128 and the output terminal 130 are offset in the first axial direction by the distance F from the other first ends 134A and the other fourth ends 136B. This facilitates electrical connection of some of the first ends 134A and the fourth end 136B to the input terminals 128 and the output terminals 130.

Twenty-Third Embodiment

The motor 10 according to the twenty-third embodiment will be described below. The same reference numbers or symbols as those in the first and twenty-second embodiments will refer to the same parts, and explanation thereof in detail will be omitted here.

Figure 67:
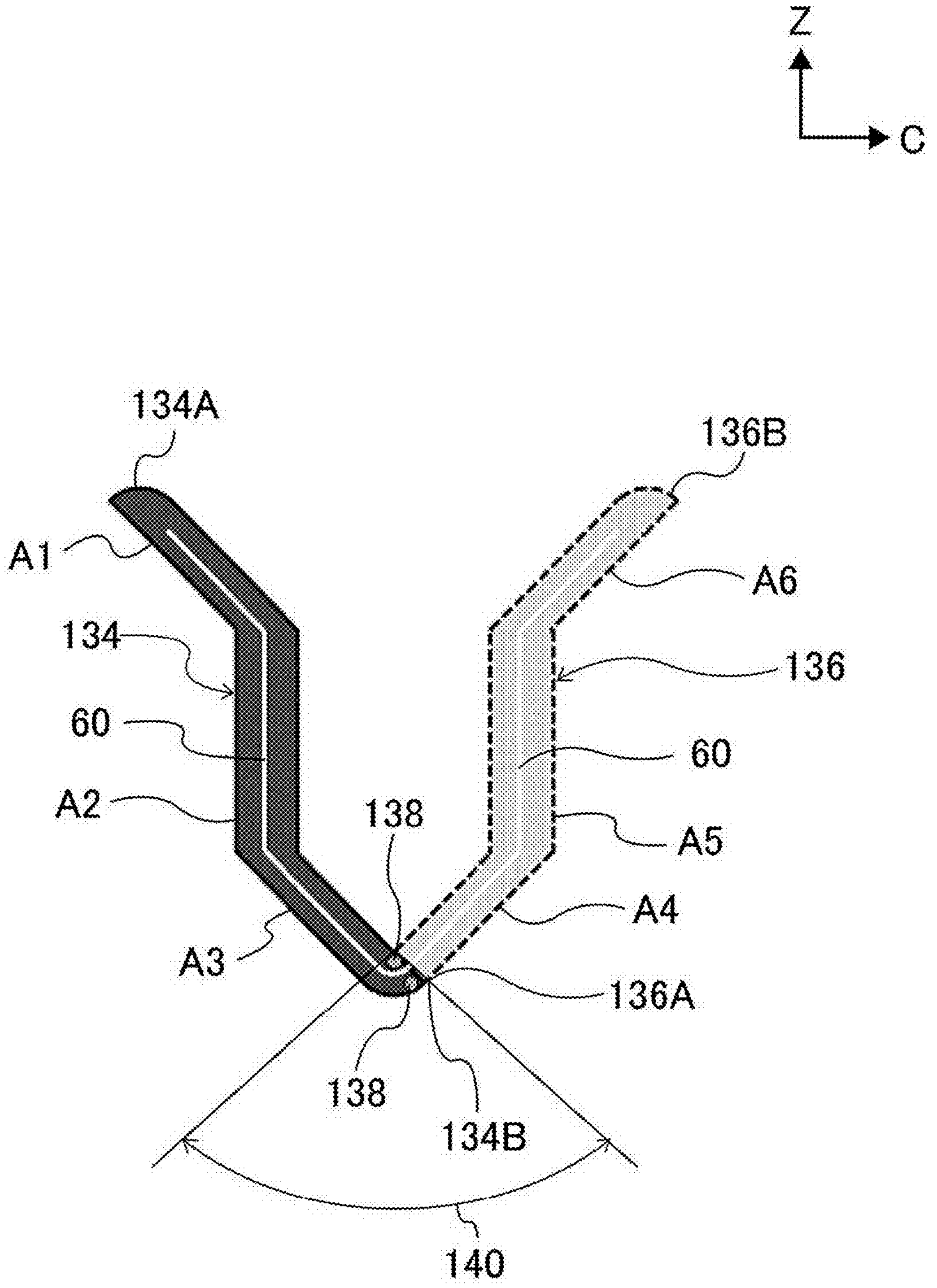
FIG. 67 is a view which illustrates a first coil section and a second coil section of a coil assembly of a motor according to the twenty-third embodiment.

FIG. 67 illustrates one of the coils 16 of the coil assembly 32 in this embodiment. The coil 16, as described above, includes the first coil section 134 and the second coil section 136. The coil 16 also has the slit 60 extending through the first coil section 134 and the second coil section 136. The slid 60 serves to reduce the amount of eddy current as compared with the coil 16 has no slit 60 formed therein, thereby enhancing the degree of torque outputted by the motor 10. In FIG. 67, reference numbers 138 indicate vias or through-holes used to electrically connect the first end 134A and the third end 136A together. The joint of the second end 134B and the third end 136A which is located away from the slit 60 in the second axial direction may be selected within an angular range denoted by an arrow 140.

Each of the coils 16 in this disclosure may be designed to have a combination of the first coil section 134 and the second coil section 136 in the twenty-second or twenty-third embodiment with the parts of the coils 16 in one of the first to twenty-first embodiments.

This disclosure is not limited to the above embodiments and modifications, but may be realized by various embodiments without departing from the purpose of the disclosure. This disclosure includes all possible combinations of the features of the above embodiments and the modifications or features similar to the parts of the above embodiments and the modifications.

The coil assembly 32 may be modified depending upon usage of the motor 10. The motor 10 may be used with an electrical generator. The motor 10 may be designed as an outer-rotor brushless motor in which the rotor 12 is arranged radially outside the stator 14. The structure in this disclosure may be used in a rotor equipped with the coil assembly 32.

This disclosure has referred to the above embodiments, but may be realized by various embodiments and equivalents without departing from the purpose of the disclosure. This disclosure includes all possible combinations of the features of the above embodiments and the modifications or features similar to the parts of the above embodiments and the modifications.

The above embodiments realize the following unique structures.

First Structure

A coil assembly (32) comprises a strip member (34) and a coil group (42U, 42V, 42W, 42UV, 42VW, 42WU). The strip member is made from electrical insulating material and has a width in an axial direction of the coil assembly, a length in a circumferential direction of the coil assembly, and a thickness in a radial direction of the coil assembly. The strip member is rolled in the circumferential direction into a plurality of turns stacked on one another in the radial direction. The coil group includes a plurality of coils (16) which are made from an electrically conductive material and formed on the strip member. The coils are arranged in a length direction of the strip member. Each of the coils is shaped, as viewed in a thickness direction of the strip member, to have an open end facing in a first width direction of the strip member and a closed end facing in a second width direction opposite the first width direction. A respective two of the coils which are arranged adjacent each other in the length direction of the strip member are connected together in a preselected way on a first width end portion of the strip member which faces away from a second width end portion of the strip member in the first width direction.

Second Structure

A coil assembly (32) comprises a strip member (34) and a coil group (42U, 42V, 42W, 42UV, 42VW, 42WU). The strip member is made from electrical insulating material and has a width in an axial direction of the coil assembly, a length in a circumferential direction of the coil assembly, and a thickness in a radial direction of the coil assembly. The strip member is rolled in the circumferential direction into a plurality of turns stacked on one another in the radial direction. The coil group includes a plurality of first coil sections (134) and a plurality of second coil sections (136) which are made from electrically conductive material and formed on the strip member. The first and second coil sections are arranged alternately in a length direction of the strip member. Each of the first coil sections is shaped, as viewed in a thickness direction of the strip member, to extend from a first width end portion of the strip member toward a second width end portion of the strip member which is opposite the first width end portion in a width direction of the strip member. Each of the second coil sections is shaped, as viewed in a thickness direction of the strip member, to extend from the second width end portion of the strip member toward the first width end portion of the strip member in the width direction of the strip member. The first coil sections and the second coil sections are connected together in a preselected way in which a first end that is an end of one of the first coil sections and a second end that is an end of one of the second coil sections and arranged adjacent to the first end on the first width end portion of the strip member are connected together on the first width end portion of the strip member, and a third end that is an end of one of the first coil sections and a fourth end that is an end of one of the second coil sections and arranged adjacent to the third end on the second width end portion of the strip member are connected together on the second width end portion of the stirp member.

Third Structure

The coil assembly, as set forth in the above first or second structure, wherein the coil group includes multi-phase coil groups, and the coils of each of the multi-phase coil groups or the first coil sections and the second coils sections of the coils of each of the multi-phase coil groups are laid to overlap each other in the radial direction.

Fourth Structure

The coil assembly, as set forth in the above first or third structure, wherein each of the coils includes a pair of vertical sections (36), a joint (38B), and a pair of coil ends (38A). The vertical sections are arranged away from each other in the length direction of the strip member. The joint achieves a joint of the vertical sections on the second width end portion of the strip member. The coil ends extend from vertical sections in the first width direction of the strip member to have an interval between the coil ends in the length direction of the strip member which increases in the first width direction of the strip member. One of the coil ends of a first one of the coils and one of the coil ends of a second one of the coils are connected together. The first one and the second one of the coils are arranged adjacent to each other in the length direction of the strip member.

Fifth Structure

The coil assembly, as set forth in any one of the first to fourth structure, wherein the strip member has a first end portion and a second end portion opposite the first end portion in the length direction of the strip member, and inter-coil connectors (74) are disposed on the first end portion and the second end portion of the stirp member. The first end portion and the second end portion of the strip member are laid to overlap each other in the radial direction with the inter-coil connectors on the first and second end portions being connected together. The coils or the first coil sections and the second coil sections are connected together in the preselected way.

Sixth Structure

The coil assembly, as set forth in the fifth structure, wherein the inter-coil connectors include end extensions (74A) which protrude outside the first width end portion of the strip member in the first width direction of the strip member.

Seventh Structure

The coil assembly, as set forth in the fifth or sixth structure, wherein the strip member includes a plurality of strip members, and the inter-coil connector on a first one of the strip members and the inter-coil connector on a second one of the strip members achieve connection of the coils formed on the first one of the strip members with the coils formed on the second one of the strip members or achieve connection of the first coil sections and the second coil sections formed on the first one of the strip members with the first coil sections and the second coil sections formed on the second one of the strip members.

Eighth Structure

The coil assembly, as set forth in any one of the first to seventh structure, further comprises bypass connectors (80, 82, 84) which connect the first coil sections and the second coil sections disposed on a first layer that is one of the turns of the strip member with the first coil sections and the second coil sections disposed on a second layer that is one of the turns of the strip member. The bypass connectors are stacked on one another in the radial direction.

Ninth Structure

The coil assembly as set forth in any one of the first to eighth structure, wherein each of the coils or each of the first coil sections and the second coil sections has at least a portion which includes sections arranged away from each other in the length direction of the strip member.

Tenth Structure

The coil assembly, as set forth in the nineth structure, wherein the coils or the first coil sections and the second coil sections arranged on a radially outer side of the coil assembly include sections which are arranged away from each other in the circumferential direction and greater in number than those of the coils or the first coil sections and the second coil sections arranged on a radially inner side of the coil assembly.

Eleventh Structure

The coil assembly, as set forth in any one of the first to tenth structures, wherein each of the coils or at least two of the coils create a closed circuit (66) including a plurality of paths or wherein each of the first coil sections or the second coil sections or at least two of the first sections or the second coil sections create a closed circuit (66). The coil assembly further comprises a first connecting section (62) and a second connecting section (64). The first connecting section forms a first portion of the closed circuit and connects between the paths. The second connecting section forms a second portion of the closed circuit and connects between paths to cancel an electrical current within the closed circuit which is generated by electromagnetic induction arising from movement of a magnet (18) in the circumferential direction.

Twelfth Structure

The coil assembly, as set forth in any one of the first to eleventh structures, wherein the strip member includes a plurality of strip members rolled into an annular shape in a form of a plurality of turns stacked on one another in the radial direction. The coils or the first and second coil sections formed on the strip members are connected together in a preselected way between input terminals (28) and output terminals (130). A first one of the input terminals which leads to the coils or the first coil sections and the second coil sections formed on a first one of the strip members and a second one of the input terminals which leads to the coils or the first coil sections and the second coil sections formed on a second one of the strip members are connected together at a same position in the circumferential direction. The first one of the strip members is arranged adjacent to the second one of the strip members in the radial direction.

Thirteenth Structure

The coil assembly, as set forth in the twelfth structure, wherein the coils or the first coil sections and the second coil sections formed on a first one of the strip members have patterns identical with those on a second one of the strip members.

Fourteenth Structure

The coil assembly, as set forth in the twelfth or thirteenth structure, wherein the coils or the first coil sections and the second coil sections formed on a first one of the strip members are connected in parallel to the coils or the first coil sections and the second coil sections formed on a second one of the strip members.

Fifteenth Structure

The coil assembly as set forth in any one of the third to fourteenth structure, wherein the strip member has a first surface and a second surface opposite the first surface. The first coil sections are formed on the first surface, while the second coil sections are formed on the second surface. Ends of a first group including the first coil sections and the second coil sections which are disposed on the first width end portion of the strip member are offset in the first width direction from ends of a second group including the first coil sections and the second coil sections which are disposed on the first width end portion of the strip member.

Sixteenth Structure

The coil assembly, as set forth in any one of the second structure and the third to fifteenth structure, wherein the first coil sections and/or the second coil sections each have a section which extends in a first length direction of the strip member obliquely in the width direction of the strip member.

Seventeenth Structure

An armature (14) comprising a coil assembly set forth in any one of the first to sixteenth structures.

Eighteenth Structure

A rotating electrical machine (10, 118, 120, 122, 124) comprising a first one of a stator (14) and a rotor (12) which includes an armature set forth in the seventeenth structure, and a second one of the stator and the rotor which includes a magnet arranged to face said coil assembly.

What is claimed is:

1. A coil assembly comprising:

a strip member which is made from electrical insulating material and has a width in an axial direction of the coil assembly, a length in a circumferential direction of the coil assembly, and a thickness in a radial direction of the coil assembly, the strip member being rolled in the circumferential direction into a plurality of turns stacked on one another in the radial direction; and a coil group which includes a plurality of coils which are made from an electrically conductive material and formed on the strip member, the coils being arranged in a length direction of the strip member, each of the coils being shaped, as viewed in a thickness direction of the strip member, to have an open end facing in a first width direction of the strip member and a closed end facing in a second width direction opposite the first width direction, a respective two of the coils which are arranged adjacent each other in the length direction of the strip member being connected together in a preselected way on a first width end portion of the strip member which faces away from a second width end portion of the strip member in the first width direction.

2. A coil assembly comprising:

a strip member which is made from electrical insulating material and has a width in an axial direction of the coil assembly, a length in a circumferential direction of the coil assembly, and a thickness in a radial direction of the coil assembly, the strip member being rolled in the circumferential direction into a plurality of turns stacked on one another in the radial direction; and a coil group which includes a plurality of first coil sections and a plurality of second coil sections which are made from electrically conductive material and formed on the strip member, the first and second coil sections being arranged alternately in a length direction of the strip member, each of the first coil sections is shaped, as viewed in a thickness direction of the strip member, to extend from a first width end portion of the strip member toward a second width end portion of the strip member which is opposite the first width end portion in a width direction of the strip member, each of the second coil sections being shaped, as viewed in a thickness direction of the strip member, to extend from the second width end portion of the strip member toward the first width end portion of the strip member in the width direction of the strip member, the first coil sections and the second coil sections are connected together in a preselected way in which a first end that is an end of one of the first coil sections and a second end that is an end of one of the second coil sections and arranged adjacent to the first end on the first width end portion of the strip member are connected together on the first width end portion of the strip member, and a third end that is an end of one of the first coil sections and a fourth end that is an end of one of the second coil sections and arranged adjacent to the third end on the second width end portion of the strip member are connected on the second width end portion of the stirp member.

3. The coil assembly as set forth in claim 1, wherein the coil group includes multi-phase coil groups, and the coils of each of the multi-phase coil groups or the first coil sections and the second coils sections of the coils of each of the multi-phase coil groups are laid to overlap each other in the radial direction.

4. The coil assembly as set forth in claim 1, wherein each of the coils includes a pair of vertical sections, a joint, and a pair of coil ends, the vertical sections being arranged away from each other in the length direction of the strip member, the joint achieving a joint of the vertical sections on the second width end portion of the strip member, the coil ends extending from vertical sections in the first width direction of the strip member to have an interval between the coil ends in the length direction of the strip member which increases in the first width direction of the strip member, one of the coil ends of a first one of the coils and one of the coil ends of a second one of the coils are connected together, the first one and the second one of the coils being arranged adjacent to each other in the length direction of the strip member.

5. The coil assembly as set forth in claim 1, wherein the strip member has a first end portion and a second end portion opposite the first end portion in the length direction of the strip member, inter-coil connectors are disposed on the first end portion and the second end portion of the stirp member, the first end portion and the second end portion of the strip member are laid to overlap each other in the radial direction with the inter-coil connectors on the first and second end portions being connected together, the coils or the first coil sections and the second coil sections are connected together in the preselected way.

6. The coil assembly as set forth in claim 5, wherein the inter-coil connectors include end extensions which protrude outside the first width end portion of the strip member in the first width direction of the strip member.

7. The coil assembly as set forth in claim 5, wherein the strip member includes a plurality of strip members, the inter-coil connector on a first one of the strip members and the inter-coil connector on a second one of the strip members achieve connection of the coils formed on the first one of the strip members with the coils formed on the second one of the strip members or alternatively achieve connection of the first coil sections and the second coil sections formed on the first one of the strip members with the first coil sections and the second coil sections formed on the second one of the strip members.

8. The coil assembly as set forth in claim 1, further comprising bypass connectors which connect the first coil sections and the second coil sections disposed on a first layer that is one of the turns of the strip member with the first coil sections and the second coil sections disposed on a second layer that is one of the turns of the strip member, the bypass connectors are stacked on one another in the radial direction.

9. The coil assembly as set forth in claim 1, wherein each of the coils or each of the first coil sections and the second coil sections has at least a portion which includes sections arranged away from each other in the length direction of the strip member.

10. The coil assembly as set forth in claim 9, wherein the coils or the first coil sections and the second coil sections arranged on a radially outer side of the coil assembly include sections which are arranged away from each other in the circumferential direction and greater in number than those of the coils or the first coil sections and the second coil sections arranged on a radially inner side of the coil assembly.

11. The coil assembly as set forth in claim 1, wherein each of the coils or at least two of the coils create a closed circuit including a plurality of paths or wherein each of the first coil sections or the second coil sections or at least two of the first sections or the second coil sections create a closed circuit, and further comprising, a first connecting section and a second connecting section, the first connecting section forms a first portion of the closed circuit and connects between the paths, the second connecting section forms a second portion of the closed circuit and connects between paths to cancel an electrical current within the closed circuit which is generated by electromagnetic induction arising from movement of a magnet in the circumferential direction.

12. The coil assembly as set forth in claim 1, wherein the strip member includes a plurality of strip members rolled into an annular shape in a form of a plurality of turns stacked on one another in the radial direction, the coils or the first and second coil sections formed on the strip members are connected together in a preselected way between input terminals and output terminals, a first one of the input terminals which leads to the coils or the first coil sections and the second coil sections formed on a first one of the strip members and a second one of the input terminals which leads to the coils or the first coil sections and the second coil sections formed on a second one of the strip members are connected together at a same position in the circumferential direction, the first one of the strip members being arranged adjacent to the second one of the strip members in the radial direction.

13. The coil assembly as set forth in claim 12, wherein the coils or the first coil sections and the second coil sections formed on a first one of the strip members have patterns identical with those on a second one of the strip members.

14. The coil assembly as set forth in claim 12, wherein the coils or the first coil sections and the second coil sections formed on a first one of the strip members are connected in parallel to the coils or the first coil sections and the second coil sections formed on a second one of the strip members.

15. The coil assembly as set forth in claim 3, wherein the strip member has a first surface and a second surface opposite the first surface, the first coil sections are formed on the first surface, while the second coil sections are formed on the second surface, ends of a first group including the first coil sections and the second coil sections which are disposed on the first width end portion of the strip member are offset in the first width direction from ends of a second group including the first coil sections and the second coil sections which are disposed on the first width end portion of the strip member.

16. The coil assembly as set forth in claim 2, wherein the first coil sections and/or the second coil sections each have a section which extends in a first length direction of the strip member obliquely in the width direction of the strip member.

17. An armature comprising a coil assembly set forth in claim 1.

18. A rotating electrical machine comprising:

a first one of a stator and a rotor which includes an armature set forth in claim 17; and a second one of the stator and the rotor which includes a magnet arranged to face said coil assembly.

* * * * *